United States Patent
Cirik et al.

(10) Patent No.: US 11,929,946 B2
(45) Date of Patent: Mar. 12, 2024

(54) BANDWIDTH PARTS OPERATION IN MULTIPLE ACTIVE BANDWIDTH PARTS

(71) Applicant: Ofinno, LLC, Reston, VA (US)

(72) Inventors: Ali Cagatay Cirik, Herndon, VA (US); Esmael Dinan, McLean, VA (US); Hua Zhou, Herndon, VA (US); Hyoungsuk Jeon, Centreville, VA (US); Alireza Babaei, Fairfax, VA (US); Kyungmin Park, Vienna, VA (US); Kai Xu, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 421 days.

(21) Appl. No.: 17/372,598

(22) Filed: Jul. 12, 2021

(65) Prior Publication Data

US 2021/0409170 A1    Dec. 30, 2021

Related U.S. Application Data

(63) Continuation of application No. 16/575,665, filed on Sep. 19, 2019, now Pat. No. 11,070,328.

(60) Provisional application No. 62/737,877, filed on Sep. 27, 2018.

(51) Int. Cl.
*H04L 5/00* (2006.01)

(52) U.S. Cl.
CPC ........... *H04L 5/001* (2013.01); *H04L 5/0094* (2013.01); *H04W 74/0808* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2019/0166529 A1* | 5/2019 | Chen | H04L 5/0053 |
| 2019/0223227 A1* | 7/2019 | Jiang | H04L 5/0092 |
| 2019/0306881 A1* | 10/2019 | Fakoorian | H04W 76/27 |
| 2019/0306890 A1 | 10/2019 | Jang et al. | |
| 2020/0351946 A1 | 11/2020 | Pang et al. | |
| 2021/0014903 A1* | 1/2021 | Zhang | H04W 76/30 |
| 2021/0037487 A1* | 2/2021 | Ohara | H04W 72/23 |
| 2021/0105776 A1* | 4/2021 | Jiang | H04W 72/0453 |
| 2021/0212112 A1* | 7/2021 | Jia | H04W 76/27 |

(Continued)

OTHER PUBLICATIONS

3GPP TSG-RAN2 Meeting #103 R2-1811399; Gothenburg, Sweden, Aug. 20-24, 2018; CR-Form-v11.1 Change Request.

(Continued)

*Primary Examiner* — Duc T Duong
(74) *Attorney, Agent, or Firm* — Jacob L. Mangan; Kavon Nasabzadeh; Philip R. Smith

(57) ABSTRACT

A wireless device transmits, via a first uplink bandwidth part (BWP), a first preamble for a random-access procedure. A determination is made of a second uplink BWP for transmission of a second preamble for the random-access procedure. The determination is based on not receiving, via a first downlink BWP associated with the first uplink BWP, a random-access response corresponding to the first preamble. Based on the determination of the second uplink BWP, the first downlink BWP is switched to a second downlink BWP associated with the second uplink BWP. The second preamble is transmitted via the second uplink BWP.

20 Claims, 29 Drawing Sheets

(56) References Cited

U.S. PATENT DOCUMENTS

2021/0274555 A1* 9/2021 Alfarhan ............ H04W 74/0808
2022/0039016 A1* 2/2022 Terry ................ H04W 52/0235

OTHER PUBLICATIONS

3GPP TS 38.213 V15.2.0 (Jun. 2018); Technical Specification; 3rd Generation Partnership Project; Technical Specification Group Radio Access Network; NR;Physical layer procedures for control (Release 15).
3GPP TS 38.321 V15.2.0 (Jun. 2018); Technical Specification; 3rd Generation Partnership Project; Technical Specification Group Radio Access Network; NR; Medium Access Control (MAC) protocol specification; (Release 15).
3GPP TSG-RAN WG2 Meeting #101bis R2-1806229; Sanya, China, Apr. 16-20, 2018; CR-Form-v11.2;Change Request.
3GPP TSG-RAN WG2 Meeting #102 R2-1807026; Busan, Republic of Korea, May 21-25, 2018; CR-Form-v11.2 Change Request.
3GPP TSG-RAN WG2 #102; R2-1807959; Busan, Korea, May 21-25, 2018; CR-Form-v11.2; Change Request.
3GPP TSG-RAN WG2 #103; R2-1811307; Gothenburg, Sweden, Aug. 20-24, 2018; CR-Form-v11.2; Change Request.
3GPP TSG-WG2 Meeting #103 R2-1813020; Gothenburg, Sweden, Aug. 20-24, 2018; CR-Form-v11.2; Change Request.
3GPP TSG-WG2 Meeting #103 R2-1811625; Gothenburg, Sweden, Aug. 20-24, 2018; CR-Form-v11.2; Change Request.
3GPP TSG-RAN2 Adhoc; R2-1809471; Montreal, Canada, Jul. 2-Jul. 6, 2018; CR-Form-v11.2; Change Request.
3GPP TS 38.331 V15.2.1 (Jun. 2018); Technical Specification; 3rd Generation Partnership Project; Technical Specification Group Radio Access Network; NR; Radio Resource Control (RRC) protocol specification; (Release 15).
R1-1808062; 3GPP TSG RAN WG1 Meeting #94; Gothenburg, Sweden, Aug. 20-Aug. 24, 2018;Agenda Item:7.2.2.4.2; Source:Huawei, HiSilicon; Title: Initial access in NR unlicensed.
R1-1808336; 3GPP TSG RAN WG1 Meeting #94; Gothenburg, Sweden, Aug. 20-24, 2018; Agenda Item:7.2.2.4.2; Source:Sony; Title:Considerations on initial access and mobility for NR unlicensed operations.
R1-1808508; 3GPP TSG RAN WG1 Meeting #94; Gothenburg, Sweden, Aug. 20-24, 2018; Agenda Item:7.2.2.4.2; Source: LG Electronics; Title: Initial access and mobility for NR unlicensed operation.
R1-1808686—Intel-Enhancements to initial access and mobility for NR-unlicensed; 3GPP TSG RAN WG1 Meeting #94; Gothenburg, Sweden, Aug. 20-24, 2018;Agenda Item:7.2.2.4.2; Source: Intel Corporation; Title:Enhancements to initial access and mobility for NR-unlicensed.
R1-1808769—Initial-Access; 3GPP TSG RAN WG1 Meeting #94; Gothenburg, Sweden, Aug. 20-24, 2018; Agenda item:7.2.2.4.2; Source:Samsung; Title:Initial Access and Mobility Procedure for NR-U; Document for: Discussion and Decision.
R1-1808900; 3GPP TSG RAN WG1 Meeting #94; Gothenburg, Sweden, Aug. 20-24, 2018;Source:OPPO; Title:Initial access procedure on NR-U; Agenda Item:7.2.2.4.2.
R1-1808951_Initial Access and Mobility; 3GPP TSG RAN WG1 Meeting #94; Gothenburg, Sweden, Aug. 20-24, 2018; ; Agenda item:7.2.2.4.2; Source: Nokia, Nokia Shanghai Bell; Title:On Initial Access and Mobility for NR-U.
R1-1809205 On initial access, RRM, mobility and RLM; 3GPP TSG-RAN WG1 Meeting #94; Gothenburg, Sweden, Aug. 20-24, 2018; Agenda Item:7.2.2.4.2; Source:Ericsson; Title:On initial access, RRM, mobility and RLM.
R1-1809219 Initial access in NR Unlicensed; 3GPP TSG RAN WG1 Meeting #94; Gothenburg, Sweden, Aug. 20-24, 2018; ; Agenda Item:7.2.2.4.2; Source:Xiaomi; Title: Initial Access in NR unlicensed.
R1-1809315; 3GPP TSG RAN WG1 Meeting 94; Gothenburg, Sweden, Aug. 20-24, 2018; Agenda Item:7.2.2.4.2; Source:Motorola Mobility, Lenovo; Title:Diversity in RACH transmissions.
R1-1809326_Initial access for NR-U_final; 3GPP TSG RAN WG1 Meeting #94; Gothenburg, Sweden, Aug. 20-24, 2018; Source:Wilus Inc.; Title:Discussion on initial access and mobility for NR-U operation; Agenda Item:7.2.2.4.2; Document for:Discussion/Decision.
R1-1809480 7.2.2.4.2 Initial access and mobility procedures for NR-U; 3GPP TSG RAN WG1 Meeting #94; Gothenburg, Sweden; Aug. 20-Aug. 24, 2018; Agenda item:7.2.2.4.2; Source:Qualcomm Incorporated.
R1-1809492; 3GPP TSG RAN WG1 Meeting 94; Gothenburg, Sweden, Aug. 20-24, 2018;Agenda Item:7.2.2.4.2; Source:Motorola Mobility, Lenovo; Title:Initial Access and Diversity in RACH transmissions.
R1-1810020; TS 38213 CR; 3GPP TSG RAN WG1 Meeting #94; Gothenburg, Sweden, Aug. 20-24, 2018; CR-Form-v11.2; Change Request.
R2-1805413; 3GPP TSG-RAN WG2 #101BisTdoc; Sanya, P.R. of China, Apr. 16-20, 2018Revision of R2-1803194; Agenda Item:10.3.1.4.2; Source: Ericsson; Title:Beam reselection in case of high load during RA.
R2-1805751; 3GPP TSG-RAN WG2 Meeting #101bis; Sanya, China, Apr. 16-20, 2018Resubmission of R2-1803569; Agenda item: 10.3.1.4.2; Source:Qualcomm Incorporated; Title:Backoff indication in multi-beam operation.
R2-1806991; 3GPP TSG-RAN WG2#102; Busan, Korea, May 21-25, 2018; Source:CATT; Title:Further issues with switching of bandwidth part and random access; Agenda Item:10.3.1.2.
R2-1807025; 3GPP TSG-RAN WG2 #102Tdoc; Busan, Republic of Korea, May 21-25, 2018Resubmission of R2-1805413; ; Agenda Item:10.3.1.4.2; Source:Ericsson; Title:Beam reselection in case of high load during RA.
R2-1808027; 3GPP TSG-RAN WG2 Meeting #102; Busan, South Korea, May 21-25, 2018;Agenda item:10.3.1.4.2; Source: Nokia, Nokia Shanghai Bell.
R2-1808028 CR to 38.321 on SSB specific backoff time; 3GPP TSG-RAN WG2 Meeting #102; Busan, South Korea, May 21-25, 2018; CR-Form-v11.2; Draft Change Request.
R2-1808470; 3GPP TSG-RAN2 Meeting #102; Busan, Korea, May 21-25, 2018 Revision of R2-1805781; Agenda Item:10.3.1.4.2; Source: Huawei, HiSilicon; Title: Beam reselection in RACH procedure; Document for:Discussion and decision.
R2-1808571; 3GPP TSG-RAN WG2 Meeting #102; Busan, Korea, May 21-May 25, 2018Resubmission of R2-1805751; Agenda item:10.3.1.4.2; Source:Qualcomm Incorporated; Title:Backoff indication in multi-beam operation.
R2-1808650; 3GPP TSG-RAN WG2 NR #102 Meeting; Busan, Korea, May 21-25, 2018 (Resubmission of R2-1805848); Agenda item:10.3.1.2; Source:Samsung; Title:Multiple active bandwidth parts.
R2-1810323_Report_Email_Discussion_NRU_Mobiliy; 3GPP TSG-RAN2 NR AH#0218R2-1810323; Montreal, Canada, Jul. 2-6, 2018; Agenda item:11.2; Source: Qualcomm Incorporated.
R2-1811110_Corrections for random access backoff; 3GPP TSG-RAN2 103; Gothenburg, Sweden, Aug. 20-24, 2018; CR-Form-v11.2; Change Request.
R2-1811281; 3GPP TSG RAN WG2 NR #103 Meeting; Gothenburg, Sweden, Aug. 20-24, 2018; Agenda Item:11.2.1.1; Source: ZTE; Title: Considerations on channel access procedure for NR-U; Document for: Discussion and Decision.
R2-1811400; 3GPP TSG-RAN2 Meeting #103R2-18011400; Gothenburg, Sweden, Aug. 20-24, 2018; Agenda Item:10.3.1.4.3 ; Source: OPPO; Title: Discussion on the backoff time for RA.
R2-1811426; 3GPP TSG RAN WG2 Meeting #103; Gothenburg, Sweden, Aug. 20-24, 2018; Agenda Item:10.3.1.13; Source: Sony; Title:Multiple active BWPs.
R2-1811624; 3GPP TSG-RAN WG2 Meeting #103Tdoc ; Gothenburg, Sweden, Aug. 20-24, 2018; Agenda Item:10.3.1.4.3; Source:Ericsson; Title:Backoff when both CFRA and CBRA resources are configured.

(56) References Cited

OTHER PUBLICATIONS

R2-1811780; 3GPP TSG-RAN WG2 Meeting #103; Gothenburg, Sweden, Aug. 20-24, 2018(Revision of R2-1809863); Source:vivo; Title:Enhancement of 4-step RACH for NR-U; Agenda Item:11.2.1.1.

R2-1811900; 3GPP TSG-RAN WG2 Meeting #103;Gothenburg, Sweden, Aug. 20-24, 2018; Source: vivo; Title: Discussion on the backoff of RACH; Agenda Item:10.3.1.4.3.

R2-1811900 Discussion on the backoff of Rach_READ; 3GPP TSG-RAN WG2 Meeting #103 ; Gothenburg, Sweden, Aug. 20-24, 2018; Source: vivo; Title: Discussion on the backoff of RACH; Agenda Item: 10.3.1.4.3.

R2-1811901 CR of 38.321 on the backoff of RACH; 3GPP TSG-RAN WG2 Meeting #103; Gothenburg, Sweden Aug. 20-24, 2018; CR-Form-v11.2; Change Request.

R2-1812111 Correction to Random Access backoff; 3GPP TSG-RAN WG2 Meeting #103; Gothenburg, Sweden, Aug. 20-24, 2018; CR-Form-v11.2; Change Request.

R2-1812343; 3GPP TSG-RAN WG2 Meeting #103; Gothenburg, Sweden, Aug. 20-24, 2018; Agenda Item:11.2.1.1; Souce:MediaTek Inc.; Title:Enhancements to the RACH procedure for NR-U.

R2-1812657; 3GPP TSG-RAN WG2 Meeting #103; Gothenburg, Sweden, Aug. 20-24, 2018; Agenda Item:11.2.1.1; Source: Huawei, HiSilicon; Title: Four-step RACH procedure for NR-U; Document for:Discussion and decision.

R2-1812832 Considerations on 2-step contention based RA for NR-U SA_MAYREAD; 3GPP TSG-RAN WG2 #103; Gothenburg, Sweden, Aug. 20-24, 2018(Revision of R2-1809940); Agenda Item: 11.2.1.1(FS_NR_unlic); Source: LG Electronics Inc.

R2-1812835 Enhanced 4-step RACH procedure for NR-U_READ; 3GPP TSG-RAN WG2 #103 ; Gothenburg, Sweden, Aug. 20-24, 2018; Agenda Item: 11.2.1.1(FS_NR_unlic); Source: LG Electronics Inc.

* cited by examiner

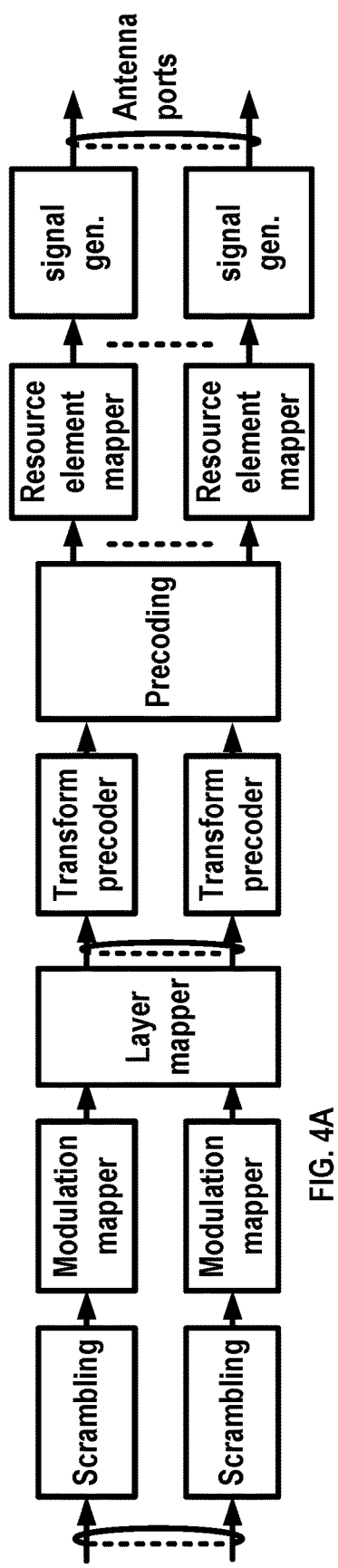
FIG. 4A
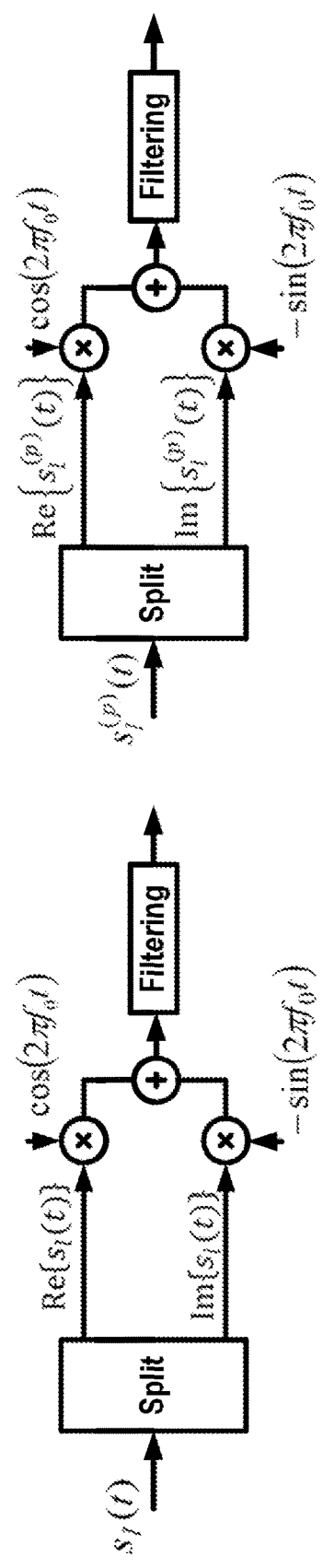
FIG. 4B
FIG. 4D
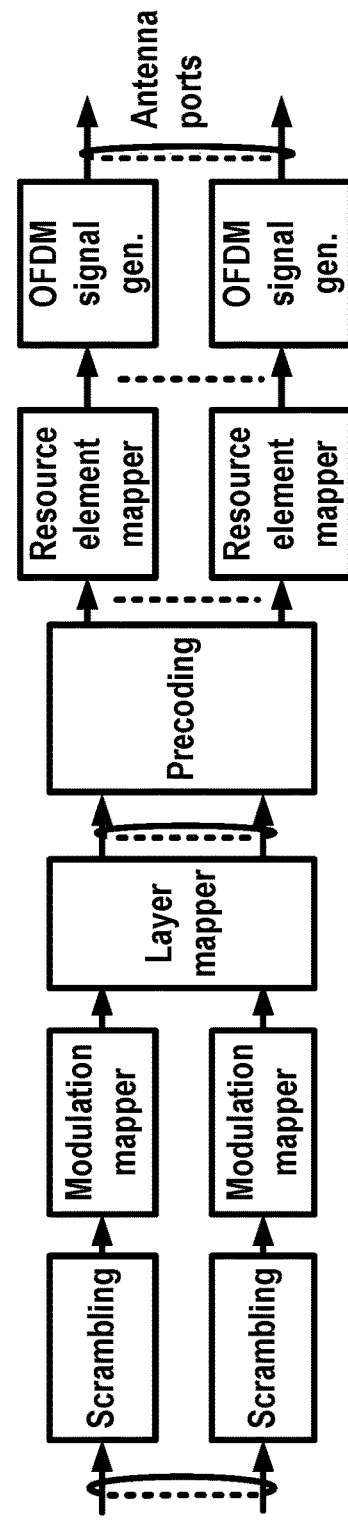
FIG. 4C

RACH-ConfigCommon information element

```
RACH-ConfigCommon ::=                  SEQUENCE {
    rach-ConfigGeneric             RACH-ConfigGeneric,
    totalNumberOfRA-Preambles          INTEGER (1..63) OPTIONAL,     -- Need S
    ssb-perRACH-OccasionAndCB-PreamblesPerSSB  CHOICE {
        oneEighth       ENUMERATED {n4,n8,n12,n16,n20,n24,n28,n32,n36,n40,n44,n48,n52,n56,n60,n64},
        oneFourth       ENUMERATED {n4,n8,n12,n16,n20,n24,n28,n32,n36,n40,n44,n48,n52,n56,n60,n64},
        oneHalf         ENUMERATED {n4,n8,n12,n16,n20,n24,n28,n32,n36,n40,n44,n48,n52,n56,n60,n64},
        one             ENUMERATED {n4,n8,n12,n16,n20,n24,n28,n32,n36,n40,n44,n48,n52,n56,n60,n64},
        two             ENUMERATED {n4,n8,n12,n16,n20,n24,n28,n32},
        four            INTEGER (1..16),
        eight           INTEGER (1..8),
        sixteen         INTEGER (1..4)
    }                                  OPTIONAL,  -- Need M
    groupBconfigured                   SEQUENCE {
        ra-Msg3SizeGroupA      ENUMERATED { b56, b144, b208, b256, b282, b480, b640,
                                            b800, b1000, spare7, spare6, spare5, spare4, spare3, spare2, spare1},
        messagePowerOffsetGroupB  ENUMERATED { minusinfinity, dB0, dB5, dB8, dB10, dB12, dB15, dB18},
        numberOfRA-PreamblesGroupA INTEGER (1..64)
    }                                  OPTIONAL,  -- Need R
    ra-ContentionResolutionTimer  ENUMERATED { sf8, sf16, sf24, sf32, sf40, sf48, sf56, sf64},
    rsrp-ThresholdSSB              RSRP-Range OPTIONAL,   -- Need R
    rsrp-ThresholdSSB-SUL          RSRP-Range OPTIONAL,   -- Cond SUL
    prach-RootSequenceIndex        CHOICE {
        1839                       INTEGER (0..837),
        1139                       INTEGER (0..137)
    },
    msg1-SubcarrierSpacing         SubcarrierSpacing                              OPTIONAL,
 -- Need S
    restrictedSetConfig    ENUMERATED {unrestrictedSet, restrictedSetTypeA, restrictedSetTypeB},
    msg3-transformPrecoding ENUMERATED {enabled}                OPTIONAL,  -- Need R
    ...
}
-- TAG-RACH-CONFIG-COMMON-STOP
-- ASN1STOP
```

FIG. 16

RACH-ConfigCommon field descriptions

*messagePowerOffsetGroupB*: Threshold for preamble selection. Value in dB. Value minusinfinity corresponds to -infinity. Value dB0 corresponds to 0 dB, dB5 corresponds to 5 dB and so on. (see FFS Spec, section FFS_Section)

*msg1-SubcarrierSpacing*: Subcarrier spacing of PRACH. Only the values 15 or 30 kHz (<6GHz), 60 or 120 kHz (>6GHz) are applicable. Corresponds to L1 parameter 'prach-Msg1SubcarrierSpacing' (see 38.211, section FFS_Section). If absent, the UE applies the SCS as derived from the prach-ConfigurationIndex in RACH-ConfigGeneric (see 38.211, section XXX).

*msg3-transformPrecoding*: Indicates to a UE whether transform precoding is enabled for Msg3 transmission. Absence indicates that it is disabled. Corresponds to L1 parameter 'msg3-tp' (see 38.213, section 8.1)

*numberOfRA-PreamblesGroupA*: The number of CB preambles per SSB in group A. This determines implicitly the number of CB preambles per SSB available in group B. (see 38.213, section 5.1.1). The setting should be consistent with the setting of ssb-perRACH-OccasionAndCB-PreamblesPerSSB.

*prach-RootSequenceIndex*: PRACH root sequence index. Corresponds to L1 parameter 'PRACHRootSequenceIndex' (see 38.211, section 6.3.3.1). The value range depends on whether L=839 or L=139

*ra-ContentionResolutionTimer*: The initial value for the contention resolution timer (see 38.321, section 5.1.5). Value ms8 corresponds to 8 ms, value ms16 corresponds to 16 ms, and so on.

*ra-Msg3SizeGroupA*: Transport Blocks size threshold in bit below which the UE shall use a contention based RA preamble of group A. (see 38.321, section 5.1.2)

*rach-ConfigGeneric*: Generic RACH parameters

*restrictedSetConfig*: Configuration of an unrestricted set or one of two types of restricted sets, see 38.211  6.3.3.1

*rsrp-ThresholdSSB*: UE may select the SS block and corresponding PRACH resource for path-loss estimation and (re)transmission based on SS blocks that satisfy the threshold (see 38.213, section REF).

*rsrp-ThresholdSSB-SUL*: The UE selects SUL carrier to perform random access based on this threshold (see TS 38.321, section 5.1.1).

*ssb-perRACH-OccasionAndCB-PreamblesPerSSB*: Number of SSBs per RACH occasion (L1 parameter 'SSB-per-rach-occasion') and the number of Contention Based preambles per SSB (L1 parameter 'CB-preambles-per-SSB'). The total number of CB preambles in a RACH occasion is given by CB-preambles-per-SSB * max(1,SSB-per-rach-occasion).

*totalNumberOfRA-Preambles*: Total number of preambles used for contention based and contention free random access, excluding preambles used for other purposes (e.g. for SI request). If the field is absent, the UE may use all 64 preambles for RA.

FIG. 17

RACH-ConfigGeneric information element

```
RACH-ConfigGeneric ::=          SEQUENCE {
    prach-ConfigurationIndex        INTEGER (0..255),
    msg1-FDM                        ENUMERATED {one, two, four, eight},
    msg1-FrequencyStart             INTEGER (0..maxNrofPhysicalResourceBlocks-1),
    zeroCorrelationZoneConfig       INTEGER(0..15),
    preambleReceivedTargetPower     INTEGER (-202..-60),
    preambleTransMax                ENUMERATED {n3, n4, n5, n6, n7,  n8, n10, n20, n50, n100, n200},
    powerRampingStep                ENUMERATED {dB0, dB2, dB4, dB6},
    ra-ResponseWindow               ENUMERATED {sl1, sl2, sl4, sl8, sl10, sl20, sl40, sl80},
    ...
}
```

RACH-ConfigGeneric field descriptions

| |
|---|
| *msg1-FDM*: The number of PRACH transmission occasions FDMed in one time instance. Corresponds to L1 parameter 'prach-FDM' (see 38.211, section FFS_Section) |
| *msg1-FrequencyStart*: Offset of lowest PRACH transmission occasion in frequency domain with respective to PRB 0. The value is configured so that the corresponding RACH resource is entirely within the bandwidth of the UL BWP. Corresponds to L1 parameter 'prach-frequency-start' (see 38.211, section FFS_Section) |
| *powerRampingStep*: Power ramping steps for PRACH (see 38.321,5.1.3) |
| *prach-ConfigurationIndex*: PRACH configuration index. Corresponds to L1 parameter 'PRACHConfigurationIndex' (see 38.211, section 6.3.3.2) |
| *preambleReceivedTargetPower*: The target power level at the network receiver side (see 38.213, section 7.4, 38.321, section 5.1.2, 5.1.3). Only multiples of 2 dBm may be chosen (e.g. -202, -200, -198...). |
| *preambleTransMax*: Max number of RA preamble transmission perfomed before declaring a failure (see 38.321, section 5.1.4, 5.1.5) |
| *ra-ResponseWindow*: Msg2 (RAR) window length in number of slots. The network configures a value lower than or euqal to 10 ms (see 38.321, section 5.1.4) |
| *zeroCorrelationZoneConfig*: N-CS configuration, see Table 6.3.3.1-3 in 38.211 |

FIG. 18

*RACH-ConfigDedicated* information element

```
-- FFS_Standlone: resources for msg1-based on-demand SI request
RACH-ConfigDedicated ::=   SEQUENCE { cfra  CFRA OPTIONAL,    -- Need N
                                      ra-Prioritization  RA-Prioritization  OPTIONAL,  -- Need N
    ...
}
CFRA ::=   SEQUENCE {
    occasions SEQUENCE {
        rach-ConfigGeneric    RACH-ConfigGeneric,
        ssb-perRACH-Occasion  ENUMERATED {oneEighth, oneFourth, oneHalf, one, two, four, eight, sixteen} OPTIONAL
Cond SSB-CFRA
    }                                                   OPTIONAL,     -- Need S
    resources   CHOICE {
        ssb    SEQUENCE {
            ssb-ResourceList          SEQUENCE (SIZE(1..maxRA-SSB-Resources)) OF CFRA-SSB-Resource,
            ra-ssb-OccasionMaskIndex  INTEGER (0..15)
        },
        csirs  SEQUENCE {
            csirs-ResourceList  SEQUENCE (SIZE(1..maxRA-CSIRS-Resources)) OF CFRA-CSIRS-Resource,
            rsrp-ThresholdCSI-RS  RSRP-Range
        }
    },
    ...
}

CFRA-SSB-Resource ::=   SEQUENCE {
    ssb             SSB-Index,
    ra-PreambleIndex  INTEGER (0..63),
    ...
}

CFRA-CSIRS-Resource ::=   SEQUENCE {
    csi-RS           CSI-RS-Index,
    ra-OccasionList  SEQUENCE (SIZE(1..maxRA-OccasionsPerCSIRS)) OF INTEGER (0..maxRA-Occasions-1),
    ra-PreambleIndex  INTEGER (0..63),
    ...
}
```

FIG. 19

| CFRA field descriptions |
|---|
| ra-ssb-OccasionMaskIndex<br>Explicitly signalled PRACH Mask Index for RA Resource selection in TS 36.321. The mask is valid for all SSB resources signalled in ssb-ResourceList. |
| rach-ConfigGeneric<br>Configuration of contention free random access occasions for CFRA. |
| ssb-perRACH-Occasion<br>Number of SSBs per RACH occasion (L1 parameter 'SSB-per-rach-occasion'). |

| CFRA-CSIRS-Resource field descriptions |
|---|
| csi-RS<br>The ID of a CSI-RS resource defined in the measurement object associated with this serving cell. |
| ra-OccasionList<br>RA occasions that the UE shall use when performing CF-RA upon selecting the candidate beam identified by this CSI-RS. |
| ra-PreambleIndex<br>The RA preamble index to use in the RA occasions associated with this CSI-RS. |

| CFRA-SSB-Resource field descriptions |
|---|
| ra-PreambleIndex<br>The preamble index that the UE shall use when performing CF-RA upon selecting the candidate beams identified by this SSB. |
| ssb<br>The ID of an SSB transmitted by this serving cell. |

| RACH-ConfigDedicated field descriptions |
|---|
| cfra<br>Parameters for contention free random access to a given target cell. If the field is absent, the UE performs contention based random access. |
| ra-prioritization<br>Parameters which apply for prioritized random access procedure to a given target cell (see 38.321, section 5.1.1). |

| Conditional Presence | Explanation |
|---|---|
| SSB-CFRA | The field is mandatory present if the field resources in CFRA is set to ssb; otherwise it is not present. |

FIG. 20

PRACH Mask Index values

| PRACH Mask Index | Allowed PRACH occasion(s) of SSB |
|---|---|
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | Reserved |
| 12 | Reserved |
| 13 | Reserved |
| 14 | Reserved |
| 15 | Reserved |

FIG. 21

```
                ┌──────────────────────────────────────────────────┐
                │  Transmit a 1st preamble for a random-access     │
                │           procedure via a 1st                    │
                │                uplink BWP                        │
                │                   2910                           │
                └──────────────────────────────────────────────────┘
                                    │
                                    ▼
                ┌──────────────────────────────────────────────────┐
                │ Monitor for a random-access response to the 1st  │
                │  preamble on a 1st downlink BWP associated with  │
                │              the 1st uplink BWP                  │
                │                   2920                           │
                └──────────────────────────────────────────────────┘
                                    │
                                    ▼
                    ╱─────────────────────────────────╲
                   ╱ Random-access response received?  ╲
                   ╲            2930                   ╱
                    ╲─────────────────────────────────╱
                                    │ No
                                    ▼
                ┌──────────────────────────────────────────────────┐
                │ Select a second uplink BWP for transmission of   │
                │              a second preamble                   │
                │                   2940                           │
                └──────────────────────────────────────────────────┘
                                    │
                                    ▼
                ┌──────────────────────────────────────────────────┐
                │ Switch from the 1st downlink BWP to a 2nd        │
                │ downlink BWP associated with the 2nd uplink BWP  │
                │                   2950                           │
                └──────────────────────────────────────────────────┘
                                    │
                                    ▼
                ┌──────────────────────────────────────────────────┐
                │ Transmitting the second preamble for the         │
                │ random-access procedure via the second uplink    │
                │                    BWP.                          │
                │                   2960                           │
                └──────────────────────────────────────────────────┘
```

FIG. 29

BANDWIDTH PARTS OPERATION IN MULTIPLE ACTIVE BANDWIDTH PARTS

CROSS-REFERENCE TO RELATED APPLICATIONS

This application is a continuation of U.S. patent Ser. No. 16/575,665, filed Sep. 19, 2019, which claims the benefit of U.S. Provisional Application No. 62/737,877, filed Sep. 27, 2018, which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 16 illustrates an example random-access configuration as per an aspect of an embodiment of the present disclosure.

FIG. 17 illustrates an example random-access configuration as per an aspect of an embodiment of the present disclosure.

FIG. 18 illustrates an example random-access configuration as per an aspect of an embodiment of the present disclosure.

FIG. 19 illustrates an example random-access configuration as per an aspect of an embodiment of the present disclosure.

FIG. 20 illustrates an example random-access configuration as per an aspect of an embodiment of the present disclosure.

FIG. 21 illustrates an example random-access configuration as per an aspect of an embodiment of the present disclosure.

FIG. 29 is a flow diagram of an aspect of an example embodiment of the present disclosure.

DETAILED DESCRIPTION OF EMBODIMENTS

Figure 1:
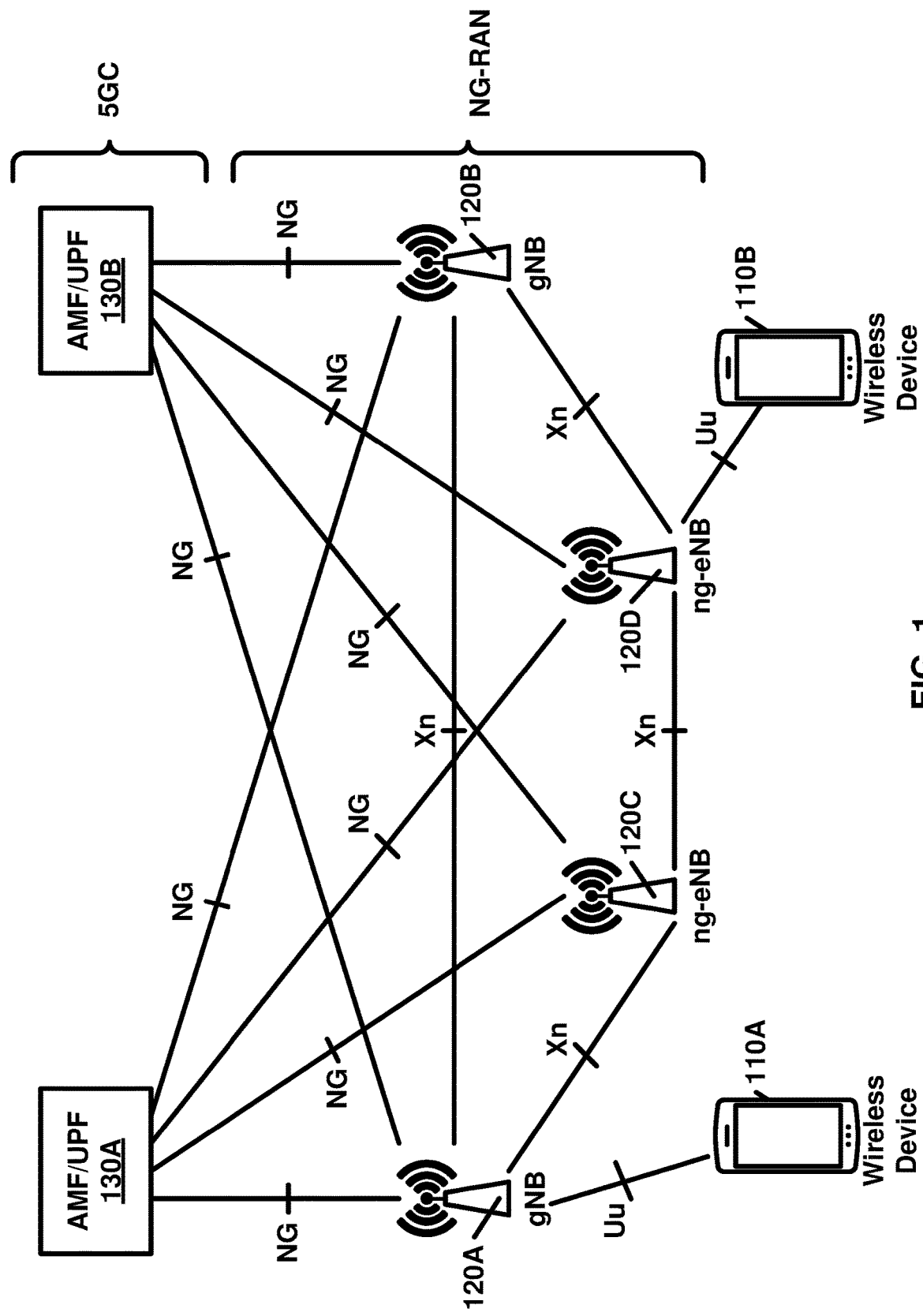
FIG. 1 is a diagram of an example RAN architecture as per an aspect of an embodiment of the present disclosure.

Example embodiments of the present disclosure enable operation of multiple active bandwidth parts. Embodiments of the technology disclosed herein may be employed in the technical field of multicarrier communication systems. More particularly, the embodiments of the technology disclosed herein may relate to multiple active bandwidth parts in a multicarrier communication system.

The following Acronyms are used throughout the present disclosure:

| | |
|---|---|
| 3GPP | 3rd Generation Partnership Project |
| 5GC | 5G Core Network |
| ACK | Acknowledgement |
| AMF | Access and Mobility Management Function |
| ARQ | Automatic Repeat Request |
| AS | Access Stratum |
| ASIC | Application-Specific Integrated Circuit |
| BA | Bandwidth Adaptation |
| BCCH | Broadcast Control Channel |
| BCH | Broadcast Channel |
| BPSK | Binary Phase Shift Keying |
| BWP | Bandwidth Part |
| CA | Carrier Aggregation |
| CC | Component Carrier |
| CCCH | Common Control CHannel |
| CDMA | Code Division Multiple Access |
| CN | Core Network |
| CP | Cyclic Prefix |
| CP-OFDM | Cyclic Prefix-Orthogonal Frequency Division Multiplex |
| C-RNTI | Cell-Radio Network Temporary Identifier |

| | |
|---|---|
| CS | Configured Scheduling |
| CSI | Channel State Information |
| CSI-RS | Channel State Information-Reference Signal |
| CQI | Channel Quality Indicator |
| CSS | Common Search Space |
| CU | Central Unit |
| DC | Dual Connectivity |
| DCCH | Dedicated Control Channel |
| DCI | Downlink Control Information |
| DL | Downlink |
| DL-SCH | Downlink Shared CHannel |
| DM-RS | DeModulation Reference Signal |
| DRB | Data Radio Bearer |
| DRX | Discontinuous Reception |
| DTCH | Dedicated Traffic Channel |
| DU | Distributed Unit |
| EPC | Evolved Packet Core |
| E-UTRA | Evolved UMTS Terrestrial Radio Access |
| E-UTRAN | Evolved-Universal Terrestrial Radio Access Network |
| FDD | Frequency Division Duplex |
| FPGA | Field Programmable Gate Arrays |
| F1-C | F1-Control plane |
| F1-U | F1-User plane |
| gNB | next generation Node B |
| HARQ | Hybrid Automatic Repeat reQuest |
| HDL | Hardware Description Languages |
| IE | Information Element |
| IP | Internet Protocol |
| LCID | Logical Channel Identifier |
| LTE | Long Term Evolution |
| MAC | Media Access Control |
| MCG | Master Cell Group |
| MCS | Modulation and Coding Scheme |
| MeNB | Master evolved Node B |
| MIB | Master Information Block |
| MME | Mobility Management Entity |
| MN | Master Node |
| NACK | Negative Acknowledgement |
| NAS | Non-Access Stratum |
| NG CP | Next Generation Control Plane |
| NGC | Next Generation Core |
| NG-C | NG-Control plane |
| ng-eNB | next generation evolved Node B |
| NG-U | NG-User plane |
| NR | New Radio |
| NR MAC | New Radio MAC |
| NR PDCP | New Radio PDCP |
| NR PHY | New Radio PHYsical |
| NR RLC | New Radio RLC |
| NR RRC | New Radio RRC |
| NSSAI | Network Slice Selection Assistance Information |
| O&M | Operation and Maintenance |
| OFDM | orthogonal Frequency Division Multiplexing |
| PBCH | Physical Broadcast CHannel |
| PCC | Primary Component Carrier |
| PCCH | Paging Control CHannel |
| PCell | Primary Cell |
| PCH | Paging CHannel |
| PDCCH | Physical Downlink Control CHannel |
| PDCP | Packet Data Convergence Protocol |
| PDSCH | Physical Downlink Shared CHannel |
| PDU | Protocol Data Unit |
| PHICH | Physical HARQ Indicator CHannel |
| PHY | PHYsical |
| PLMN | Public Land Mobile Network |
| PMI | Precoding Matrix Indicator |
| PRACH | Physical Random Access CHannel |
| PRB | Physical Resource Block |
| PSCell | Primary Secondary Cell |
| PSS | Primary Synchronization Signal |
| pTAG | primary Timing Advance Group |
| PT-RS | Phase Tracking Reference Signal |
| PUCCH | Physical Uplink Control CHannel |
| PUSCH | Physical Uplink Shared CHannel |
| QAM | Quadrature Amplitude Modulation |
| QFI | Quality of Service Indicator |
| QoS | Quality of Service |
| QPSK | Quadrature Phase Shift Keying |
| RA | Random Access |
| RACH | Random Access CHannel |
| RAN | Radio Access Network |
| RAT | Radio Access Technology |
| RA-RNTI | Random Access-Radio Network Temporary Identifier |
| RB | Resource Blocks |
| RBG | Resource Block Groups |
| RI | Rank indicator |
| RLC | Radio Link Control |
| RRC | Radio Resource Control |
| RS | Reference Signal |
| RSRP | Reference Signal Received Power |
| SCC | Secondary Component Carrier |
| SCell | Secondary Cell |
| SCG | Secondary Cell Group |
| SC-FDMA | Single Carrier-Frequency Division Multiple Access |
| SDAP | Service Data Adaptation Protocol |
| SDU | Service Data Unit |
| SeNB | Secondary evolved Node B |
| SFN | System Frame Number |
| S-GW | Serving GateWay |
| SI | System Information |
| SIB | System Information Block |
| SMF | Session Management Function |
| SN | Secondary Node |
| SpCell | Special Cell |
| SRB | Signaling Radio Bearer |
| SRS | Sounding Reference Signal |
| SS | Synchronization Signal |
| SSS | Secondary Synchronization Signal |
| sTAG | secondary Timing Advance Group |
| TA | Timing Advance |
| TAG | Timing Advance Group |
| TAI | Tracking Area Identifier |
| TAT | Time Alignment Timer |
| TB | Transport Block |
| TC-RNTI | Temporary Cell-Radio Network Temporary Identifier |
| TDD | Time Division Duplex |
| TDMA | Time Division Multiple Access |
| TTI | Transmission Time Interval |
| UCI | Uplink Control Information |
| UE | User Equipment |
| UL | Uplink |
| UL-SCH | Uplink Shared CHannel |
| UPF | User Plane Function |
| UPGW | User Plane Gateway |
| VHDL | VHSIC Hardware Description Language |
| Xn-C | Xn-Control plane |
| Xn-U | Xn-User plane |

Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
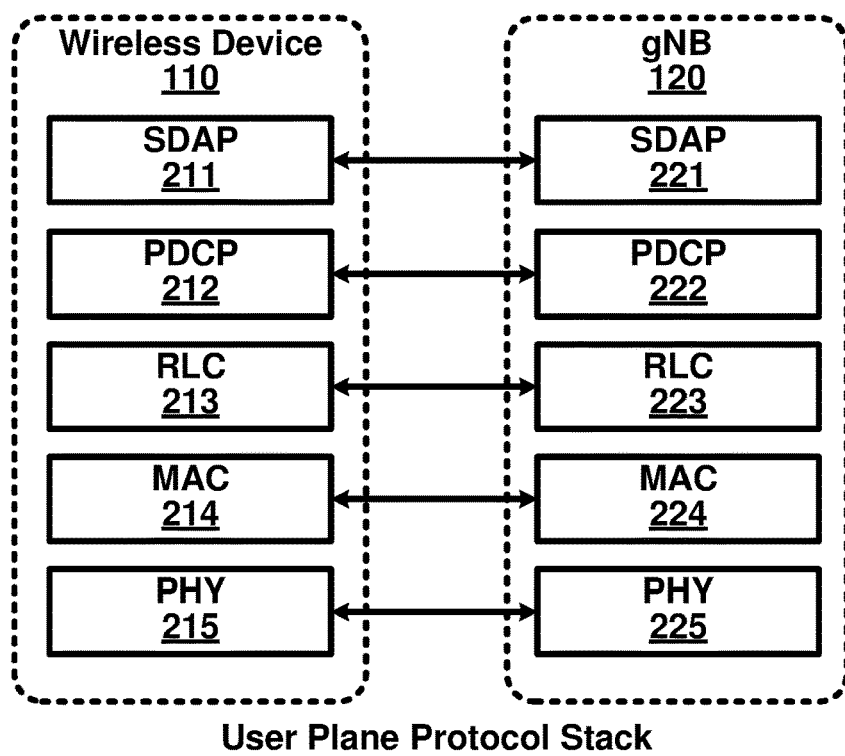
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TB s) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
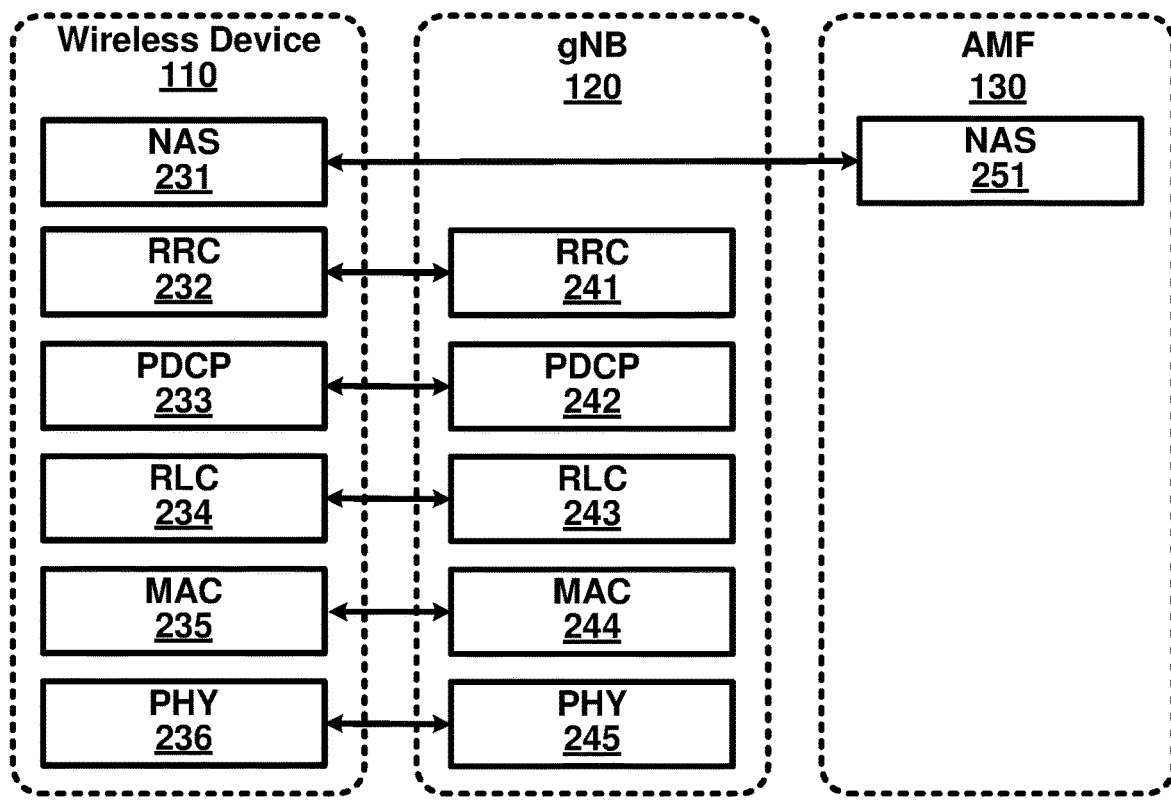
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
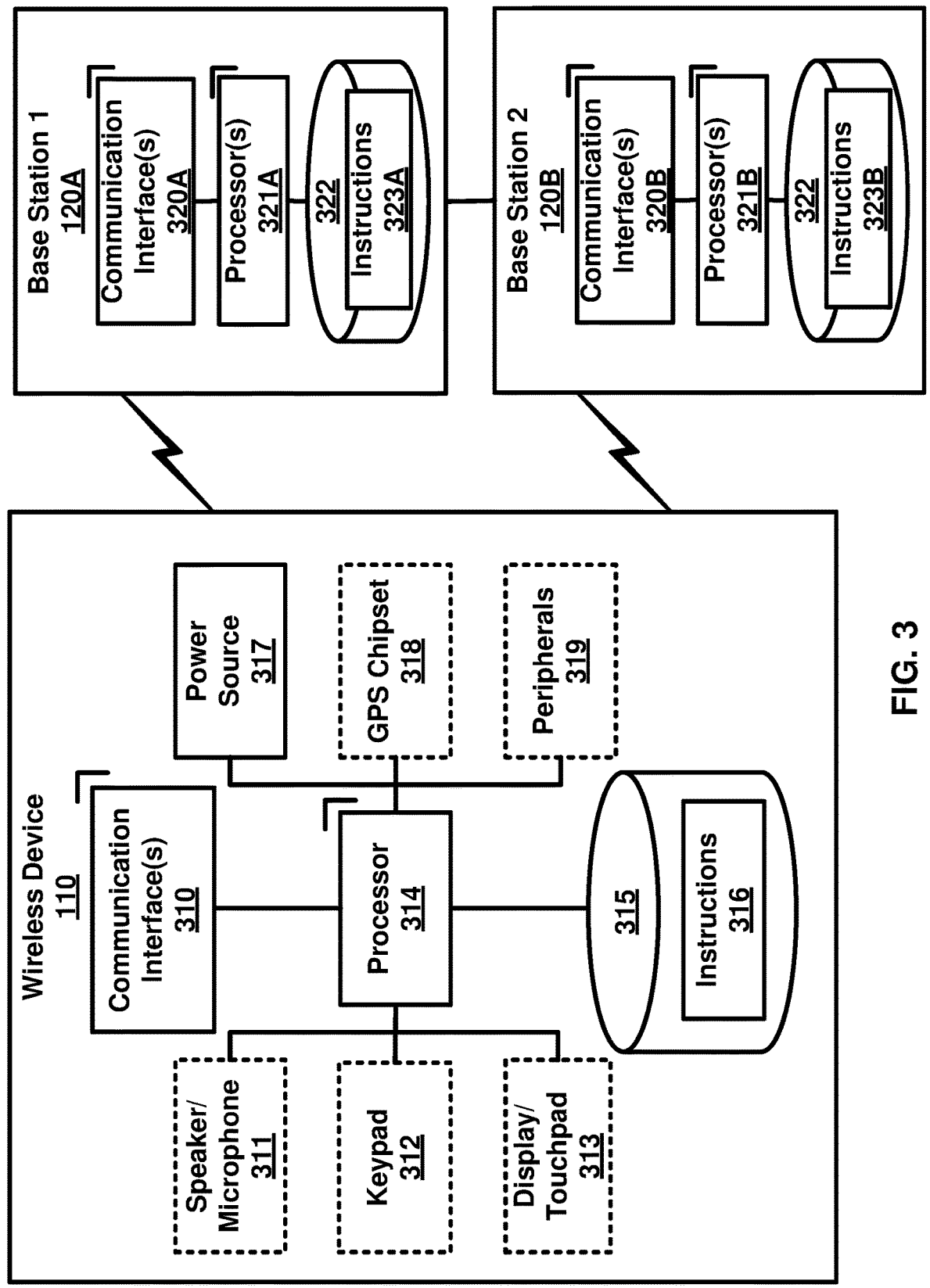
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). An other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to reestablish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
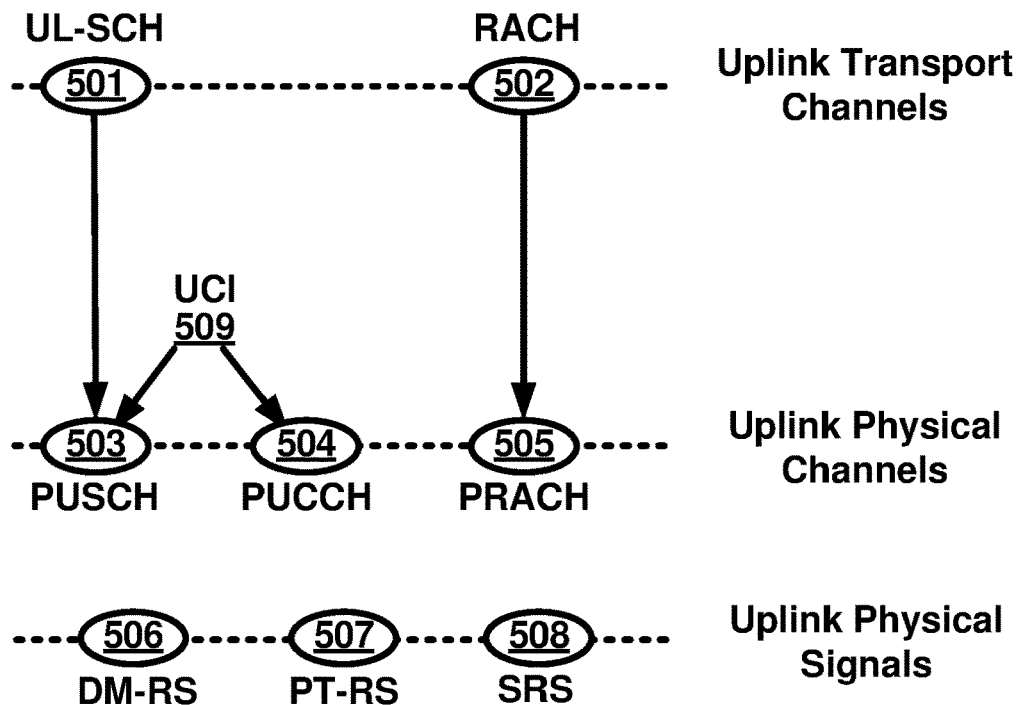
FIG. 5A is a diagram of an example uplink channel mapping and example uplink physical signals as per an aspect of an embodiment of the present disclosure.
Figure 5B:
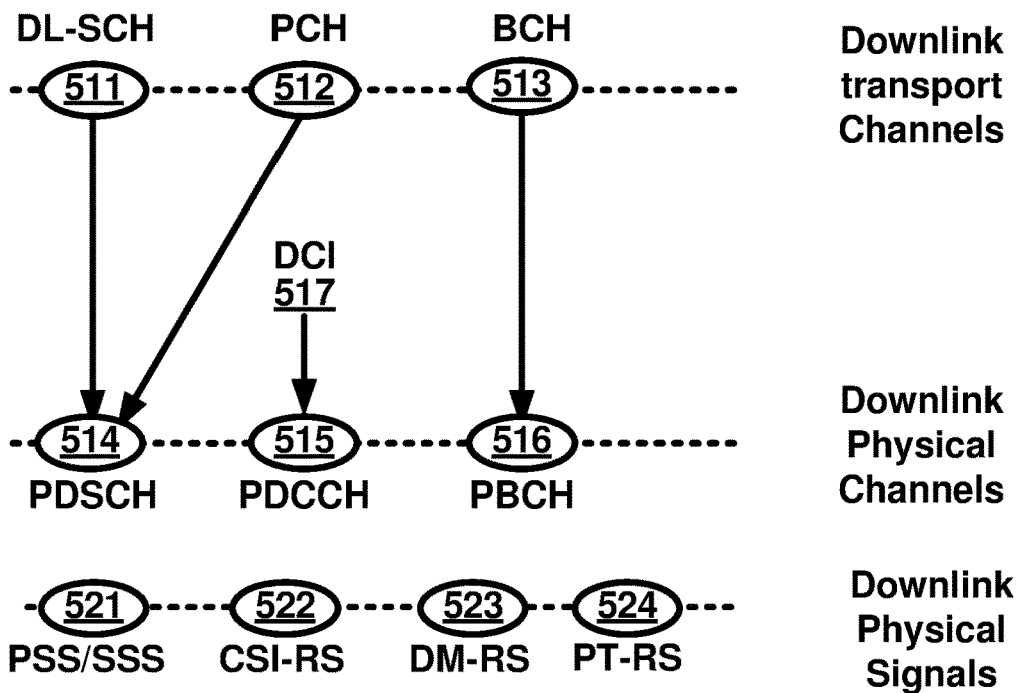
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SS/PBCH blocks when the downlink CSI-RS 522 and SS/PBCH blocks are spatially quasi co-located and resource elements associated with the downlink CSI-RS 522 are the outside of PRBs configured for SS/PBCH blocks.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
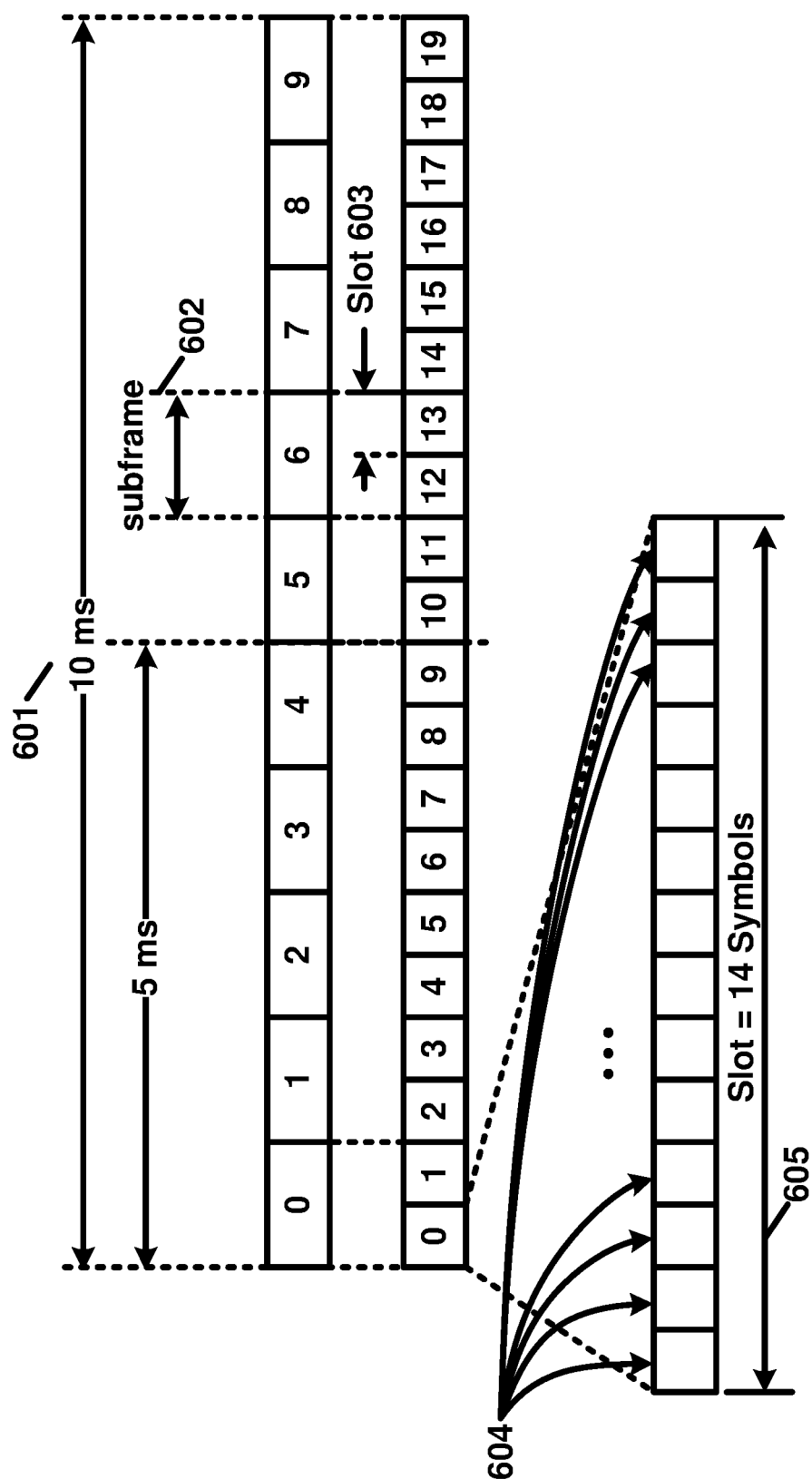
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
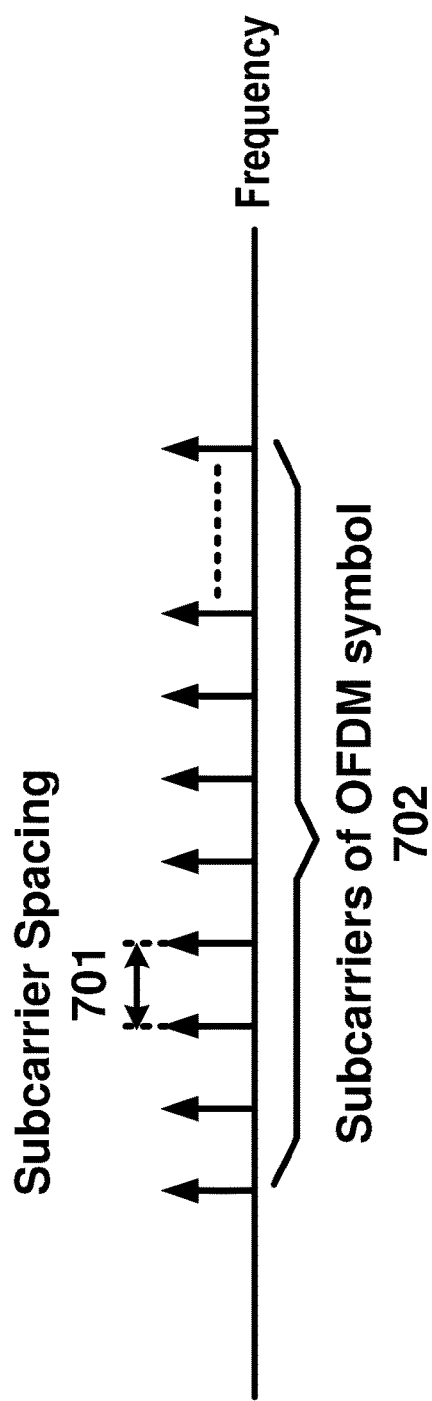
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
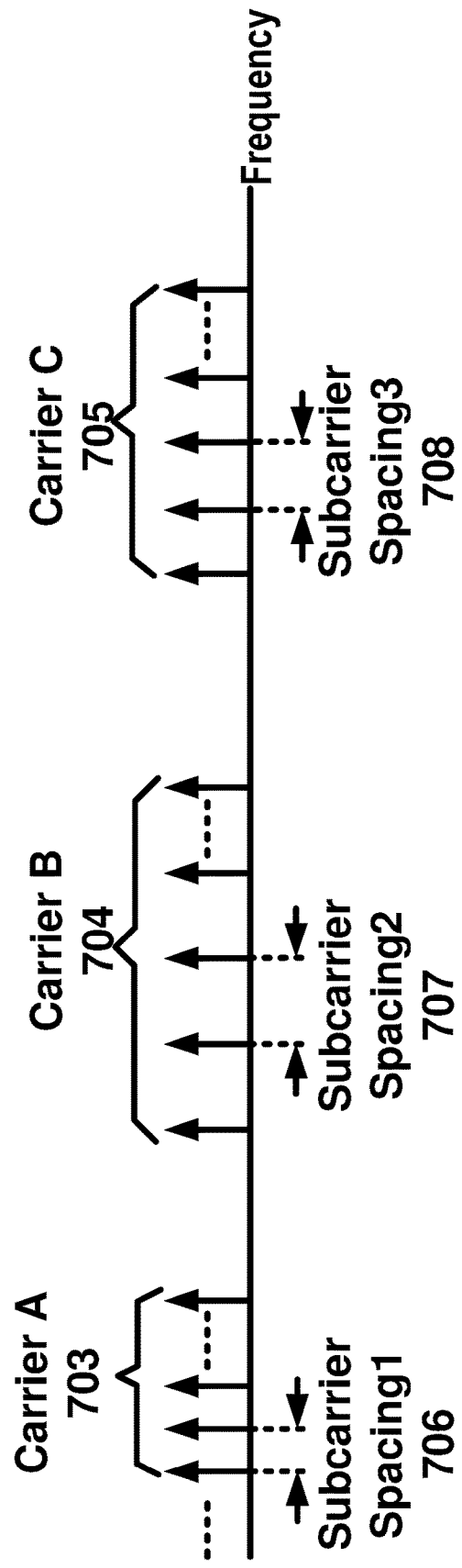

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
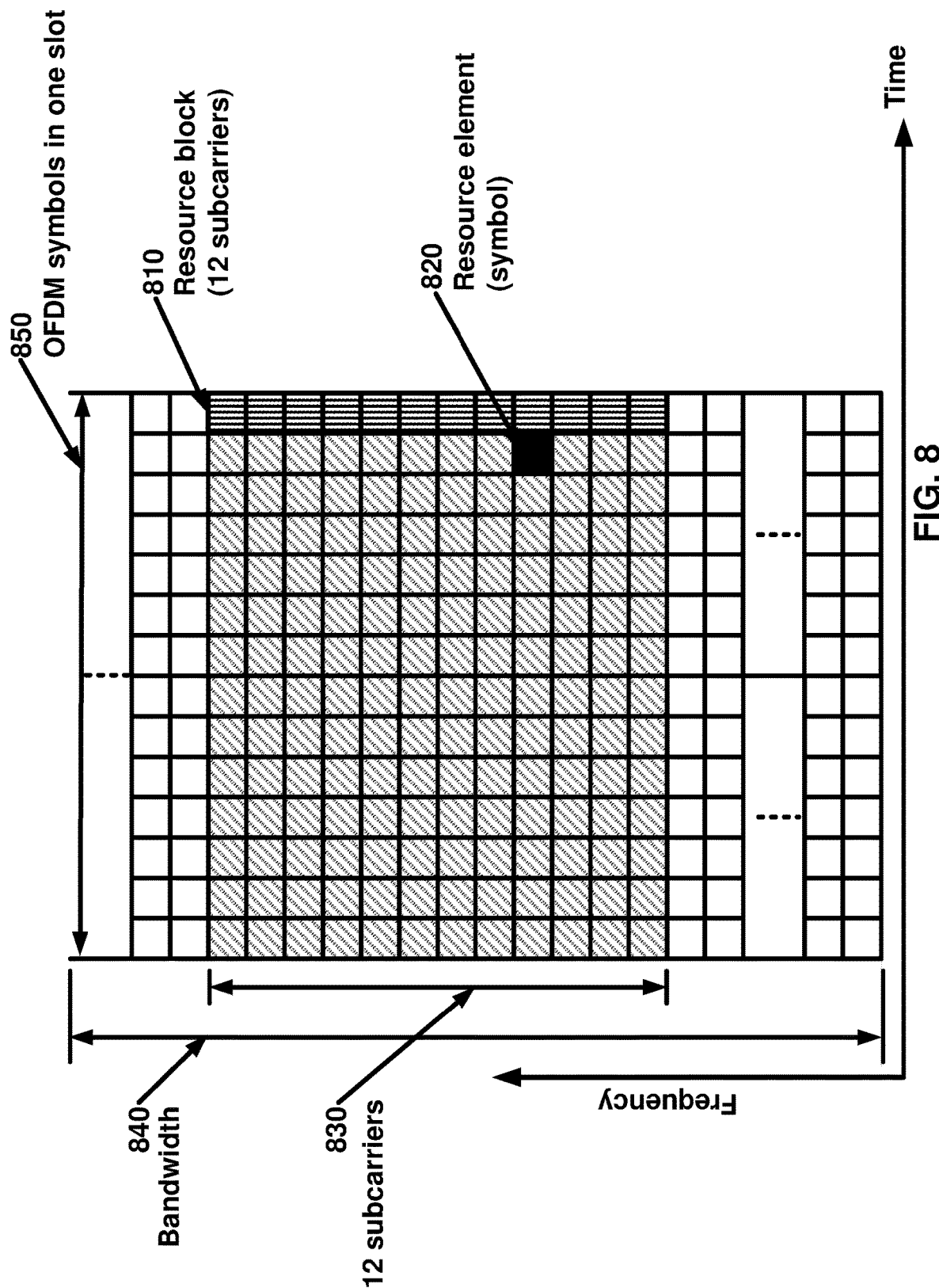
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, and/or timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
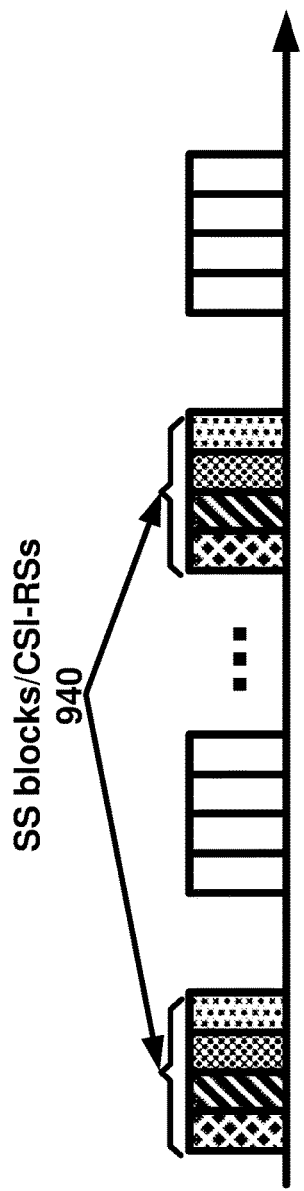
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
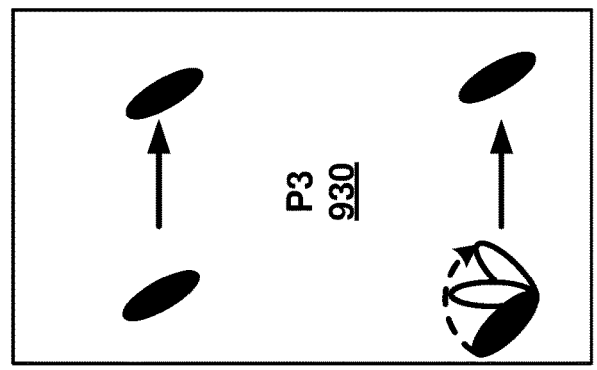
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
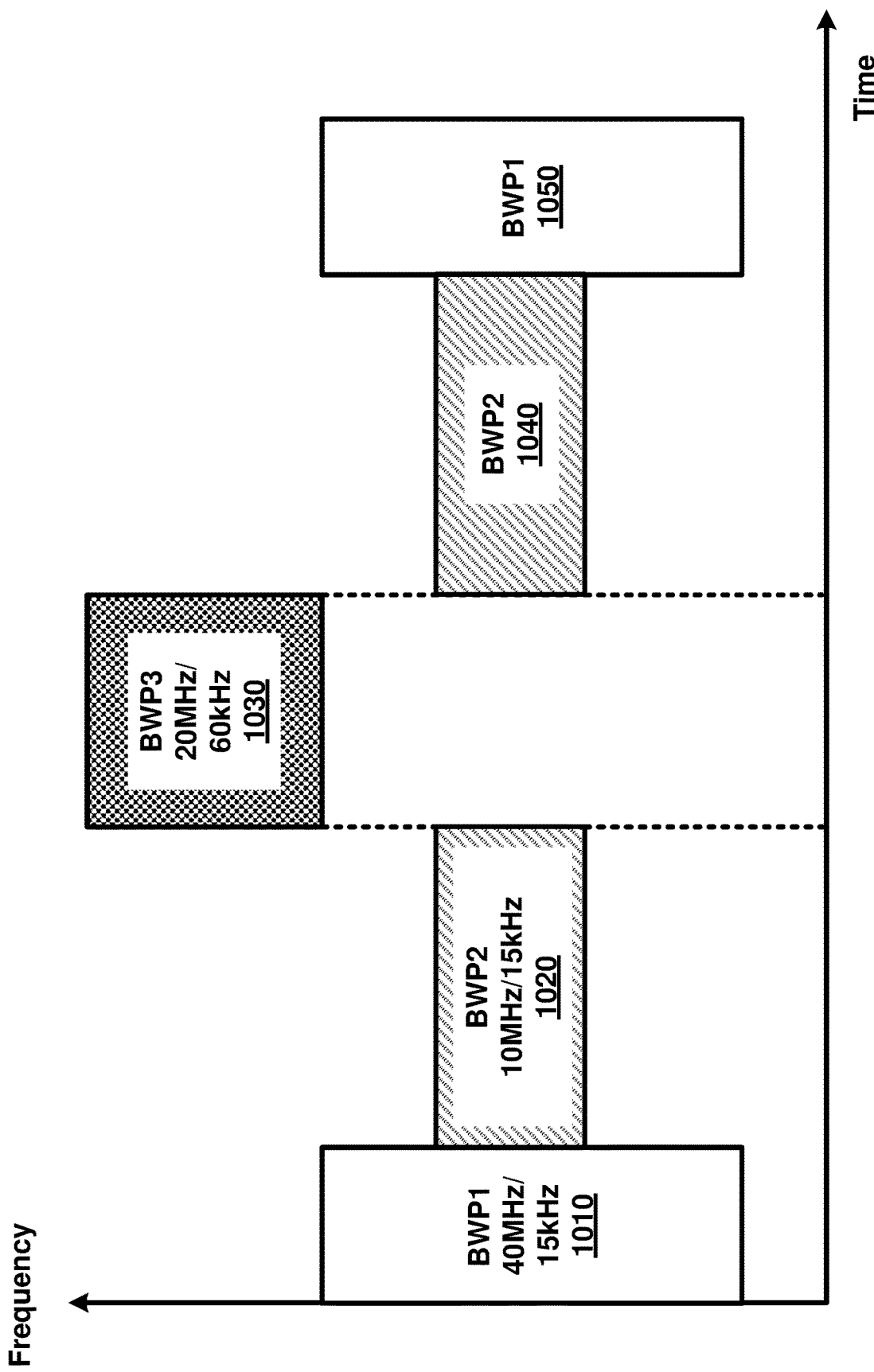
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base station may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
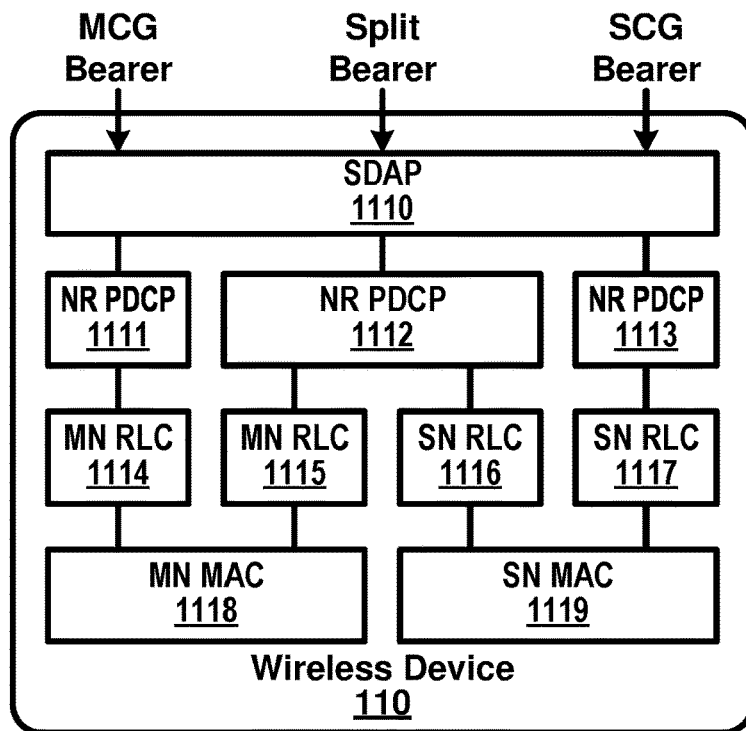
FIG. 11A, and FIG. 11B are diagrams of an example multi connectivity as per an aspect of an embodiment of the present disclosure.
Figure 11B:
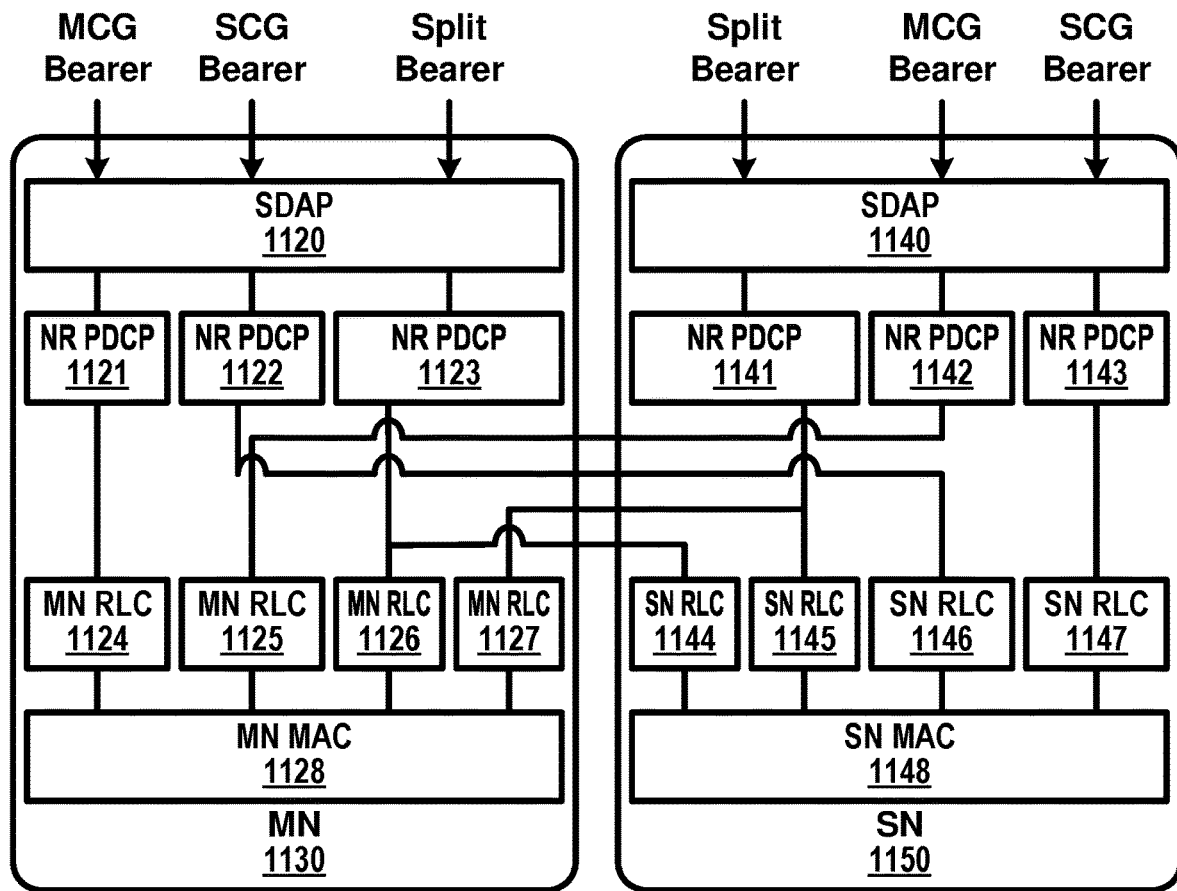

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not be supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
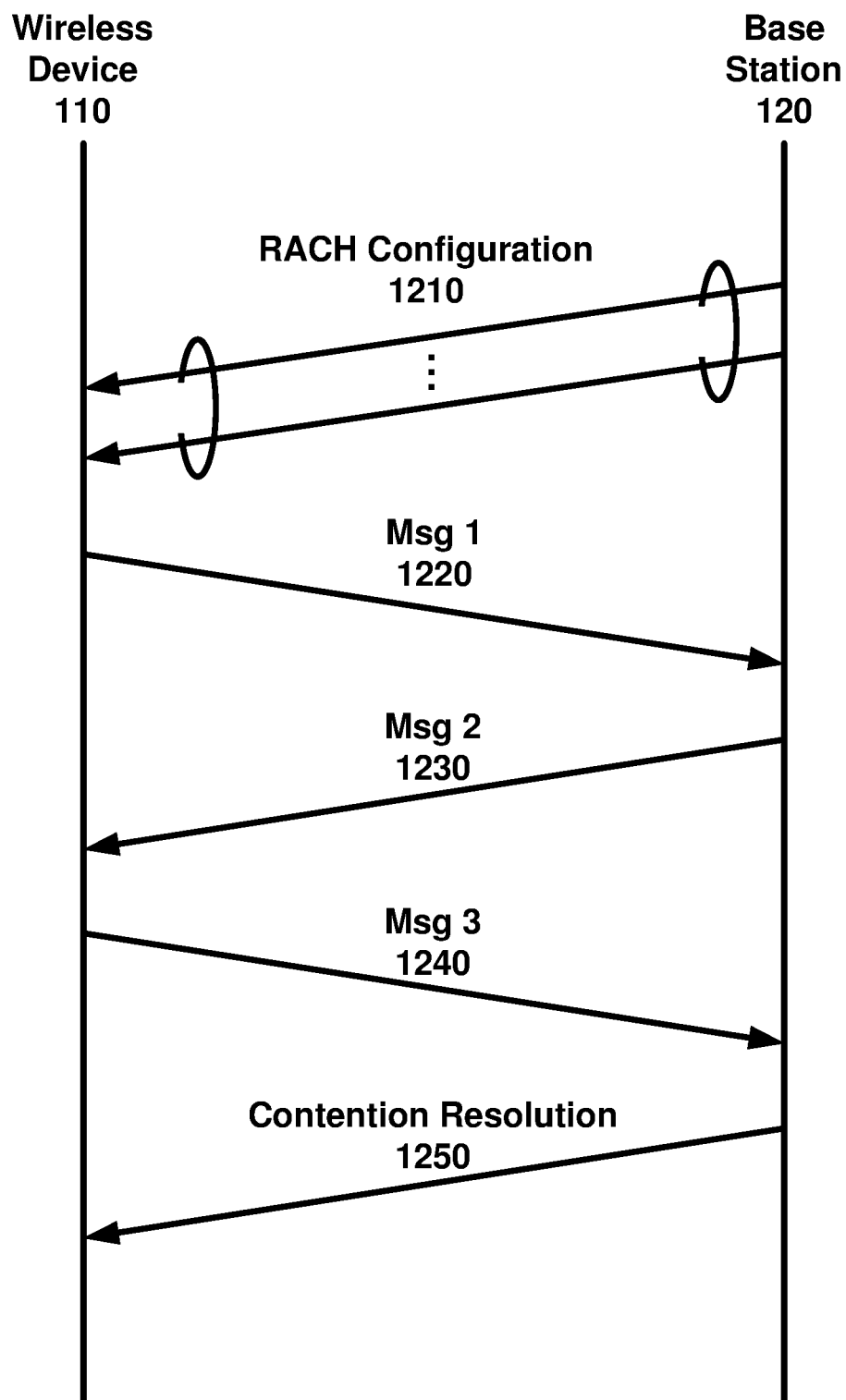
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
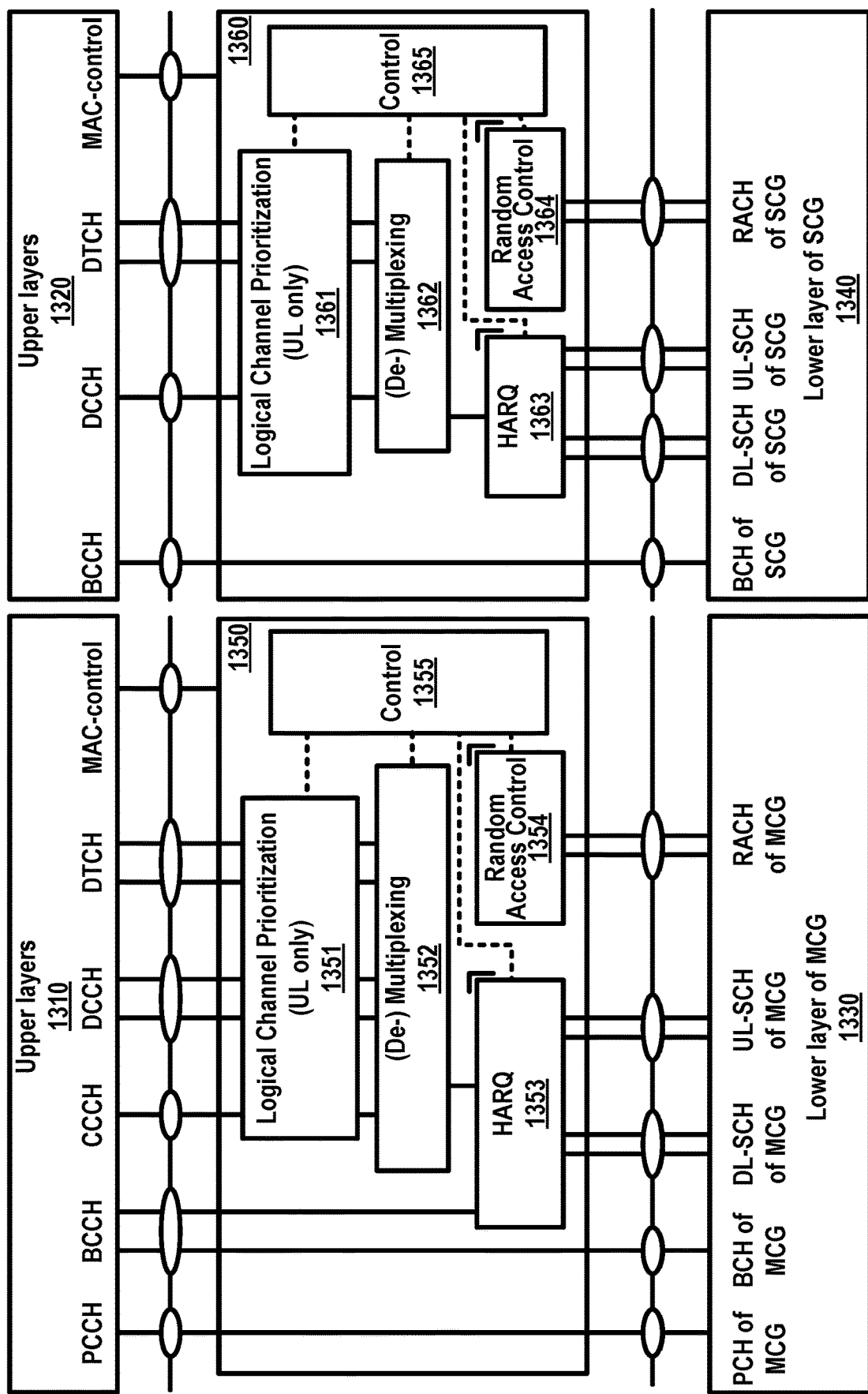
FIG. 13 illustrates a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
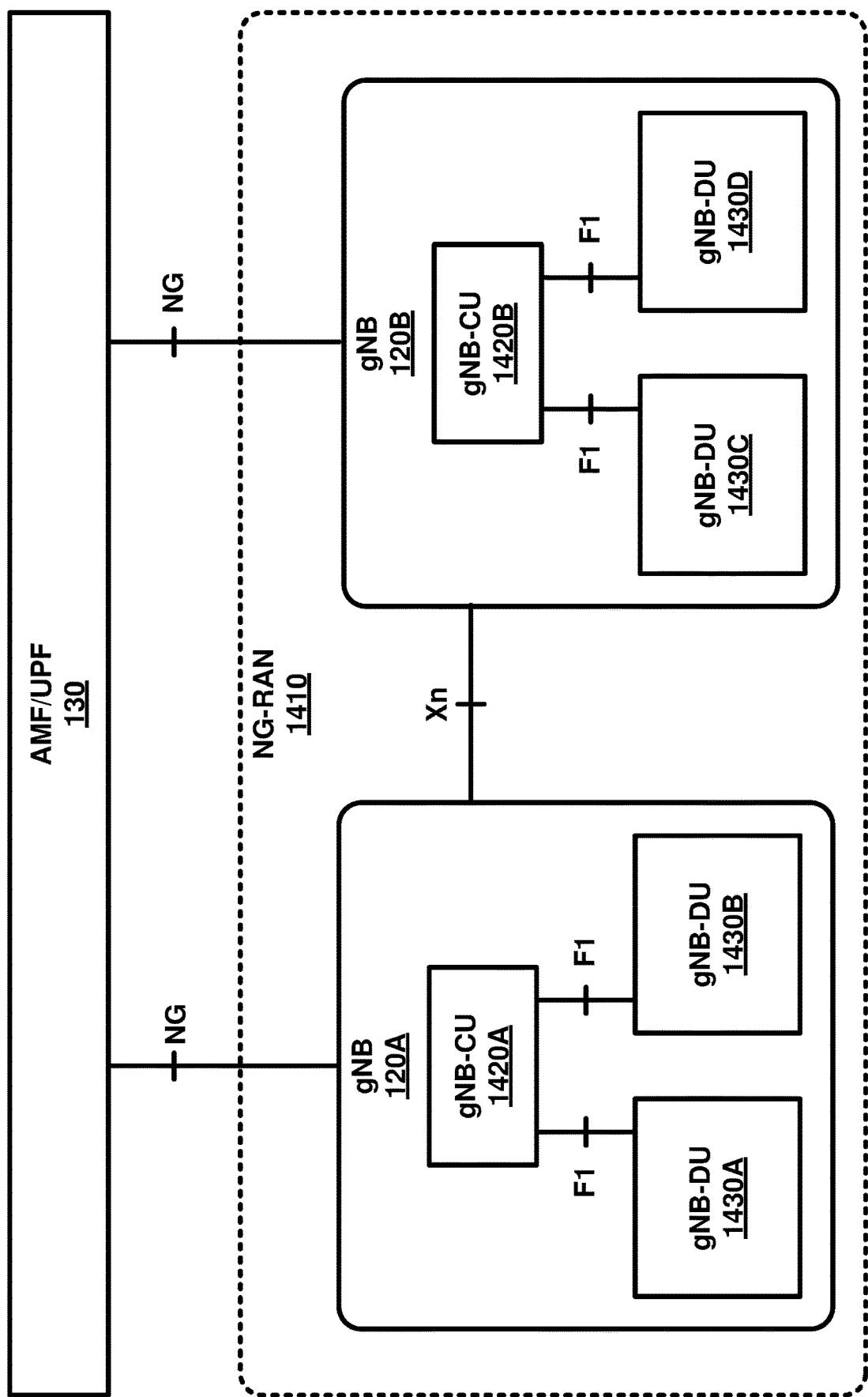
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
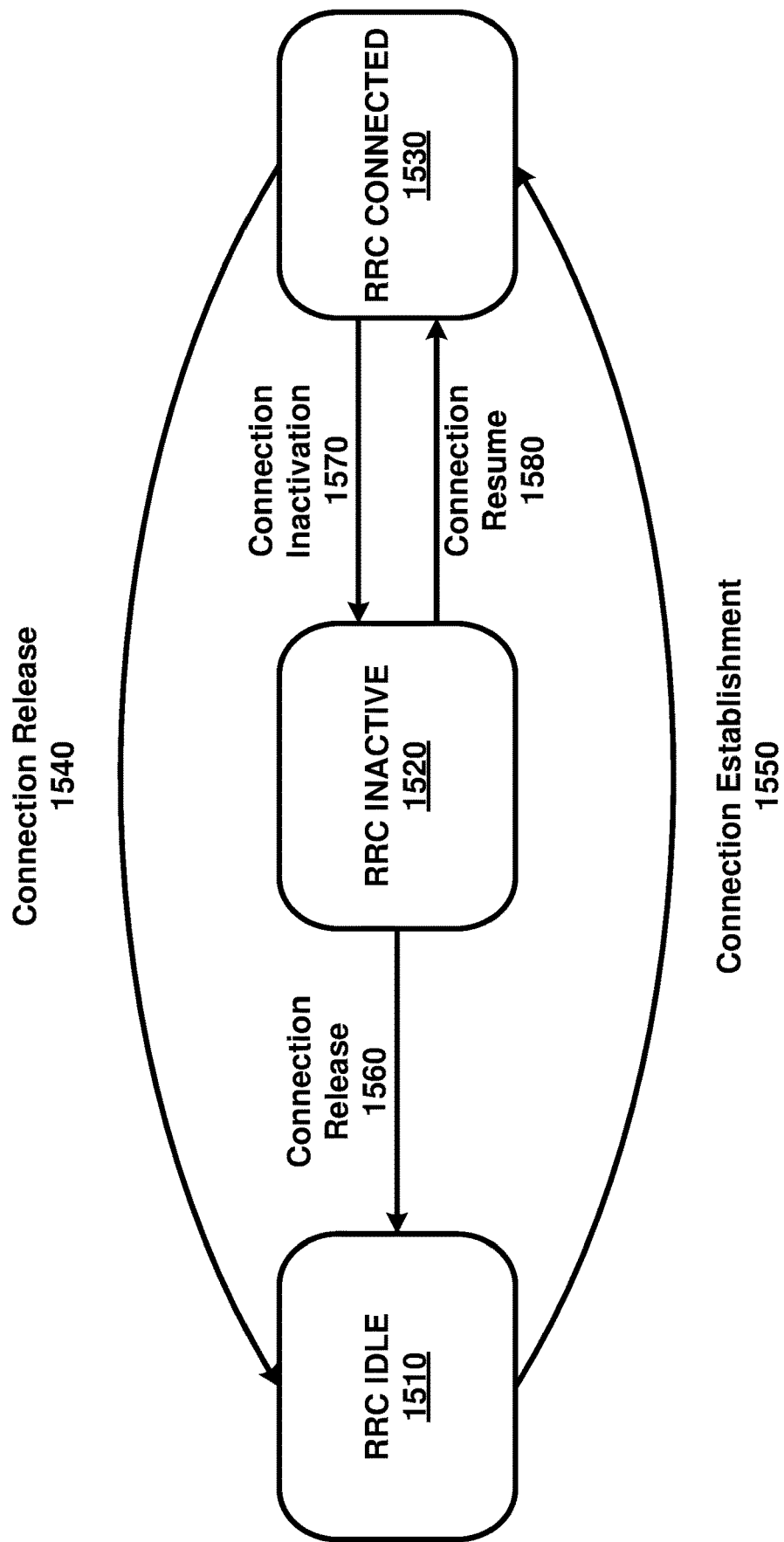
FIG. 15 illustrates example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

In an example, a gNB may transmit a DCI via a PDCCH for at least one of: scheduling assignment/grant; slot format notification; pre-emption indication; and/or power-control commends. More specifically, the DCI may comprise at least one of: identifier of a DCI format; downlink scheduling assignment(s); uplink scheduling grant(s); slot format indicator; pre-emption indication; power-control for PUCCH/PUSCH; and/or power-control for SRS.

In an example, a downlink scheduling assignment DCI may comprise parameters indicating at least one of: identifier of a DCI format; PDSCH resource indication; transport format; HARQ information; control information related to multiple antenna schemes; and/or a command for power control of the PUCCH.

In an example, an uplink scheduling grant DCI may comprise parameters indicating at least one of: identifier of a DCI format; PUSCH resource indication; transport format; HARQ related information; and/or a power control command of the PUSCH.

In an example, different types of control information may correspond to different DCI message sizes. For example, supporting multiple beams and/or spatial multiplexing in the spatial domain and noncontiguous allocation of RBs in the frequency domain may require a larger scheduling message, in comparison with an uplink grant allowing for frequency-contiguous allocation. DCI may be categorized into different DCI formats, where a format corresponds to a certain message size and/or usage.

In an example, a wireless device may monitor one or more PDCCH for detecting one or more DCI with one or more DCI format, in common search space or wireless device-specific search space. In an example, a wireless device may monitor PDCCH with a limited set of DCI format, to save power consumption. The more DCI format to be detected, the more power be consumed at the wireless device.

In an example, the information in the DCI formats for downlink scheduling may comprise at least one of: identifier of a DCI format; carrier indicator; frequency domain resource assignment; time domain resource assignment; bandwidth part indicator; HARQ process number; one or more MCS; one or more NDI; one or more RV; MIMO related information; Downlink assignment index (DAI); PUCCH resource indicator; PDSCH-to-HARQ_feedback timing indicator; TPC for PUCCH; SRS request; and padding if necessary. In an example, the MIMO related information may comprise at least one of: PMI; precoding information; transport block swap flag; power offset between PDSCH and reference signal; reference-signal scrambling sequence; number of layers; and/or antenna ports for the transmission; and/or Transmission Configuration Indication (TCI).

In an example, the information in the DCI formats used for uplink scheduling may comprise at least one of: an identifier of a DCI format; carrier indicator; bandwidth part indication; resource allocation type; frequency domain resource assignment; time domain resource assignment; MCS; NDI; Phase rotation of the uplink DMRS; precoding information; CSI request; SRS request; Uplink index/DAI; TPC for PUSCH; and/or padding if necessary.

In an example, a gNB may perform CRC scrambling for a DCI, before transmitting the DCI via a PDCCH. The gNB may perform CRC scrambling by binary addition of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, or TPC-SRS-RNTI) and the CRC bits of the DCI. The wireless device may check the CRC bits of the DCI, when detecting the DCI. The wireless device may receive the DCI when the CRC is scrambled by a sequence of bits that is the same as the at least one wireless device identifier.

In an example, in order to support wide bandwidth operation, a gNB may transmit one or more PDCCH in different control resource sets (coresets). A gNB may transmit one or more RRC message comprising configuration parameters of one or more coresets. A coreset may comprise at least one of: a first OFDM symbol; a number of consecutive OFDM symbols; a set of resource blocks; a CCE-to-REG mapping. In an example, a gNB may transmit a PDCCH in a dedicated coreset for particular purpose, for example, for beam failure recovery confirmation.

In an example, a wireless device may monitor PDCCH for detecting DCI in one or more configured coresets, to reduce the power consumption.

A gNB may transmit one or more MAC PDU to a wireless device. In an example, a MAC PDU may be a bit string that is byte aligned (e.g., multiple of eight bits) in length. In an example, bit strings may be represented by tables in which the most significant bit is the leftmost bit of the first line of the table, and the least significant bit is the rightmost bit on the last line of the table, and more generally, the bit string may be read from the left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., multiple of eight bits) in length. In an example, a MAC SDU may be included into a MAC PDU from the first bit onward.

In an example, a MAC CE may be a bit string that is byte aligned (e.g., multiple of eight bits) in length.

In an example, a MAC subheader may be a bit string that is byte aligned (e.g., multiple of eight bits) in length. In an example, a MAC subheader may be placed immediately in front of the corresponding MAC SDU, or MAC CE, or padding.

In an example, a MAC entity may ignore a value of reserved bits in a DL MAC PDU.

In an example, a MAC PDU may comprise one or more MAC subPDUs. a MAC subPDU of the one or more MAC subPDUs may comprise at least one of: a MAC subheader only (including padding); a MAC subheader and a MAC SDU; a MAC subheader and a MAC CE; and/or a MAC subheader and padding. In an example, the MAC SDU may be of variable size. In an example, a MAC subheader may correspond to a MAC SDU, or a MAC CE, or padding.

In an example, a MAC subheader may comprise: an R field with one bit; a F field with one bit in length; a LCID field with multiple bits in length; a L field with multiple bits in length, when the MAC subheader corresponds to a MAC SDU, or a variable-sized MAC CE, or padding.

In an example, a MAC subheader may comprise an eight-bit L field. In the example, the LCID field may have six bits in length, and the L field may have eight bits in length. In an example, a MAC subheader may comprise a sixteen-bit L field. In the example, the LCID field may have six bits in length, and the L field may have sixteen bits in length.

In an example, a MAC subheader may comprise: a R field with two bits in length; and a LCID field with multiple bits in length, when the MAC subheader corresponds to a fixed sized MAC CE, or padding. In an example, the LCID field may have six bits in length, and the R field may have two bits in length.

In an example DL MAC PDU, multiple MAC CEs may be placed together. A MAC subPDU comprising MAC CE may be placed before any MAC subPDU comprising a MAC SDU, or a MAC subPDU comprising padding.

In an example UL MAC PDU, multiple MAC CEs may be placed together. A MAC subPDU comprising MAC CE may be placed after all MAC subPDU comprising a MAC SDU. The MAC subPDU may be placed before a MAC subPDU comprising padding.

In an example, a MAC entity of a gNB may transmit to a MAC entity of a wireless device one or more MAC CEs. In an example, multiple LCIDs may be associated with the one or more MAC CEs. In the example, the one or more MAC CEs may comprise at least one of: a SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a UE contention resolution identity MAC CE; a timing advance command MAC CE; a DRX command MAC CE; a Long DRX command MAC CE; a SCell activation/deactivation MAC CE (1 Octet); a SCell activation/deactivation MAC CE (4 Octet); and/or a duplication activation/deactivation MAC CE. In an example, a MAC CE may have a LCID in the corresponding MAC subheader. Different MAC CE may have different LCID in the corresponding MAC subheader. For example, the LCID with 111011 in a MAC subheader may indicate a MAC CE associated with the MAC subheader is a long DRX command MAC CE.

In an example, the MAC entity of the wireless device may transmit to the MAC entity of the gNB one or more MAC CEs. In an example, the one or more MAC CEs may comprise at least one of: a short buffer status report (BSR) MAC CE; a long BSR MAC CE; a C-RNTI MAC CE; a configured grant confirmation MAC CE; a single entry PHR MAC CE; a multiple entry PHR MAC CE; a short truncated BSR; and/or a long truncated BSR. In an example, a MAC CE may have a LCID in the corresponding MAC subheader. Different MAC CE may have different LCID in the corresponding MAC subheader. For example, the LCID with 111011 in a MAC subheader may indicate a MAC CE associated with the MAC subheader is a short-truncated command MAC CE.

In a carrier aggregation (CA), two or more component carriers (CCs) may be aggregated. A wireless device may simultaneously receive or transmit on one or more CCs depending on capabilities of the wireless device. In an example, the CA may be supported for contiguous CCs. In an example, the CA may be supported for non-contiguous CCs.

When configured with a CA, a wireless device may have one RRC connection with a network. During an RRC connection establishment/re-establishment/handover, a cell providing a NAS mobility information may be a serving cell. During an RRC connection re-establishment/handover procedure, a cell providing a security input may be a serving cell. In an example, the serving cell may be referred to as a primary cell (PCell). In an example, a gNB may transmit, to a wireless device, one or more messages comprising configuration parameters of a plurality of one or more secondary cells (SCells), depending on capabilities of the wireless device.

When configured with CA, a base station and/or a wireless device may employ an activation/deactivation mechanism of an SCell for an efficient battery consumption. When a wireless device is configured with one or more SCells, a gNB may activate or deactivate at least one of the one or more SCells. Upon configuration of an SCell, the SCell may be deactivated.

In an example, a wireless device may activate/deactivate an SCell in response to receiving an SCell Activation/Deactivation MAC CE.

In an example, a base station may transmit, to a wireless device, one or more messages comprising an sCellDeactivationTimer timer. In an example, a wireless device may deactivate an SCell in response to an expiry of the sCellDeactivationTimer timer.

When a wireless device receives an SCell Activation/Deactivation MAC CE activating an SCell, the wireless device may activate the SCell. In response to the activating the SCell, the wireless device may perform operations comprising SRS transmissions on the SCell, CQI/PMI/RI/CRI reporting for the SCell on a PCell, PDCCH monitoring on the SCell, PDCCH monitoring for the SCell on the PCell, and/or PUCCH transmissions on the SCell.

In an example, in response to the activating the SCell, the wireless device may start or restart an sCellDeactivationTimer timer associated with the SCell. The wireless device may start the sCellDeactivationTimer timer in the slot when the SCell Activation/Deactivation MAC CE has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

In an example, when a wireless device receives an SCell Activation/Deactivation MAC CE deactivating an activated SCell, the wireless device may deactivate the activated SCell.

In an example, when an sCellDeactivationTimer timer associated with an activated SCell expires, the wireless device may deactivate the activated SCell. In response to the deactivating the activated SCell, the wireless device may stop the sCellDeactivationTimer timer associated with the activated SCell. In an example, in response to the deactivating the activated SCell, the wireless device may clear one or more configured downlink assignments and/or one or more configured uplink grant Type 2 associated with the activated SCell. In an example, in response to the deactivating the activated SCell, the wireless device may further suspend one or more configured uplink grant Type 1 associated with the activated SCell. The wireless device may flush HARQ buffers associated with the activated SCell.

In an example, when an SCell is deactivated, a wireless device may not perform operations comprising transmitting SRS on the SCell, reporting CQI/PMI/RI/CRI for the SCell on a PCell, transmitting on UL-SCH on the SCell, transmitting on RACH on the SCell, monitoring at least one first PDCCH on the SCell, monitoring at least one second PDCCH for the SCell on the PCell, transmitting a PUCCH on the SCell.

In an example, when at least one first PDCCH on an activated SCell indicates an uplink grant or a downlink assignment, a wireless device may restart an sCellDeactivationTimer timer associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart an sCellDeactivationTimer timer associated with the activated SCell.

In an example, when an SCell is deactivated, if there is an ongoing random access procedure on the SCell, a wireless device may abort the ongoing random access procedure on the SCell.

An example SCell Activation/Deactivation MAC CE may comprise one octet. A first MAC PDU subheader with a first LCID may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g. one).

An example SCell Activation/Deactivation MAC CE may comprise four octets. A second MAC PDU subheader with a second LCID may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g. 31) and a fourth number of R-fields (e.g. 1).

In an example, a $C_i$ field may indicate an activation/deactivation status of an SCell with an SCell index i, if a SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In an example, an R field may indicate a reserved bit. The R field may be set to zero.

A base station (gNB) may configure a wireless device (UE) with uplink (UL) bandwidth parts (BWPs) and downlink (DL) BWPs to enable bandwidth adaptation (BA) on a PCell. If carrier aggregation is configured, the gNB may configure the UE with at least DL BWP(s) (i.e. there may be no UL BWPS in the UL) to enable BA on an SCell. For the PCell, a first initial BWP may be a first BWP used for initial access. For the SCell, a second initial BWP is a second BWP configured for the UE to first operate at the SCell when the SCell is activated.

In paired spectrum (e.g. FDD), a first DL and a first UL can switch BWP independently. In unpaired spectrum (e.g. TDD), a second DL and a second UL switch BWP simultaneously. Switching between configured BWPs may happen by means of a DCI or an inactivity timer. When the inactivity timer is configured for a serving cell, an expiry of the inactivity timer associated to that cell may switch an active BWP to a default BWP. The default BWP may be configured by the network.

In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may enable reasonable UE battery consumption. BWPs other than the one UL BWP and the one DL BWP that the UE may be configured with may be deactivated. On deactivated BWPs, the UE may not monitor PDCCH, may not transmit on PUCCH, PRACH and UL-SCH.

In an example, a Serving Cell may be configured with at most a first number (e.g., four) BWPs. In an example, for an activated Serving Cell, there may be one active BWP at any point in time.

In an example, a BWP switching for a Serving Cell may be used to activate an inactive BWP and deactivate an active BWP at a time. In an example, the BWP switching may be controlled by a PDCCH indicating a downlink assignment or an uplink grant. In an example, the BWP switching may be controlled by an inactivity timer (e.g. bandwidthpartInactivityTimer). In an example, the BWP switching may be controlled by a MAC entity in response to initiating a Random Access procedure. Upon addition of SpCell or activation of an SCell, one BWP may be initially active without receiving a PDCCH indicating a downlink assignment or an uplink grant. The active BWP for a Serving Cell may be indicated by RRC and/or PDCCH. In an example, for unpaired spectrum, a DL BWP may be paired with a UL BWP, and BWP switching may be common for both UL and DL.

In an example, a MAC entity may apply normal operations on an active BWP for an activated Serving Cell configured with a BWP including: transmitting on UL-SCH; transmitting on RACH; monitoring a PDCCH; transmitting PUCCH; receiving DL-SCH; (re-) initializing any suspended configured uplink grants of configured grant Type 1 according to a stored configuration, if any, and to start in a symbol based on some procedure.

In an example, on an inactive BWP for each activated Serving Cell configured with a BWP, a MAC entity may not transmit on UL-SCH; may not transmit on RACH; may not monitor a PDCCH; may not transmit PUCCH; may not transmit SRS, may not receive DL-SCH; may clear any configured downlink assignment and configured uplink grant of configured grant Type 2; may suspend any configured uplink grant of configured Type 1.

In an example, upon initiation of a Random Access procedure, if PRACH resources are configured for an active UL BWP, a MAC entity may perform the Random Access procedure on an active DL BWP and the active UL BWP. In an example, upon initiation of a Random Access procedure, if PRACH resources are not configured for an active UL BWP, a MAC entity may switch to an initial DL BWP and an initial UL BWP. In response to the switching, the MAC entity may perform the Random Access procedure on the initial DL BWP and the initial UL BWP.

In an example, if a MAC entity receives a PDCCH for a BWP switching of a serving cell while a Random Access procedure associated with this serving cell is not ongoing, a UE may perform the BWP switching to a BWP indicated by the PDCCH.

In an example, if a MAC entity receives a PDCCH for a BWP switching while a Random Access procedure is ongoing in the MAC entity, it may be up to UE implementation whether to switch BWP or ignore the PDCCH for the BWP switching. In an example, if the MAC entity decides to perform the BWP switching, the MAC entity may stop the ongoing Random Access procedure and initiate a second Random Access procedure on a new activated BWP. In an example, if the MAC decides to ignore the PDCCH for the BWP switching, the MAC entity may continue with the ongoing Random Access procedure on the active BWP.

In an example, if a MAC entity receives a PDCCH for a BWP switching addressed to a C-RNTI for a successful completion of a Random Access procedure, a UE may perform the BWP switching to a BWP indicated by the PDCCH.

In an example, if a BWP-InactivityTimer is configured, for an activated Serving Cell, if a Default-DL-BWP is configured, and an active DL BWP is not a BWP indicated by the Default-DL-BWP; or if the Default-DL-BWP is not configured, and the active DL BWP is not the initial BWP: if a PDCCH addressed to C-RNTI or CS-RNTI indicating downlink assignment or uplink grant is received on the active BWP: if there is not an ongoing random access procedure associated with the activated Serving Cell, the MAC entity may start or restart the BWP-InactivityTimer associated with the active DL BWP.

In an example, if a BWP-InactivityTimer is configured, for an activated Serving Cell, if a Default-DL-BWP is configured, and an active DL BWP is not a BWP indicated by the Default-DL-BWP; or if the Default-DL-BWP is not configured, and the active DL BWP is not the initial BWP: if a MAC-PDU is transmitted in a configured uplink grant or received in a configured downlink assignment; if there is not an ongoing random access procedure associated with the activated Serving Cell, the MAC entity may start or restart the BWP-InactivityTimer associated with the active DL BWP.

In an example, if a BWP-InactivityTimer is configured, for an activated Serving Cell, if a Default-DL-BWP is configured, and an active DL BWP is not a BWP indicated by the Default-DL-BWP; or if the Default-DL-BWP is not configured, and the active DL BWP is not the initial BWP: if a PDCCH addressed to C-RNTI or CS-RNTI indicating downlink assignment or uplink grant is received on the active BWP; or if a MAC-PDU is transmitted in a configured uplink grant or received in a configured downlink assignment: if an ongoing random access procedure associated with the activated Serving Cell is successfully completed in response to receiving the PDCCH addressed to a C-RNTI, the MAC entity may start or restart the BWP-InactivityTimer associated with the active DL BWP.

In an example, if a BWP-InactivityTimer is configured, for an activated Serving Cell, if a Default-DL-BWP is configured, and an active DL BWP is not a BWP indicated by the Default-DL-BWP; or if the Default-DL-BWP is not configured, and the active DL BWP is not the initial BWP: if a PDCCH for a BWP switching is received on the active DL BWP, a MAC entity may start or restart the BWP-InactivityTimer associated with the active DL BWP in response to switching the active BWP.

In an example, if BWP-InactivityTimer is configured, for an activated Serving Cell, if the Default-DL-BWP is configured, and the active DL BWP is not the BWP indicated by the Default-DL-BWP; or if the Default-DL-BWP is not configured, and the active DL BWP is not the initial BWP: if Random Access procedure is initiated, the MAC entity may stop the BWP-InactivityTimer associated with the active DL BWP of the activated Serving Cell. If the activated Serving Cell is an SCell (other than a PSCell), the MAC entity may stop a second BWP-InactivityTimer associated with a second active DL BWP of an SpCell.

In an example, if BWP-InactivityTimer is configured, for an activated Serving Cell, if the Default-DL-BWP is configured, and the active DL BWP is not the BWP indicated by the Default-DL-BWP; or if the Default-DL-BWP is not configured, and the active DL BWP is not the initial BWP: if BWP-InactivityTimer associated with the active DL BWP expires: if the Default-DL-BWP is configured, the MAC entity may perform BWP switching to a BWP indicated by the Default-DL-BWP. Otherwise, the MAC entity may perform BWP switching to the initial DL BWP.

In an example, a UE may be configured for operation in bandwidth parts (BWPs) of a serving cell. In an example, the UE may be configured by higher layers for the serving cell a set of (e.g., at most four) bandwidth parts (BWPs) for receptions by the UE (e.g., DL BWP set) in a DL bandwidth by parameter DL-BWP. In an example, the UE may be configured with a set of (e.g., at most four) BWPs for transmissions by the UE (e.g., UL BWP set) in an UL bandwidth by parameter UL-BWP for the serving cell.

In an example, an initial active DL BWP may be defined, for example, by a location and number of contiguous PRBs, a subcarrier spacing, and a cyclic prefix, for the control resource set for Type0-PDCCH common search space. In an example, for operation on a primary cell, a UE may be provided by higher layer with a parameter initial-UL-BWP, an initial active UL BWP for a random access procedure.

In an example, if a UE has a dedicated BWP configuration, the UE may be provided by higher layer parameter Active-BWP-DL-Pcell a first active DL BWP for receptions. If a UE has a dedicated BWP configuration, the UE may be provided by higher layer parameter Active-BWP-UL-Pcell a first active UL BWP for transmissions on a primary cell.

In an example, for a DL BWP or an UL BWP in a set of DL BWPs or UL BWPs, respectively, the UE may be configured with the following parameters for the serving cell: a subcarrier spacing provided by higher layer parameter DL-BWP-mu or UL-BWP-mu; a cyclic prefix provided by higher layer parameter DL-BWP-CP or UL-BWP-CP; a PRB offset with respect to the PRB determined by higher layer parameters offset-pointA-low-scs and ref-scs and a number of contiguous PRBs provided by higher layer parameter DL-BWP-BW or UL-BWP-BW; an index in the set of DL BWPs or UL BWPs by respective higher layer parameters DL-BWP-index or UL-BWP-index; a DCI format 1_0 or DCI format 1_1 detection to a PDSCH reception timing values by higher layer parameter DL-data-time-domain; a PDSCH reception to a HARQ-ACK transmission timing values by higher layer parameter DL-data-DL-acknowledgement; and a DCI 0_0 or DCI 0_1 detection to a PUSCH transmission timing values by higher layer parameter UL-data-time-domain;

In an example, for an unpaired spectrum operation, a DL BWP from a set of configured DL BWPs with index provided by higher layer parameter DL-BWP-index may be paired with an UL BWP from a set of configured UL BWPs with index provided by higher layer parameter UL-BWP-index when the DL BWP index and the UL BWP index are equal. For unpaired spectrum operation, a UE may not be expected to receive a configuration where the center frequency for a DL BWP is different than the center frequency for an UL BWP when the DL-BWP-index of the DL BWP is equal to the UL-BWP-index of the UL BWP.

In an example, for a DL BWP in a set of DL BWPs on the primary cell, a UE may be configured control resource sets for every type of common search space and for UE-specific search space. In an example, the UE may not be expected to be configured without a common search space on the PCell, or on the PSCell, in the active DL BWP. In an example, for an UL BWP in a set of UL BWPs, the UE may be configured resource sets for PUCCH transmissions. In an example, a UE may receive PDCCH and PDSCH in a DL BWP according to a configured subcarrier spacing and CP length for the DL BWP. A UE may transmit PUCCH and PUSCH in an UL BWP according to a configured subcarrier spacing and CP length for the UL BWP.

In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions. In an example, for the primary cell, a UE may be provided by higher layer parameter Default-DL-BWP, a default DL BWP among the configured DL BWPs. In an example, if a UE is not provided a default DL BWP by higher layer parameter Default-DL-BWP, the default BWP may be the initial active DL BWP.

In an example, a UE may be expected to detect a DCI format 0_1 indicating active UL BWP change, or a DCI format 1_1 indicating active DL BWP change, only if a corresponding PDCCH is received within first 3 symbols of a slot.

In an example, for a primary cell, a UE may be provided by a higher layer parameter Default-DL-BWP a default DL BWP among the configured DL BWPs. If a UE is not provided a default DL BWP by the higher layer parameter Default-DL-BWP, the default DL BWP is the initial active DL BWP.

In an example, a UE may be provided by higher layer parameter BWP-InactivityTimer, a timer value for the primary cell. If configured, the UE may increment the timer, if running, every interval of 1 millisecond for frequency range 1 or every 0.5 milliseconds for frequency range 2 if the UE may not detect a DCI format 1_1 for paired spectrum operation or if the UE may not detect a DCI format 1_1 or DCI format 0_1 for unpaired spectrum operation during the interval.

In an example, if a UE is configured for a secondary cell with higher layer parameter Default-DL-BWP indicating a default DL BWP among the configured DL BWPs and the UE is configured with higher layer parameter BWP-InactivityTimer indicating a timer value, the UE procedures on the secondary cell may be same as on the primary cell using the timer value for the secondary cell and the default DL BWP for the secondary cell.

In an example, if a UE is configured by higher layer parameter Active-BWP-DL-SCell a first active DL BWP and by higher layer parameter Active-BWP-UL-SCell a first active UL BWP on a secondary cell or carrier, the UE may use the indicated DL BWP and the indicated UL BWP on the secondary cell as the respective first active DL BWP and first active UL BWP on the secondary cell or carrier.

In an example, a base station may transmit, to a wireless device, one or more messages indicating random access parameters. For example, the one or more messages may be broadcast RRC message, wireless device specific RRC message, and/or combination thereof. For example, the one or more message may comprise at least one of RACH-ConfigCommon, RACH-ConfigGeneric, and RACH-ConfigDedicated. For example, for a contention based random access procedure, a wireless device may receive, from a base station, at least RACH-ConfigCommon and RACH-ConfigGeneric. For example, for a contention free random access procedure, a wireless device may receive, from a base station, at least RACH-ConfigDedicated.

FIG. 16 shows an example RACH-ConfigCommon, and FIG. 17 shows an example field description of RACH-ConfigCommon. FIG. 18 shows an example RACH-ConfigGeneric, and an example field description of RACH-ConfigGeneric. FIG. 19 shows an example RACH-ConfigDedicated, and FIG. 20 shows an example field description of RACH-ConfigDedicated.

For example, a random access procedure may be initiated in different ways based at least on one of RACH-ConfigCommon, RACH-ConfigGeneric, and RACH-ConfigDedicated. For example, the random access procedure may be initiated by a PDCCH order transmitted by a base station, by the MAC entity of a wireless device, or by RRC. There may be one random access procedure ongoing at any point in time in a MAC entity. The random access procedure on an SCell may be initiated by a PDCCH order with ra-PreambleIndex different from 0b000000. For example, if the MAC entity of a wireless device receives a request for a random access procedure while another is already ongoing in the MAC entity, a wireless device may continue with the ongoing procedure or start with the new procedure (e.g. for SI request).

In an example, a base station may transmit one or more RRC message to configure a wireless device at least one of following parameters: prach-ConfigIndex: the available set of PRACH occasions for the transmission of the Random Access Preamble; preambleReceivedTargetPower: initial Random Access Preamble power; rsrp-ThresholdSSB: an RSRP threshold for the selection of the SSB and corresponding Random Access Preamble and/or PRACH occasion (If the Random Access procedure is initiated for beam failure recovery, rsrp-ThresholdSSB refers to rsrp-ThresholdSSB in BeamFailureRecoveryConfig IE); rsrp-ThresholdCSI-RS: an RSRP threshold for the selection of CSI-RS and corresponding Random Access Preamble and/or PRACH occasion (If the Random Access procedure is initiated for beam failure recovery, rsrp-ThresholdCSI-RS shall be set to a value calculated by multiplying rsrp-ThresholdSSB in BeamFailureRecoveryConfig IE by powerControlOffset); rsrp-ThresholdSSB-SUL: an RSRP threshold for the selection between the NUL carrier and the SUL carrier; powerControlOffset: a power offset between rsrp-ThresholdSSB and rsrp-ThresholdCSI-RS to be used when the Random Access procedure is initiated for beam failure recovery; powerRampingStep: the power-ramping factor; powerRampingStepHighPriority: the power-ramping factor in case of differentiated Random Access procedure; ra-PreambleIndex: Random Access Preamble; ra-ssb-OccasionMaskIndex: defines PRACH occasion(s) associated with an SSB in which the MAC entity may transmit a Random Access Preamble (FIG. 21 shows an example of ra-ssb-OccasionMaskIndex values); ra-OccasionList: defines PRACH occasion(s) associated with a CSI-RS in which the MAC entity may transmit a Random Access Preamble; preambleTransMax: the maximum number of Random Access Preamble transmission; ssb-perRACH-OccasionAndCB-PreamblesPerSSB: defines the number of SSBs mapped to each PRACH occasion and the number of Random Access Preambles mapped to each SSB; the set of Random Access Preambles and/or PRACH occasions for SI request, if any; the set of Random Access Preambles and/or PRACH occasions for beam failure recovery request, if any; ra-ResponseWindow: the time window to monitor RA response(s); ra-ContentionResolutionTimer: the Contention Resolution Timer.

In an example, a random access procedure may be initiated for beam failure detection and recovery. For example, a wireless device may be configured by RRC with a beam failure recovery procedure which may be used for indicating to the serving base station of an SSB or CSI-RS when beam failure is detected on the serving SSB(s)/CSI-RS(s). Beam failure may be detected by counting beam failure instance indication from the lower layers to the MAC entity. For example, a base station may configure, via RRC, the following parameters in the BeamFailureRecoveryConfig for the Beam Failure Detection and Recovery procedure: beamFailureInstanceMaxCount for the beam failure detection; beamFailureDetectionTimer for the beam failure detection; beamFailureRecoveryTimer for the beam failure recovery procedure; rsrp-ThresholdSSB: an RSRP threshold for the beam failure recovery; powerRampingStep: powerRampingStep for the beam failure recovery; preambleReceivedTargetPower: preambleReceivedTargetPower for the beam failure recovery; preambleTransMax: preambleTransMax for the beam failure recovery; ra-ResponseWindow: the time window to monitor response(s) for the beam failure recovery using contention-free Random Access Preamble; prach-ConfigIndex: prach-ConfigIndex for the beam failure recovery; ra-ssb-OccasionMaskIndex: ra-ssb-OccasionMaskIndex for the beam failure recovery; ra-OccasionList: ra-OccasionList for the beam failure recovery.

In an example, a wireless device may employ one or more parameters for a random access procedure. For example, a wireless device may employ at least one of PREAMBLE_INDEX; PREAMBLE_TRANSMISSION_COUNTER; PREAMBLE_POWER_RAMPING_COUNTER; PREAMBLE_POWER_RAMPING_STEP; PREAMBLE_RECEIVED_TARGET_POWER; PREAMBLE_BACKOFF; PCMAX; SCALING_FACTOR_BI; and TEMPORARY_C-RNTI.

In an example, a wireless device may perform random access resource selection for selecting one or more preambles and one or more PRACH occasion (or resources comprising time, frequency, and/or code). For example, there may be one or more cases that a random access procedure may be initiated for beam failure recovery; and/or the beamFailureRecoveryTimer is either running or not configured; and/or the contention-free Random Access Resources for beam failure recovery request associated with any of the SSBs and/or CSI-RSs have been explicitly provided by RRC; and/or at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available. In this case, a wireless device may select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList. For example, if CSI-RS is selected, and there is no ra-PreambleIndex associated with the selected CSI-RS, a wireless device may set the PREAMBLE_INDEX to a ra-PreambleIndex corresponding to the SSB in candidateBeamRSList which is quasi-collocated with the selected CSI-RS, otherwise the wireless device may set the PREAMBLE_INDEX to a ra-PreambleIndex corresponding to the selected SSB or CSI-RS from the set of Random Access Preambles for beam failure recovery request.

For example, there may be one or more cases that a random access procedure may be initiated and/or a ra-PreambleIndex has been explicitly provided by either PDCCH or RRC; and/or the ra-PreambleIndex is not 0b000000; and/or contention-free Random Access Resource associated with SSBs or CSI-RSs have not been explicitly provided by RRC. In this case, a wireless device may set the PREAMBLE_INDEX to the signaled ra-PreambleIndex.

For example, there may be one or more cases that a random access procedure may be initiated and/or the contention-free Random Access Resources associated with SSBs have been explicitly provided by RRC and at least one SSB with SS-RSRP above rsrp-ThresholdSSB amongst the associated SSBs is available. In this case, a wireless device may select an SSB with SS-RSRP above rsrp-ThresholdSSB amongst the associated SSBs. For example, the wireless device may set the PREAMBLE_INDEX to a ra-PreambleIndex corresponding to the selected SSB.

For example, there may be one or more cases that a random access procedure may be initiated and the contention-free Random Access Resources associated with CSI-RSs have been explicitly provided by RRC and at least one CSI-RS with CSI-RSRP above rsrp-ThresholdCSI-RS amongst the associated CSI-RSs is available. In this case, a wireless device may select a CSI-RS with CSI-RSRP above rsrp-ThresholdCSI-RS amongst the associated CSI-RSs. for example, the wireless device may set the PREAMBLE_INDEX to a ra-PreambleIndex corresponding to the selected CSI-RS.

For example, there may be one or more cases that a random access procedure may be initiated and at least one of the SSBs with SS-RSRP above rsrp-ThresholdSSB is available. In this case, for example, a wireless device may select an SSB with SS-RSRP above rsrp-ThresholdSSB, otherwise may select any SSB. For example, a random access resource selection is performed when Msg3 is being retransmitted, a wireless device may select the same group of Random Access Preambles as was used for the Random Access Preamble transmission attempt corresponding to the first transmission of Msg3. For example, if the association between Random Access Preambles and SSBs is configured, a wireless device may select a ra-PreambleIndex randomly with equal probability from the Random Access Preambles associated with the selected SSB and the selected Random Access Preambles group. For example, if the association between Random Access Preambles and SSBs is not configured, a wireless device may select a ra-PreambleIndex randomly with equal probability from the Random Access Preambles within the selected Random Access Preambles group. For example, a wireless device may set the PREAMBLE_INDEX to the selected ra-PreambleIndex.

In an example, if an SSB is selected above and an association between PRACH occasions and SSBs is configured, a wireless device may determine the next available PRACH occasion from the PRACH occasions corresponding to the selected SSB permitted by the restrictions given by the ra-ssb-OccasionMaskIndex if configured (the MAC entity of the wireless device may select a PRACH occasion randomly with equal probability amongst the PRACH occasions occurring simultaneously but on different subcarriers, corresponding to the selected SSB; the MAC entity may take into account the possible occurrence of measurement gaps when determining the next available PRACH occasion corresponding to the selected SSB).

In an example, if a CSI-RS is selected above and an association between PRACH occasions and CSI-RSs is configured. a wireless device may determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).

In an example, if a CSI-RS is selected above and there is no contention-free Random Access Resource associated with the selected CSI-RS, a wireless device may determine the next available PRACH occasion from the PRACH occasions, permitted by the restrictions given by the ra-ssb-OccasionMaskIndex if configured, corresponding to the SSB in candidateBeamRSList which is quasi-collocated with the selected CSI-RS (the MAC entity may take into account the possible occurrence of measurement gaps when determining the next available PRACH occasion corresponding to the SSB which is quasi-colocated with the selected CSI-RS).

For example, a wireless device may determine the next available PRACH occasion (the MAC entity shall select a PRACH occasion randomly with equal probability amongst the PRACH occasions occurring simultaneously but on different subcarriers; the MAC entity may take into account the possible occurrence of measurement gaps when determining the next available PRACH occasion).

For example, based on a selected PREABLE INDEX and PRACH occasion, a wireless device may perform the random access preamble transmission. For example, if the notification of suspending power ramping counter has not been received from lower layers; and/or if SSB selected is not changed (i.e. same as the previous Random Access Preamble transmission), a wireless device may increment PREAMBLE_POWER_RAMPING_COUNTER by 1. the wireless device may select a value of DELTA_PREAMBLE that may be predefined and/or semi-statistically configured by a base station and set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP. The wireless device may instruct the physical layer to transmit the Random Access Preamble using the selected PRACH, corresponding RA-RNTI (if available), PREAMBLE_INDEX and PREAMBLE_RECEIVED_TARGET_POWER. For example, the wireless device may compute an RA-RNTI associated with the PRACH occasion in which the Random Access Preamble is transmitted, e.g., The RA-RNTI associated with the PRACH in which the Random Access Preamble is transmitted, may be computed as:

$$RA\text{-}RNTI = 1 + s\_id + 14 \times t\_id + 14 \times 80 \times f\_id + 14 \times 80 \times 8 \times ul\_carrier\_id$$

where s_id is the index of the first OFDM symbol of the specified PRACH (0≤s_id<14), t_id is the index of the first slot of the specified PRACH in a system frame (0≤t_id<80), f_id is the index of the specified PRACH in the frequency domain (0≤f_id<8), and ul_carrier_id is the UL carrier used for Msg1 transmission (0 for NUL carrier, and 1 for SUL carrier).

Figure 22:
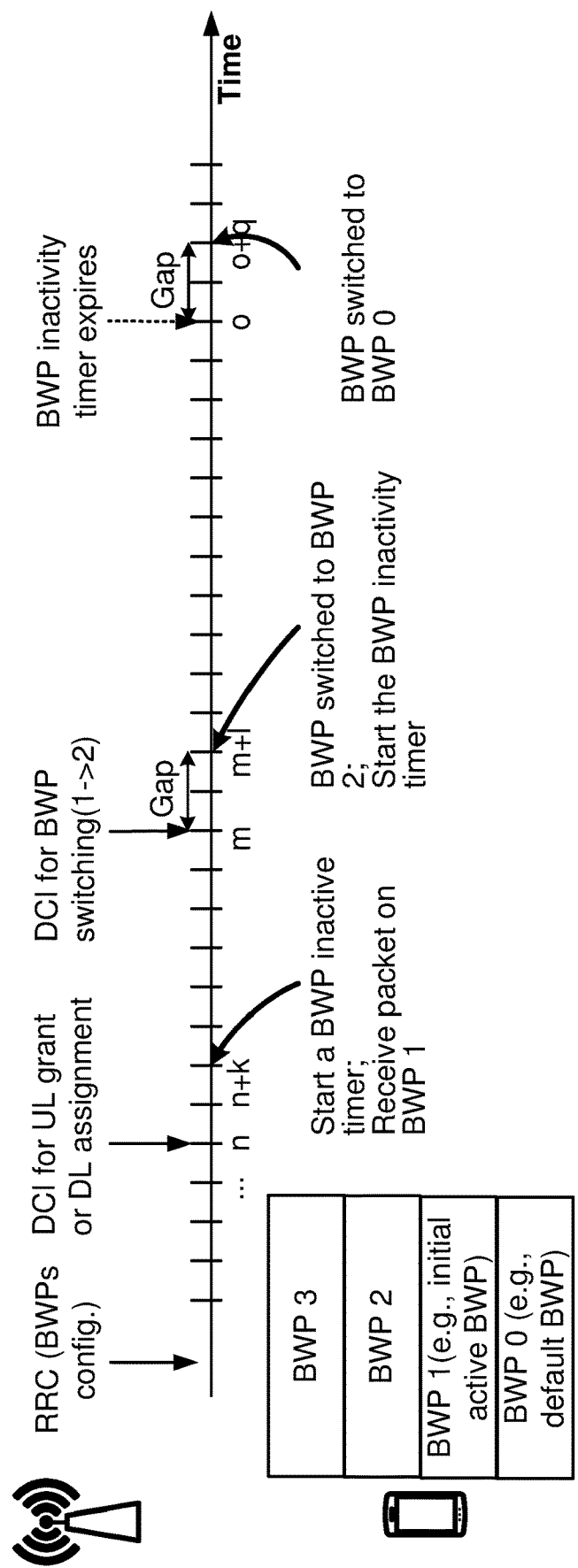
FIG. 22 is an example of BWP operation as per an aspect of an embodiment of the present disclosure.
Figure 23:
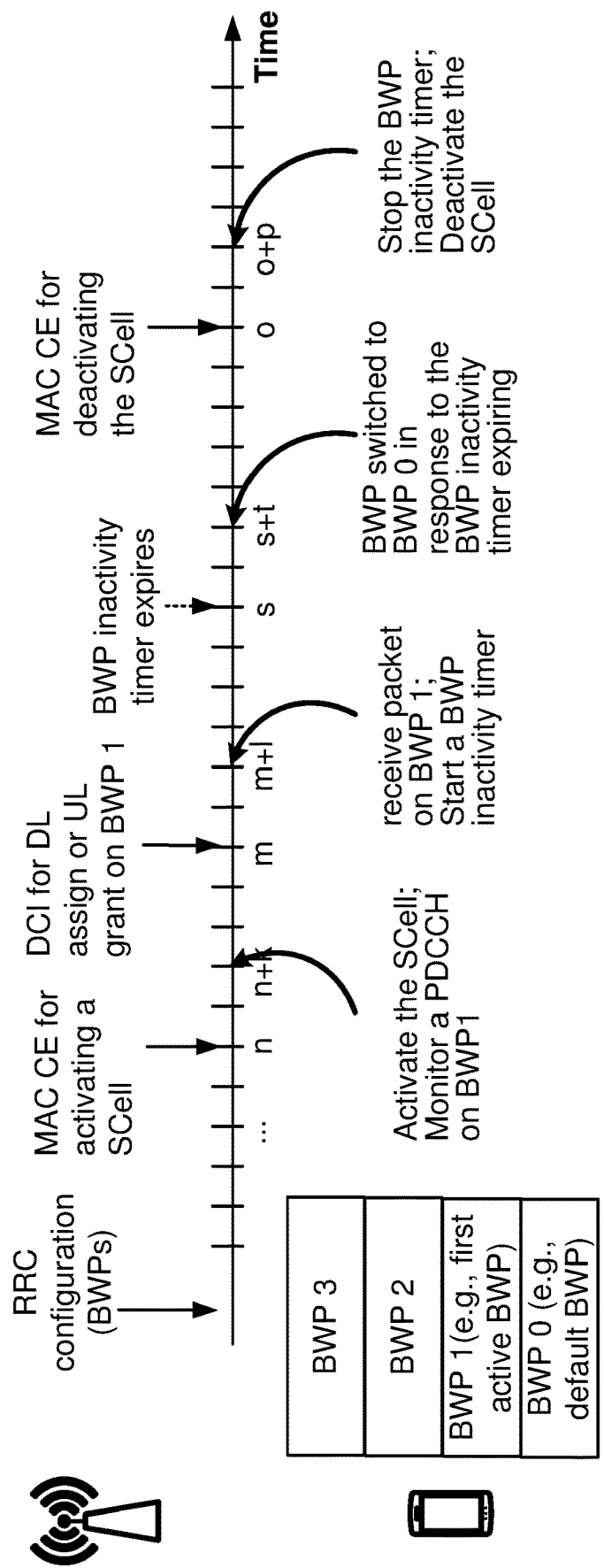
FIG. 23 illustrates an example BWP operation as per an aspect of an embodiment of the present disclosure.

FIG. 22 shows an example of BWP switching on a PCell.
FIG. 23 shows an example of BWP switching on a SCell.

In an example, a gNB may transmit to, or receive from, a wireless device one or more data packets, via one or more radio resources. The one or more date packets may be one or more URLLC (Ultra-Reliable Low Latency Communication) data packets with small packet size (e.g., <100 bytes), which may require ultra-reliable (e.g., BLER less than $10^{\wedge(-5)}$) and low latency delivery (e.g., less than 1 millisecond) between the gNB and the wireless device. In an example, the one or more data packets may be one or more eMBB (enhanced Mobile Broadband) data packets with big packet size (e.g., >1000 bytes), which may require large bandwidth (e.g., 400 MHz~1 GHz) and/or big amount of radio resources. In an example, the one or more date packets may be one or more machine type communication (e.g., MTC) data packets with small packet size which require wide coverage (e.g., 10 KM~100 KM, or transmitting a wireless device located in a basement). In an example, existing BWP and CA operation mechanisms may support at most one active BWP in a cell. When necessary to transmit multiple services on multiple active BWPs, the existing BWP and CA operation mechanisms may be not efficient and/or have large transmission latency. In an example, activation/deactivation of an SCell based on MAC CE, for adding an additional active BWP, may take long time (e.g., several tens of milliseconds). In an example, transmission of some type of service on the additional active BWP of the SCell may not be tolerant of a delay of the activation/deactivation.

In an example, when configured with multiple BWPs for a cell, a gNB and a UE may communicate on multiple active BWPs of the multiple BWPs in parallel (e.g., simultaneously or overlapped in time) to accommodate multiple services (e.g., eMBB, URLLC, or MTC). In an example, on a first active BWP, a gNB may transmit an eMBB data packet to a UE. In an example, on a second active BWP, the gNB may transmit an URLLC data packet to the UE. In an example, on a third active BWP, the gNB may transmit an MTC data packet to the UE. Transmitting multiple data packets for different services on different active BWPs in parallel (e.g., simultaneously or overlapped in time) may reduce latency. In an example, transmitting an eMBB data and an URLLC data on a single active BWP may cause interruption of one transmission (e.g., eMBB) by another transmission (e.g., URLLC). In an example, transmitting multiple data packets for different services on different active BWPs in parallel (e.g., simultaneously or overlapped in time) may avoid the interruption. In an example, existing BWP operation mechanism may not support multiple active BWPs in a cell.

In an example, a gNB may transmit one or more messages comprising configuration parameters of a cell, to a UE (e.g., a wireless device). The one or more messages may comprise one or more RRC messages (e.g. RRC connection reconfiguration message, or RRC connection reestablishment message, or RRC connection setup message). In an example, the cell may be a Primary cell (or a PSCell), or a secondary cell when carrier aggregation or dual connectivity is configured. In an example, the cell may comprise a plurality of downlink BWPs, wherein each of the plurality of downlink BWPs may be associated with a BWP ID (e.g., a BWP specific ID) and one or more parameters. In an example, the cell may comprise a plurality of uplink BWPs, wherein each of the plurality of uplink BWPs may be associated with a BWP ID (e.g., a BWP specific ID) and one or more second parameters.

In an example, each of the plurality of the downlink BWPs may be in one of active state and inactive state. In an example, a wireless device may apply operations on a BWP (DL or UL) in active state comprising: transmitting on UL-SCH; transmitting on RACH; monitoring a PDCCH; transmitting PUCCH; receiving DL-SCH; and/or (re-) initializing any suspended configured uplink grants of configured grant Type 1 according to a stored configuration, if any. In an example, on a BWP (DL or UL) in inactive state, the wireless device: may not transmit on UL-SCH; may not transmit on RACH; may not monitor a PDCCH; may not transmit PUCCH; may not transmit SRS, may not receive DL-SCH; may clear any configured downlink assignment and configured uplink grant of configured grant Type 2; and/or may suspend any configured uplink grant of configured Type 1.

In an example, the one or more parameters may comprise at least one of: a control resource set identified by a control resource set index; a subcarrier spacing; a cyclic prefix; a DM-RS scrambling sequence initialization value; a number of consecutive symbols; a set of resource blocks in frequency domain; a CCE-to-REG mapping; a REG bundle size; a cyclic shift for the REG bundle; an antenna port quasi-co-location; an indication for a presence or absence of a TCI field for DCI format 1_0 or 1_1 transmitted on the control resource set.

In an example, the configuration parameters may further indicate at least one of: an initial active DL BWP, of the plurality of DL BWPs, identified by a first BWP ID and a default DL BWP, of the plurality of DL BWPs, identified by a second BWP ID. In an example, the second BWP ID may be same as or different from the first BWP ID. In an example, the default DL BWP may be in inactive state if the second BWP ID is different from the first BWP ID of the initial active DL BWP.

In an example, the initial active DL BWP may be associated with one or more control resource set for one or more common search space (e.g., type0-PDCCH). In an example, a wireless device may monitor a first PDCCH on the initial active DL BWP on a PCell (or a PSCell) for detecting a DCI when switching from RRC idle state to RRC connected state.

In an example, when at least one of multiple types of services are triggered for transmission on an additional BWP, a gNB may activate the additional BWP dynamically (e.g., DCI, MAC CE). In an example, the gNB may transmit a first command to the wireless device to activate a second DL BWP, of the plurality of DL BWPs, identified by a third BWP ID. In an example, the first command may be a MAC CE, or a DCI. In an example, the third BWP ID is different from the first BWP ID and/or the second BWP ID. In response to the activating, the wireless device may transit the second DL BWP from inactive state to active state and may keep the initial active BWP in active state. In an example, in response to the activating, the wireless device may monitor a first PDCCH on the initial active DL BWP and a second PDCCH on the second DL BWP in parallel (e.g., simultaneously or overlapped in time). In an example, activating the second DL BWP may not change the state of the initial active DL BWP. In an example, with one active DL BWP (A-BWP1) of a plurality of active BWPs in a cell, the gNB may transmit the first command (e.g., at time $T_1$) to the wireless device to activate A-BWP2. In an example, A-BWP2 may be different from A-BWP1. In response to the activating, the wireless device may transit A-BWP2 from inactive state to active state and keep A-BWP1 in active state (e.g., at time $T_2$). In an example, activating A-BWP2 may not change the state of A-BWP1.

In an example, when multiple active BWPs are supported, a gNB may transmit one or more RRC messages comprising configuration parameters indicating a first active DL BWP and at least a second active DL BWP of a PCell (or a PSCell), to a wireless device. The wireless device may monitor a first PDCCH on the first active DL BWP, and at least a second PDCCH on the at least second active DL BWP, on a PCell (or a PSCell) for detecting one or more DCI, e.g., when the wireless device is in RRC connected mode, or switches from RRC idle state to RRC connected state. In an example, configuring multiple active BWPs by the one or more RRC messages may reduce signaling overhead for BWP activation.

In an example, when multiple active BWPs are supported, a gNB may transmit one or more RRC messages comprising configuration parameters indicating a first active DL BWP and at least a second active DL BWP of a SCell, to a wireless device. The wireless device may monitor a first PDCCH on the first active DL BWP, and at least a second PDCCH on the at least second active DL BWP of the SCell for detecting one or more DCI, e.g., in response to the SCell being activated (e.g., by a MAC CE or a DCI). In an example, configuring multiple active BWPs by the one or more RRC messages may reduce signaling overhead for BWP activation.

In an example, when there are two active DL BWPs (A-BWP1 and A-BWP2) of a plurality of active BWPs in a cell (at time $T_1$), a gNB may transmit a second command to a wireless device to switch from A-BWP1 to A-BWP3 (at time $T_2$). In an example, A-BWP1 may be the initial active DL BWP configured in the one or more messages. In an example, A-BWP2 may be a DL BWP activated by the first command. In an example, the second command may be a MAC CE, or a DCI. In an example, A-BWP3 may be different from A-BWP1 and A-BWP2. In response to the switching, the wireless device may transit A-BWP1 from active state to inactive state, and transit A-BWP3 from inactive state to active state and may keep A-BWP2 in active state. In an example, in response to the switching, the wireless device may monitor a first PDCCH on A-BWP3 and a second PDCCH on A-BWP2 in parallel (e.g., simultaneously or overlapped in time). In an example, switching to A-BWP3 from A-BWP1 may deactivate A-BWP1 and activate A-BWP3 at a time.

In an example, when there are two active DL BWPs (A-BWP1 and A-BWP2) of a plurality of active BWPs in a cell, a gNB may transmit a third command to a wireless device to deactivate A-BWP2. In an example, the third command may be a MAC CE, or a DCI. In an example, the gNB and/or the wireless device may deactivate A-BWP2 in response to a BWP inactivity timer (e.g., associated with A-BWP2, or associated with the cell) expiring. In an example, the deactivating may comprise transiting A-BWP2 from active state to inactive state and keeping A-BWP1 in active state (e.g., at time $T_2$). In an example, in response to the deactivating, the wireless device may monitor a first PDCCH on A-BWP1 and stop monitoring a second PDCCH on A-BWP2. In an example, deactivating A-BWP2 may not change the state of A-BWP1.

In an example, a gNB and a wireless device may communicate on more than 2 active DL BWPs in a cell. The gNB and/or the wireless device may perform BWP activation, BWP deactivation, and BWP switching to flexibly accommodate different services. In an example, a gNB and a wireless device may maintain a first active DL BWP for a first transmission of a first service. In an example, when a second service is triggered, the gNB may activate a second DL BWP as a second active DL BWP. In response to the activating, the wireless device may monitor one or more PDCCHs and/or receive data packets on both the first active DL BWP and the second active DL BWP. In an example, when a third service is triggered, the gNB and/or the wireless device may activate a third DL BWP as a third active DL BWP. In response to the activating, the wireless device may monitor one or more PDCCHs and/or receive data packets on the first active DL BWP, the second active DL BWP and the third active DL BWP.

In an example, to reduce blind decoding complexity, a gNB may cross-BWP schedule a second active DL BWP from a first active DL BWP. In an example, cross-BWP scheduling may comprise scheduling, by a base station, a transmission (downlink or uplink) on a shared channel (downlink or uplink) of a second BWP via control channels of a first BWP. In an example, the first active DL BWP may be configured with a first number of control resource set, and/or a second number of search space. In an example, the second active DL BWP may be configured with a third number of control resource set, and/or a fourth number of search space. In an example, the first number may be greater than the third number. In an example, the second number may be greater than the fourth number. In an example the second active DL BWP may be configured with no PDCCH resource.

In an example, a gNB may transmit a first PDCCH on a first active DL BWP (e.g., BWP 1) to schedule a first PDSCH of BWP 1, to a wireless device. In an example, the gNB may transmit a second PDCCH on BWP 1 to schedule a second PDSCH of a second active BWP (e.g., BWP 2) if BWP 2 is configured to be cross-BWP scheduled by BWP 1. In an example, the gNB may transmit a third PDCCH on BWP 1 to schedule a third PDSCH of a third active BWP (e.g., BWP 3) if BWP 3 is configured to be cross-BWP scheduled by BWP 1. In an example, the gNB may transmit a fourth PDCCH on BWP 3 to schedule a fourth PDSCH of BWP 3, e.g., if BWP 3 is configured to be self-scheduled. In an example, when cross BWP scheduling is supported, a wireless device may monitor one or more PDCCH on BWP 1 for at least one second BWP if the at least one second BWP is configured to be cross-BWP scheduled by BWP 1.

In an example, a PDSCH of an active BWP may be self-scheduled by a PDCCH of the active BWP. In an example, a gNB may schedule a first PDSCH resource on a first active BWP by a first PDCCH on the first active BWP. The gNB may schedule a second PDSCH resource on a second active BWP by a second PDCCH on the second active BWP, etc.

In an example, with multiple active DL BWPs in a cell, a UE may monitor one or more PDCCH in one or more common search spaces on the multiple active DL BWPs, wherein each of the multiple active DL BWPs is associated with one of the one or more common search spaces. In an example, configuring a common search space for each of multiple active DL BWPs is not efficient for PDCCH resource utilization in the cell. In an example, configuring a common search space for each of the multiple active DL BWPs may require a wireless device monitoring multiple common search spaces for the multiple active DL BWPs, which may consume battery power inefficiently. Embodiments may provide methods to improve PDCCH resource utilization efficiency and battery power efficiency. The embodiments may comprise designating a first active DL BWP, of multiple active DL BWPs, as a primary active DL BWP (PBWP). In an example, the primary active DL BWP may be the initial active DL BWP configured in the one or more messages. In an example, the primary active DL BWP may be associated with one or more common search spaces, and one or more UE-specific search spaces. In an example, the primary active BWP may be a BWP on which, the wireless device may perform an initial connection establishment procedure or may initiate a connection re-establishment procedure. In an example, the primary active DL BWP may be associated with one or more common search spaces for one or more DCI formats with CRC scrambled by one of: SI-RNTI; RA-RNTI; a TC-RNTI; P-RNTI; INT-RNTI; SFI-RNTI; TPC-PUSCH-RNTI; TPC-PUCCH-RNTI; TPC-SRS-RNTI; CS-RNTI; SP-CSI-RNTI; and/or or C-RNTI. In an example, the one or more common search spaces may comprise at least one of: a type0-PDCCH common search space; a type0A-PDCCH common search space; a type1-PDCCH common search space; a type2-PDCCH common search space; a type3-PDCCH common search space. In an example, the one or more DCI formats may comprise at least one of: a DCI format 0_0; a DCI format 0_1; a DCI format 1_0; a DCI format 1_1; a DCI format 2_0; a DCI format 2_1; a DCI format 2_2; and/or a DCI format 2_3.

The designating of the PBWP may be indicated in an RRC message, or a first MAC CE, or a first DCI. In an example, at least one second active DL BWP of the multiple active DL BWPs is designated as at least one secondary active DL BWP (SBWP). In an example, the designating of the at least one SBWP may be indicated in a second MAC CE, or a second DCI. In an example, a secondary active DL BWP may be associated with one or more UE-specific search space. In an example, when designated with a PBWP and a SBWP in a cell, a wireless device may monitor one or more common search spaces and one or more first UE-specific search spaces on a PBWP, and one or more second UE-specific search spaces on a SBWP in the cell.

In an example, with multiple DL BWPs being in active state in a cell, the gNB may designate, from the multiple active DL BWPs, a first active DL BWP as a PBWP (e.g., PBWP1), and a second active DL BWP as a SBWP (e.g., SBWP1). A wireless device may monitor a first PDCCH on a PBWP1 and a second PDCCH on a SBWP1. In an example, a gNB may transmit a first command to switch from PBWP1 to a third BWP as a primary BWP (e.g., PBWP2), to a wireless device. In response to switching from PBWP1 to PBWP2, the wireless device may transit PBWP1 from active state to inactive state and transit the third BWP from inactive state to active state. The activated third BWP (PBWP2) may a primary active BWP in response to the switching. In response to the switching from PBWP1 to PBWP2, the wireless device may monitor a first PDCCH on common search spaces and first UE-specific search spaces on PBWP2, and a second PDCCH on second UE-specific search spaces on SBWP1.

In an example, with a primary active BWP (e.g., PBWP1) of a plurality of active BWPs designated in a cell, a gNB may transmit a second command to a wireless device to activate a second DL BWP (e.g., SBWP1) as a secondary BWP. In an example, the second DL BWP is different from PBWP1 and/or the plurality of active BWPs. In response to the activating, the wireless device may transit the second DL BWP from inactive state to active state and keep PBWP1 in active state. The second DL BWP may be designated as a SBWP (SBWP1) in response to the activation. The wireless device may monitor a first PDCCH on common search spaces and first UE-specific search spaces on PBWP1, and a second PDCCH on second UE-specific search spaces on SBWP1 in response to the activation.

In an example, with multiple DL BWPs being in active state in a cell, a gNB may designate, from the multiple active DL BWPs, a first active DL BWP as a PBWP (e.g., PBWP1), and a second active DL BWP as a SBWP (e.g., SBWP1), to a wireless device. The wireless device may monitor a first PDCCH on a PBWP1 and a second PDCCH on a SBWP1. In an example, a gNB may transmit a third command to switch from SBWP1 to a third BWP (e.g., SBWP2) as a secondary BWP, to the wireless device. In response to switching from SBWP1 to SBWP2, the wireless device may transit SBWP1 from active state to inactive state and transit the third BWP from inactive state to active state. The activated third BWP may be a secondary active BWP in response to the switching. In response to the switching from SBWP1 to SBWP2, the wireless device may monitor the first PDCCH on common search spaces and first UE-specific search spaces on PBWP1, and a third PDCCH on second UE-specific search spaces on SBWP2.

In an example, with a primary active BWP (e.g., PBWP1) and a secondary active BWP (e.g., SBWP1) of a plurality of active DL BWPs designated in a cell, a gNB may transmit a fourth command to a wireless device to deactivate SBWP1. In an example, the command may be a MAC CE, or a DCI. In an example, the gNB and/or the wireless device may deactivate SBWP1 in response to a BWP inactivity timer expiring. In an example, the BWP inactivity timer may be associated with SBWP1. In response to the deactivating, the wireless device may transit SBWP1 from active state to inactive state and keep PBWP1 in active state. In an example, in response to the deactivating, the wireless device may monitor a first PDCCH on PBWP1 and stop monitoring a second PDCCH on SBWP1. In an example, deactivating SBWP1 may not change the state of PBWP1.

In an example, with multiple active DL BWPs comprising a PBWP and at least one SBWP in a cell, a gNB and a wireless device may not allow a PBWP switching to a second active BWP by a MAC CE, or a DCI. In an example, the gNB and the wireless device may trigger a SBWP deactivation, a SBWP activation, and/or a SBWP switching. In an example, keeping PBWP unswitchable may simplify signaling design, and/or reduce implementation complexity of the wireless device. In an example, the PBWP may be switched to the second PBWP only by an RRC message. In an example, the RRC message triggering PBWP switching may enable a gNB statically switching the PBWP.

In an example, with a primary active BWP (e.g., PBWP1) of a plurality of active DL BWPs designated in a cell, a gNB may transmit a first command to a wireless device to activate a second DL BWP as a secondary BWP (e.g., SBWP1). In an example, the second DL BWP may be different from PBWP1 and/or the plurality of active BWPs. In response to the activating, the wireless device may transit the second DL BWP from inactive state to active state and may keep PBWP1 in active state. The second DL BWP may be designated as a SBWP (SBWP1) in response to the activation. The wireless device may monitor a first PDCCH on common search spaces and first UE-specific search spaces on PBWP1, and a second PDCCH on second UE-specific search spaces on SBWP1 in response to the activation.

In an example, with a primary active BWP (e.g., PBWP1) and a secondary active BWP (e.g., SBWP1) of a plurality of active DL BWPs designated in a cell, a gNB may transmit a second command to a wireless device to deactivate SBWP1. In an example, the command may be a MAC CE, or a DCI. In an example, the gNB and/or the wireless device may deactivate SBWP1 in response to a BWP inactivity timer expiring. In an example, the BWP inactivity timer may be associated with SBWP1. In response to the deactivating, the wireless device may transit SBWP1 from active state to inactive state and may keep PBWP1 in active state. In an example, in response to the deactivating, the wireless device may monitor a first PDCCH on PBWP1 and may stop monitoring a second PDCCH on SBWP1.

In an example, with multiple DL active BWPs in a cell, a gNB may designate, from the multiple DL active BWPs, a first active DL BWP as a PBWP (e.g., PBWP1), and a second active DL BWP as a SBWP (e.g., SBWP1), to a wireless device. The wireless device may monitor a first PDCCH on a PBWP1 and a second PDCCH on a SBWP1. In an example, a gNB may transmit a third command to switch from SBWP1 to a third BWP as a secondary BWP (e.g., SBWP2), to the wireless device. In response to switching from SBWP1 to SBWP2, the wireless device may transit SBWP1 from active state to inactive state and transit the third BWP from inactive state to active state. The activated third BWP may a secondary active BWP (e.g., SBWP2). In response to the switching from SBWP1 to SBWP2, the wireless device may monitor the first PDCCH on common search spaces and first UE-specific search spaces on PBWP1, and a third PDCCH on second UE-specific search spaces on SBWP2.

In an example, a gNB may transmit one or more messages comprising configuration parameters of a plurality of DL BWPs in a cell, to a wireless device. In an example, multiple DL BWPs of a plurality of DL BWPs are activated as active DL BWPs. In an example, a wireless device and a gNB may communicate on the active DL BWPs comprising a PBWP and a SBWP. In an example, the PBWP may be switched to a first DL BWP as a new PBWP. In an example, the SBWP may be switched to a second DL BWP as a new SBWP. In an example, the SBWP may be deactivated. In an example, a third BWP may be activated as a second SBWP. In an example, a gNB may transmit one or more DCI indicating a PBWP switching, or a SBWP activation, or a SBWP deactivation, or a SBWP switching, or a PDSCH scheduling on a PBWP or on an SBWP, based on at least one of: one or more values of one or more fields of the one or more DCI; whether the one or more DCI is transmitted on a PBWP or a SBWP. In an example, the one or more DCI may be transmitted with DCI format 1_0 or 1_1 indicating a PDSCH scheduling. In an example, the one or more fields may comprise at least one of: a carrier indicator; an identifier for DCI format; a BWP indicator; a first field indicating a frequency domain resource assignment; a second field indicating a time domain resource assignment; a PUCCH resource indicator; a TPC command for scheduled PUCCH; a PDSCH-to-HARQ_feedback timing indicator. In an example, reusing an existing DCI format (e.g., DCI format 1_0 or 1_1) for a BWP operation supporting multiple active BWPs may reduce blind decoding complexity at a wireless device.

In an example, a wireless device may switch the PBWP to a first BWP as a new PBWP identified by the BWP indicator, in response to at least one of: the one or more DCI being transmitted on the PBWP; the BWP indicator indicating the first BWP different from the PBWP and the SBWP (e.g., if existing); a value of the first field and/or the second field being different from a first value (e.g., all-zeros) and/or a second value (e.g., all-ones). In an example, the first value and/or the second value may be predefined (e.g., fixed).

In an example, the wireless device may switch the SBWP to a second BWP as a new SBWP identified by the BWP indicator, in response to at least one of: the one or more DCI being transmitted on the SBWP; the BWP indicator indicating the second BWP different from the PBWP and the SBWP; a value of the first field and/or the second field being different from the first value (e.g., all-zeros) and/or the second value (e.g., all-ones).

In an example, the wireless device may activate a third BWP as a new SBWP identified by the BWP indicator, in response to at least one of: the BWP indicator indicating the third BWP different from the PBWP and the SBWP; and/or the value of the first field and/or the second field being the first value (e.g., all-zeros).

In an example, the wireless device may deactivate the SBWP, in response to at least one of: the one or more DCI being transmitted on the PBWP; the BWP indicator indicating the SBWP; and/or the value of the first field or the second field being the second value (e.g., all-ones).

In an example, the wireless device may receive a DL assignment on a PBWP (e.g., without PBWP switching), in response to at least one of: the BWP indicator indicating the PBWP; the value of the first field or the second field being different from the first value (e.g., all-zeros) and/or the second value (e.g., all-ones). In an example, the wireless device may receive a DL assignment on a SBWP (e.g., without SBWP switching/activation/deactivation), in response to at least one of: the BWP indicator indicating the SBWP; the value of the first field or the second field being different from the first value (e.g., all-zeros) and/or the second value (e.g., all-ones). In an example, in response to receiving the DL assignment on the PBWP, the wireless device may receive one or more DL data packets from a first PDSCH on the PBWP. In an example, in response to receiving the DL assignment on the SBWP, the wireless device may receive one or more DL data packet from a second PDSCH on the SBWP.

In an example, a gNB and a wireless device may support a PBWP and at most one SBWP of a plurality of BWPs. In an example, supporting the PBWP and at most one SBWP, compared with one single active BWP in a cell, may improve spectrum efficiency and keep an acceptable implementation complexity of the gNB and the wireless device.

In an example, when a PBWP and at most one SBWP of a plurality of DL BWPs are supported, a gNB may transmit one or more DCI indicating a PBWP switching, or a SBWP activation, or a PDSCH scheduling on a PBWP or on an SBWP, based on at least one of: one or more values of one or more fields of the one or more DCI; whether the one or more DCI is transmitted on a PBWP or a SBWP. In an example, activation of a SBWP may comprise deactivating a first SBWP and activating a first inactive BWP as the SBWP at a time. In an example, activation of an SBWP may comprise activating a first inactive BWP as the SBWP, e.g., when there is no SBWP before the activating.

In an example, when a PBWP and at most one SBWP of a plurality of BWPs are supported, a gNB may transmit one or more DCI indicating a PBWP switching in response to at least one of: the BWP indicator indicating a first BWP different from the PBWP and the SBWP; the one or more DCI being transmitted on the PBWP; one or more value of the first field and/or the second field being different from a first value (e.g., all-zeros) and/or a second value (e.g., all-ones). In an example, the first value and/or the second value may be predefined (e.g., fixed).

In an example, when a PBWP and at most one SBWP of a plurality of BWPs are supported, a gNB may transmit one or more DCI indicating a SBWP activation in response to at least one of: the BWP indicator indicating a BWP different from the PBWP (e.g., if there is no SBWP in the cell); the BWP indicator indicating the BWP different from the SBWP; the one or more DCI being transmitted on the PBWP; the one or more DCI being transmitted on the SBWP; one or more value of the first field and/or the second field being the first value (e.g., all-zeros); and/or the value of the first field or the second field being the second value (e.g., all-ones).

In an example, when a SBWP activation or deactivation is not time urgent, a gNB may transmit a MAC CE to activate or deactivate a SBWP, to a wireless device. In an example, the gNB may transmit a DCI to switch from a first PBWP to a second BWP as a second PBWP, or switch from a first SBWP to a third BWP as a second SBWP.

In an example, a MAC CE may comprise at least one of: one or more first fields indicating activation or deactivation of one or more DL BWPs; one or more second fields indicating activation or deactivation of one or more UL BWPs. In an example, the one or more first fields may comprise a number of bits (e.g., $D_4, D_3, D_2, D_1$ in case of 4 bits). In an example, each of the number of bits may indicate activation of a corresponding DL BWP, in response to the bit being set to a first value (e.g., 1). In an example, each of the number of bits may indicate deactivation of a corresponding DL BWP, in response to the bit being set to a second value (e.g., 0). In an example, $D_4$ being set to the first value may indicate a DL BWP associated with BWP ID 4 is activated if the DL BWP is configured. In an example, $D_4$ being set to the second value may indicate a DL BWP associated with BWP ID 4 is deactivated if the DL BWP is configured. In an example, if the DL BWP associated by BWP ID 4 is not configured, the wireless device may ignore $D_4$. In an example, the wireless device may activate/deactivate a DL BWP associated with BWP ID 3 based on a value of $D_3$ if the DL BWP associated with BWP ID 3 is configured. In an example, the wireless device may activate/deactivate a DL BWP associated with BWP ID 2 based on a value of $D_2$ if the DL BWP associated with BWP ID 2 is configured. In an example, the wireless device may activate/deactivate a DL BWP associated with BWP ID 1 based on a value of $D_1$ if the DL BWP associated with BWP ID 1 is configured. In an example, an RRC message may indicate an association between a DL BWP and a BWP ID.

In an example, the one or more second fields may comprise a number of bits (e.g., $U_4, U_3, U_2, U_1$ in case of 4 bits). In an example, each of the number of bits may indicate activation of a corresponding UL BWP, in response to the bit being set to a first value (e.g., 1), if the UL BWP is configured. In an example, each of the number of bits may indicate deactivation of a corresponding UL BWP, in response to the bit being set to a second value (e.g., 0), if the UL BWP is configured. In an example, if an UL BWP associated by BWP ID i is not configured, the wireless device may ignore $U_i$.

In an example, the MAC subheader for BWP activation/deactivation may comprise at least one of: a reserved field; a flag field; a LCID field with a first value indicating the MAC CE for BWP activation/deactivation; a length field. In an example, the LCID field may be the first value different from other LCID values. In an example, the MAC subheader may not comprise the length field, e.g., in response to the MAC CE for SBWP activation/deactivation having a fixed bit length.

In an example, when one or more MAC CEs is used for activating/deactivating one or more SBWPs, the gNB may transmit one or more DCIs to switch from a first PBWP to a second BWP as a second PBWP, or switch from a first SBWP to a third BWP as a second SBWP, based on at least one of: one or more values of one or more fields of the one or more DCIs; whether the one or more DCIs is transmitted on a PBWP or a SBWP.

In an example, the wireless device may switch the PBWP to a first BWP as a new PBWP identified by the BWP indicator, in response to at least one of: the one or more DCIs being transmitted on the PBWP; the BWP indicator indicating the first BWP different from the PBWP and the SBWP (e.g., if existing).

In an example, the wireless device may switch the SBWP to a second BWP as a new SBWP identified by the BWP indicator, in response to at least one of: the one or more DCIs being transmitted on the SBWP; the BWP indicator indicating the second BWP different from the PBWP and the SBWP.

In an example, the wireless device may receive a DL assignment on a PBWP (e.g., without PBWP switching), in response to the BWP indicator indicating the PBWP. In an example, the wireless device may receive a DL assignment on a SBWP (e.g., without SBWP switching/activation), in response to the BWP indicator indicating the SBWP. In an example, in response to receiving the DL assignment on the PBWP, the wireless device may receive one or more DL data packets from a first PDSCH on the PBWP. In an example, in response to receiving the DL assignment on the SBWP, the wireless device may receive one or more DL data packets from a second PDSCH on the SBWP.

In an example, when a PBWP and at most one SBWP of a plurality of BWPs are supported and one or more MAC CEs are used for activating/deactivating a SBWP, a gNB may transmit one or more DCI indicating a PBWP switching, or a PDSCH scheduling on a PBWP or a SBWP, based on a BWP indicator. In an example, the wireless device may switch the PBWP to a first BWP as a new PBWP identified by the BWP indicator, in response to the BWP indicator indicating the first BWP different from the PBWP and the SBWP (e.g., if existing). In an example, the wireless device may receive a DL assignment on a PBWP (e.g., without PBWP switching), in response to the BWP indicator indicating the PBWP. In an example, the wireless device may receive a DL assignment on a SBWP (e.g., without SBWP switching/activation), in response to the BWP indicator indicating the SBWP. In an example, in response to receiving the DL assignment on the PBWP, the wireless device may receive one or more DL data packets from a first PDSCH on the PBWP. In an example, in response to receiving the DL assignment on the SBWP, the wireless device may receive one or more DL data packets from a second PDSCH on the SBWP.

In an example, one or more MAC CEs for SBWP activation/deactivation may introduce intolerant transition latency (e.g., scheduling the MAC CE in PDSCH resources and sending one or more HARQ feedback for the MAC CE in PUCCH/PUSCH resources) for some services (e.g., URLLC). In an example, a wireless device may receive multiple types of services which may require a quick SBWP activation/deactivation. Embodiments may reduce the transition latency by introducing a first DCI format, different from one or more existing DCI formats (e.g., DCI format 1_0/1_1). The first DCI format may comprise one or more fields indicating a PBWP switching, a SBWP activation, a SBWP deactivation, or a SBWP switching based on one or more values of the one or more fields of the first DCI format. In an example, the first DCI format may comprise at least one of: a BWP indicator; a second field (e.g., BWP action/mode indication) indicating one of PBWP switching, a SBWP activation, a SBWP deactivation and a SBWP switching.

In an example, when receiving one or more DCIs with the first DCI format, a wireless device may switch a PBWP to a first BWP as a new PBWP, in response to at least one of: the BWP indicator (e.g., BWP ID) indicating the first BWP; the first BWP being different from the PBWP; and/or the second field being set to a first value (e.g., "00" in case of two bits). In an example, the wireless device may receive a DL assignment on a PBWP (e.g., without PBWP switching), in response to the BWP indicator indicating the PBWP and/or the second field being set to a first value (e.g., "00" in case of two bits).

In an example, when receiving the one or more DCIs with the first DCI format, the wireless device may activate a second BWP as a SBWP, in response to at least one of: the BWP indicator indicating the second BWP; and/or the second field being set to a second value (e.g., "01" in case of two bits).

In an example, when receiving the one or more DCIs with the first DCI format, the wireless device may deactivate a SBWP, in response to at least one of: the BWP indicator indicating the SBWP; and the second field being set to a third value (e.g., "10" in case of two bits).

In an example, when receiving the one or more DCIs with the first DCI format, the wireless device may switch a SBWP to a third BWP, in response to at least one of: the BWP indicator indicating the third BWP; the third BWP being different from the PBWP and the SBWP; and/or the second field being set to a fourth value (e.g., "11" in case of two bits). In an example, the wireless device may receive a DL assignment on a SBWP (e.g., without SBWP switching), in response to the BWP indicator indicating the SBWP and/or the second field being set to a fourth value (e.g., "11" in case of two bits).

In an example, a gNB may transmit a first DCI with an existing DCI format (e.g., DCI format 1_0/1_1) indicating PBWP/SBWP switching, or DL scheduling on the PBWP/SBWP.

In an example, a gNB may transmit a second DCI with a second DCI format (e.g., different from the existing DCI format) indicating SBWP activation/deactivation. In an example, the second DCI format may comprise at least one of: a BWP indicator; a second field indicating activation or deactivation of a SBWP.

In an example, when receiving the first DCI with the existing DCI format (e.g., DCI format 1_0/1_1), a wireless device may switch from the PBWP to a first BWP as a new PBWP in response to the BWP indicator indicating the first BWP different from the PBWP and/or the first DCI being transmitted on the PBWP. In an example, the wireless device may receive a DL assignment on the PBWP in response to the BWP indicator indicating the PBWP.

In an example, when receiving the first DCI with the existing DCI format (e.g., DCI format 1_0/1_1), a wireless device may switch from the SBWP to a second BWP as a new SBWP in response to the BWP indicator indicating the second BWP different from the SBWP and/or the first DCI being transmitted on the SBWP. In an example, the wireless device may receive a DL assignment on the SBWP in response to the BWP indicator indicate the SBWP.

In an example, when receiving the second DCI with the second DCI format (e.g., different from DCI format 1_0/ 1_1), a wireless device may activate a third BWP indicated by the BWP indicator as a second SBWP in response to the second field of the second DCI being a first value (e.g., "1" in case of one bit).

In an example, when receiving the second DCI with the second DCI format (e.g., different from DCI format 1_0/ 1_1), a wireless device may deactivate the SBWP indicated by the BWP indicator in response to the second field of the second DCI being a second value (e.g., "0" in case of one bit).

In an example, when at most one SBWP is supported, a gNB may transmit a DCI with a third DCI format (e.g., different from existing DCI format 1_0/1_1) indicating a PBWP switching, or a SBWP activation. In an example, the third DCI format may comprise at least one of: a BWP indicator; a second field indicating a PBWP switching or a SBWP activation based on a value of the second field. In an example, when at most one SBWP is supported, activation of a BWP as a new SBWP may deactivate a SBWP (e.g., if existing) and activate the BWP as the new SBWP at a time.

In an example, a gNB may transmit the DCI with the third DCI format to a wireless device. In an example, when the wireless device receives the DCI and at most one SBWP is supported, the wireless device may switch from the PBWP to a first BWP indicated by the BWP indicator, as a new PBWP, in response to the second field being a first value (e.g., "1" in case of one bit). In an example, the wireless device may receive a DL assignment on the PBWP if the BWP indicator indicate the PBWP.

In an example, when the wireless device receives the DCI with the third DCI format and at most one SBWP is supported, the wireless device may activate a second BWP indicated by the BWP indicator, as a new SBWP, in response to the second field being a second value (e.g., "0" in case of one bit). In an example, the wireless device may deactivate a first SBWP (e.g., if existing) in response to activating the second BWP. In an example, the wireless device may receive a DL assignment on the SBWP if the BWP indicator indicate the SBWP.

In an example, a gNB may transmit one or more DCIs (e.g., DCI format 1_0/1_1) to a wireless device indicating a SBWP activation, or a SBWP deactivation, or a SBWP switching, based on at least one of: one or more values of one or more fields of the one or more DCI; whether the one or more DCI is transmitted on a PBWP or a SBWP. In an example, the one or more DCIs may be transmitted with DCI format 1_0 or 1_1 indicating a PDSCH scheduling. In an example, the one or more fields may comprise at least one of: a carrier indicator; an identifier for DCI format; a BWP indicator; a first field indicating a frequency domain resource assignment; a second field indicating a time domain resource assignment; a PUCCH resource indicator; a TPC command for scheduled PUCCH; a PDSCH-to-HARQ_feedback timing indicator. In an example, reusing an existing DCI format (e.g., DCI format 1_0 or 1_1) for a BWP operation supporting multiple active BWPs may reduce blind decoding complexity at a wireless device. In an example, a PBWP may be in active state until receiving an RRC message.

In an example, the wireless device may switch the SBWP to a first BWP as a new SBWP identified by the BWP indicator, in response to at least one of: the one or more DCIs being transmitted on the SBWP; the BWP indicator indicating the first BWP different from the PBWP and the SBWP; a value of the first field or the second field being different from a first value (e.g., all-zeros); and/or the value of the first field or the second field being different from a second value (e.g., all-ones). In an example, the first value and/or the second value may be predefined (e.g., fixed).

In an example, the wireless device may activate a second BWP as a new SBWP identified by the BWP indicator, in response to at least one of: the BWP indicator indicating the second BWP different from the PBWP and the SBWP; and/or the value of the first field or the second field being the first value (e.g., all-zeros).

In an example, the wireless device may deactivate the SBWP, in response to at least one of: the one or more DCIs being transmitted on the PBWP; the BWP indicator indicating the SBWP different from the PBWP; and/or the value of the first field or the second field being the second value (e.g., all-ones).

In an example, when a PBWP and at most one SBWP are supported, a gNB may transmit one or more DCIs indicating a SBWP activation in response to at least one of: the BWP indicator indicating a BWP different from the PBWP (e.g., if there is no SBWP in the cell); the BWP indicator indicating the BWP different from the SBWP; the one or more DCIs being transmitted on the PBWP; and/or the one or more DCI being transmitted on the SBWP.

In an example, activation of a SBWP may comprise deactivating a first SBWP and activating a first inactive BWP as the SBWP at a time. In an example, activation of a SBWP may comprise activating a first inactive BWP as the SBWP, e.g., when there is no active SBWP before the activating.

In an example, the wireless device may receive a DL assignment on a PBWP (e.g., without PBWP switching), in response to the BWP indicator indicating the PBWP. In an example, the wireless device may receive a DL assignment on a SBWP (e.g., without SBWP switching/activation), in response to the BWP indicator indicating the SBWP. In an example, in response to receiving the DL assignment on the PBWP, the wireless device may receive one or more DL data packets from a first PDSCH on the PBWP. In an example, in response to receiving the DL assignment on the SBWP, the wireless device may receive one or more DL data packets from a second PDSCH on the SBWP.

In an example, when a SBWP activation or deactivation is not time urgent, a gNB may transmit a MAC CE to activate or deactivate a SBWP, to a wireless device. In an example, the gNB may transmit a DCI to switch from a first SBWP to a second BWP as a second SBWP, wherein a PBWP may be in active state until switched by an RRC message.

In an example, when one or more MAC CEs are used for activating/deactivating a SBWP and the PBWP is in active state until switched by an RRC message, the gNB may transmit one or more DCIs (e.g., DCI format 1_0/1_1) to switch from a first SBWP to a second BWP as a second SBWP, based on at least one of: one or more values of one or more fields of the one or more DCIs; whether the one or more DCIs is transmitted on a PBWP or a SBWP.

In an example, the wireless device may switch a first SBWP to a second BWP as a second SBWP identified by the BWP indicator, in response to at least one of: the one or more DCIs being transmitted on the first SBWP; the BWP indicator indicating the second BWP different from the PBWP and the first SBWP.

In an example, the wireless device may receive a DL assignment on a PBWP, in response to the BWP indicator indicating the PBWP. In an example, the wireless device may receive a DL assignment on a SBWP (e.g., without SBWP switching), in response to the BWP indicator indicating the SBWP. In an example, in response to receiving the DL assignment on the PBWP, the wireless device may receive one or more DL data packets from a first PDSCH on the PBWP. In an example, in response to receiving the DL assignment on the SBWP, the wireless device may receive one or more DL data packets from a second PDSCH on the SBWP.

In an example, when a PBWP and at most one SBWP of a plurality of BWPs are supported and one or more MAC CEs are used for activating/deactivating a SBWP, a gNB may transmit one or more DCIs indicating a PDSCH scheduling on a PBWP or a SBWP, based on a BWP indicator of the one or more DCIs. In an example, the wireless device may receive a DL assignment on a PBWP, in response to the BWP indicator indicating the PBWP. In an example, the wireless device may receive a DL assignment on a SBWP (e.g., without SBWP switching/activation), in response to the BWP indicator indicating the SBWP. In an example, in response to receiving the DL assignment on the PBWP, the wireless device may receive one or more DL data packets from a first PDSCH on the PBWP. In an example, in response to receiving the DL assignment on the SBWP, the wireless device may receive one or more DL data packets from a second PDSCH on the SBWP.

In an example, a wireless device may perform SBWP switching based on the one or more MAC CEs. In an example, a gNB may transmit the one or more MAC CEs indicating activating a second SBWP and deactivating a first SBWP by setting a second field of the one or more first fields corresponding the second SBWP to a first value (e.g., "1") and setting a first field of the one or more first fields corresponding to the first SBWP to a second value (e.g., "0"). In an example, in response to receiving the one or more MAC CEs, the wireless device may switch from the first SBWP to the second SBWP.

In an example, one or more MAC CEs for SBWP activation/deactivation may introduce intolerant transition latency (e.g., scheduling the MAC CE in PDSCH resources at a gNB and sending one or more HARQ feedbacks for the MAC CE in PUCCH/PUSCH resources at a wireless device) for some services (e.g., URLLC). In an example, a wireless device may receive multiple types of services which may require a quick SBWP activation/deactivation. Embodiments may reduce the transition latency by introducing a first DCI format, different from one or more existing DCI formats (e.g., DCI format 1_0/1_1). The first DCI format may comprise one or more fields indicating SBWP activation/deactivation/switching based on one or more values of the one or more fields of the first DCI format. In an example, the first DCI format may comprise at least one of: a BWP indicator; a second field (e.g., BWP action/mode indication) indicating one of SBWP activation, SBWP deactivation and SBWP switching, wherein a PBWP may be in active state until switched/deactivated by an RRC message.

In an example, when receiving one or more DCIs with the first DCI format, a wireless device may receive a DL assignment on a PBWP in response to a BWP indicator indicating the PBWP and/or the second field being set to a first value (e.g., "00" in case of two bits). In an example, when receiving one or more DCIs with the first DCI format, a wireless device may receive a DL assignment on a SBWP in response to the BWP indicator indicating the SBWP and/or the second field being set to a first value (e.g., "00" in case of two bits).

In an example, when receiving the one or more DCIs with the first DCI format, the wireless device may activate a first BWP as a SBWP, in response to at least one of: the BWP indicator indicating the first BWP; and/or the second field being set to a second value (e.g., "01" in case of two bits).

In an example, when receiving the one or more DCIs with the first DCI format, the wireless device may deactivate a SBWP, in response to at least one of: the BWP indicator indicating the SBWP; and the second field being set to a third value (e.g., "10" in case of two bits).

In an example, when receiving the one or more DCIs with the first DCI format, the wireless device may switch a SBWP to a second BWP, in response to at least one of: the BWP indicator indicating the second BWP; the second BWP being different from the PBWP and the SBWP; and/or the second field being set to a fourth value (e.g., "11" in case of two bits).

In an example, a gNB may transmit a first DCI with an existing DCI format (e.g., DCI format 1_0/1_1) indicating SBWP switching, or DL scheduling on the PBWP/SBWP.

In an example, a gNB may transmit a second DCI with a second DCI format (e.g., different from the existing DCI format, e.g., DCI format 1_0/1_1) indicating SBWP activation/deactivation. In an example, the second DCI format may comprise at least one of: a BWP indicator; a second field indicating activation or deactivation of a SBWP.

In an example, when receiving the first DCI with the existing DCI format (e.g., DCI format 1_0/1_1), a wireless device may switch from the SBWP to a first BWP as a new SBWP in response to the BWP indicator indicating the first BWP different from the SBWP and/or the first DCI being transmitted on the SBWP.

In an example, when receiving the second DCI with the second DCI format (e.g., different from DCI format 1_0/1_1), a wireless device may activate a second BWP indicated by the BWP indicator as a second SBWP in response to the second field of the second DCI being a first value (e.g., "1" in case of one bit).

In an example, when receiving the second DCI with the second DCI format (e.g., different from DCI format 1_0/1_1), a wireless device may deactivate the SBWP indicated by the BWP indicator in response to the second field of the second DCI being a second value (e.g., "0" in case of one bit).

In an example, when at most one SBWP is supported, a gNB may transmit a DCI with a DCI format (e.g., existing DCI format 1_0/1_1) indicating a SBWP activation. In an example, a wireless device may activate a first BWP as a second SBWP in response to the BWP indicator indicating the first BWP different from a first SBWP and the PBWP. In an example, when at most one SBWP is supported and the PBWP is in active state until switched/deactivated by an RRC message, the activating the first BWP as the second SBWP may comprise deactivating the first SBWP and activating the first BWP as the second SBWP at a time. In an example, when at most one SBWP is supported and the PBWP is in active state until switched/deactivated by an RRC message, the activating the first BWP as the second SBWP may comprise activating the first BWP as the second SBWP, if there is no SBWP before the activating.

In an example, a wireless device may support a plurality of active BWPs in a cell, wherein no PBWP or SBWP of the plurality of active BWPs is designated. In an example, a gNB may transmit one or more DCIs indicating an active BWP switching, or a BWP activation, a BWP deactivation, or a PDSCH scheduling on the active BWP, based on at least one of: one or more values of one or more fields of the one or more DCIs. In an example, the one or more DCIs may be transmitted with DCI format 1_0 or 1_1 indicating a PDSCH scheduling. In an example, the one or more fields may comprise at least one of: a carrier indicator; an identifier for DCI format; a BWP indicator; a first field indicating a frequency domain resource assignment; a second field indicating a time domain resource assignment; a PUCCH resource indicator; a TPC command for scheduled PUCCH; a PDSCH-to-HARQ_feedback timing indicator. In an example, reusing an existing DCI format (e.g., DCI format 1_0 or 1_1) for a BWP operation supporting multiple active BWPs may reduce blind decoding complexity at a wireless device.

In an example, with active BWPs in active state, a wireless device may switch from a first active BWP to a second BWP identified by the BWP indicator, in response to at least one of: the one or more DCIs being transmitted on the first active BWP; the BWP indicator indicating the second BWP different from the active BWPs; one or more value of the first field and/or the second field being different from a first value (e.g., all-zeros); and/or the value of the first field or the second field being different from a second value (e.g., all-ones).

In an example, with active BWPs in active state, the wireless device may activate a third BWP identified by the BWP indicator, in response to at least one of: the BWP indicator indicating the third BWP different from the active BWPs; and/or the value of the first field or the second field being the first value (e.g., all-zeros).

In an example, with active BWPs in active state, the wireless device may deactivate an active BWP, in response to at least one of: the BWP indicator indicating the active BWP; and/or the value of the first field or the second field being the second value (e.g., all-ones).

In an example, the wireless device may receive a DL assignment on an active BWP (e.g., without active BWP switching), in response to at least one of: the BWP indicator indicating the active BWP; the value of the first field or the second field not being the first value (e.g., all-zeros); and/or the value of the first field or the second field not being the second value (e.g., all-ones). In an example, in response to receiving the DL assignment on the active BWP, the wireless device may receive one or more DL data packets from a PDSCH on the active BWP.

In an example, a wireless device may support a plurality of active BWPs in a cell, wherein no PBWP or SBWP of the plurality of active BWPs is designated. In an example, when BWP activation or deactivation is not time urgent, a gNB may transmit a MAC CE to activate or deactivate a BWP, to a wireless device. In an example, the gNB may transmit a DCI to switch from a first active BWP to a second BWP as a second active BWP.

In an example, with active BWPs in active state, a wireless device may switch from a first active BWP to a second BWP identified by the BWP indicator, in response to at least one of: the BWP indicator indicating the second BWP different from the active BWPs; the DCI being transmitted on the first active BWP.

In an example, the wireless device may receive a DL assignment on an active BWP (e.g., without active BWP switching), in response to at least one of: the BWP indicator indicating the active BWP. In an example, in response to receiving the DL assignment on the active BWP, the wireless device may receive one or more DL data packets from a PDSCH on the active BWP.

In an example, a wireless device may support a plurality of active BWPs in a cell, wherein no PBWP or SBWP of the plurality of active BWPs is designated. In an example, one or more MAC CEs for SBWP activation/deactivation may introduce intolerant transition latency (e.g., scheduling the MAC CE in PDSCH resources and sending one or more HARQ feedbacks for the MAC CE in PUCCH/PUSCH resources) for some services (e.g., URLLC). In an example, a wireless device may receive multiple types of services which may require quick SBWP activation/deactivation.

In an example, when receiving one or more DCIs with the first DCI format and multiple BWPs are in active state, a wireless device may switch a first active BWP to a first BWP as a second active BWP, in response to at least one of: the BWP indicator indicating the first BWP; the first BWP being different from the multiple BWPs; and/or the second field being set to a first value (e.g., "00" in case of two bits). In an example, the wireless device may receive a DL assignment on an active BWP (e.g., without BWP switching), in response to the BWP indicator indicating the active BWP and/or the second field being set to a first value (e.g., "00" in case of two bits).

In an example, when receiving the one or more DCIs with the first DCI format and multiple BWPs are in active state, the wireless device may activate a second BWP as an active BWP, in response to at least one of: the BWP indicator indicating the second BWP; and/or the second field being set to a second value (e.g., "01" in case of two bits).

In an example, when receiving the one or more DCIs with the first DCI format and multiple BWPs are in active state, the wireless device may deactivate an active BWP, in response to at least one of: the BWP indicator indicating the active BWP; and the second field being set to a third value (e.g., "10" in case of two bits).

In an example, when receiving the one or more DCIs with the first DCI format and multiple BWPs are in active state, the wireless device may switch a first active BWP to a third BWP, in response to at least one of: the BWP indicator indicating the third BWP; the third BWP being different from the multiple BWPs; and/or the second field being set to a fourth value (e.g., "11" in case of two bits).

In an example, a gNB may transmit a first DCI with an existing DCI format (e.g., DCI format 1_0/1_1) indicating BWP switching, or DL scheduling on an active BWP.

In an example, a gNB may transmit a second DCI with a second DCI format (e.g., different from the existing DCI format) indicating BWP activation/deactivation. In an example, the second DCI format may comprise at least one of: a BWP indicator; a second field indicating activation or deactivation of a BWP.

In an example, when receiving the first DCI with the existing DCI format (e.g., DCI format 1_0/1_1) and multiple BWPs are in active state, a wireless device may switch from a first active BWP to a first BWP as a second active BWP in response to the BWP indicator indicating the first BWP different from the multiple active BWPs and/or the first DCI being transmitted on the first active BWP. In an example, the wireless device may receive a DL assignment on the first active BWP if the BWP indicator indicates the first active BWP.

In an example, when receiving the second DCI with the second DCI format (e.g., different from DCI format 1_0/1_1), a wireless device may activate a third BWP indicated by the BWP indicator as a second active BWP in response to the second field of the second DCI being a first value (e.g., "1" in case of one bit).

In an example, when receiving the second DCI with the second DCI format (e.g., different from DCI format 1_0/1_1), a wireless device may deactivate an active BWP indicated by the BWP indicator in response to the second field of the second DCI being a second value (e.g., "0" in case of one bit).

In an example, a gNB may transmit one or more messages comprising configuration parameters of a plurality of cells. In an example, at least one cell of the plurality of cells may comprise a plurality of BWPs comprising a default BWP. In an example, the configuration parameters may further indicate that the at least one cell may be associated with a BWP timer and a timer value. In an example, a first timer value associated with a first cell of the at least one cell may be same as or different from a second timer value associated with a second cell of the at least one cell.

In an example, a gNB may transmit a PDCCH on a first active BWP to a wireless device. In an example, the wireless device may start the BWP timer (e.g., BWP inactivity timer) with the timer value in response to receiving the PDCCH on the first active BWP.

In an example, when cross-carrier scheduling is supported, a gNB may transmit a first DCI via a PDCCH on a first active BWP of a first cell, of the at least one cell, for scheduling a second BWP of a second active cell of the at least one cell. In an example, the wireless device may transit the second BWP of the second cell from inactive state to active state, if the second BWP is in inactive state before receiving the first DCI. In an example, the wireless device may start/restart a first BWP timer with the timer value associated with the first cell (or the first active BWP) in response to receiving the first DCI. In an example, the wireless device may start/restart a second BWP timer with the time value associated with the second cell (or the second BWP) in response to receiving the first DCI on the first active BWP.

In an example, the gNB and/or the UE may switch to the default BWP as an active BWP in response to an expiry of the BWP timer associated to the at least one cell.

Existing BWP and CA operation mechanisms may allow at most one active BWP in a cell. The cell may be associated with a BWP timer with a timer value. In an example, a wireless device may start the BWP timer with the timer value in response to receiving a first DCI on a first BWP (e.g., active BWP). In an example, the wireless device may switch to a second BWP in response to receiving the first DCI for BWP switching from the first BWP to the second BWP. In an example, the wireless device may start/restart the BWP timer with the timer value in response to the BWP switching. In an example, existing BWP operation mechanism may not support multiple active BWPs in a cell. Existing BWP and CA operation mechanisms may not efficiently manage a state (e.g., active state or inactive state) of multiple active BWPs, when multiple active BWPs are supported. Existing BWP and CA operation mechanisms may not efficiently manage a state (e.g., active state or inactive state) of multiple active BWPs, when multiple active BWPs are supported, and/or when multiple BWP timer are associated with the multiple active BWPs. Example embodiments may provide efficient BWP operation mechanism for supporting multiple active BWPs operation in a cell. Example embodiments may provide efficient BWP timer management for supporting multiple active BWPs operation in a cell.

In an example, a gNB and/a wireless device may communicate on multiple active BWPs of a plurality of BWPs for transmitting/receiving multiple types of services, in a cell. In an example, each of the plurality of BWPs may be in one of active state and inactive state. In an example, the plurality BWPs may comprise a default BWP. In an example, the default BWP may be in inactive state if the default BWP is different from one or more of the multiple active BWPs. In an example, a wireless device may switch a first active BWP of the multiple active BWPs to the default BWP in response to at least one of: receiving a DCI for BWP switching to the default BWP; a first BWP timer associated with the first active BWP expiring. In an example, a wireless device may switch a second active BWP of the multiple active BWPs to the default BWP in response to at least one of: receiving a DCI for BWP switching to the default BWP; a second BWP timer associated with the second active BWP expiring. In an example, the first inactivity timer may be associated with a first timer value. In an example, the second inactivity timer may be associated with a second timer value.

In an example, a gNB may transmit one or more messages comprising configuration parameters indicating a cell comprising a default BWP and/or a plurality of BWPs. In example, the configuration parameters may further indicate each of the plurality of BWPs may be associated with a BWP specific timer and a BWP timer value. In an example, a first BWP timer value of a first BWP of the plurality of BWPs may be different from a second BWP timer value of a second BWP of the plurality of BWPs. In example, the configuration parameters may further indicate each of the plurality of BWPs may be associated with a BWP specific timer and a cell timer value. In an example, the BWP timers of the plurality of BWPs may be associated with the same cell timer value.

In an example, a gNB may transmit one or more messages comprising configuration parameters indicating a cell comprising a default BWP and/or a plurality of BWP groups. In example, the configuration parameters may further indicate each BWP group of the plurality of BWP groups may be associated with a BWP group specific timer and a BWP group timer value.

In an example, a wireless device may receive a first DCI via a first PDCCH on a first BWP of the plurality of BWPs. In an example, the wireless device start/restart a first BWP specific timer with a first BWP (or the cell) timer value in response to receiving the first DCI on the first BWP. In an example, a wireless device may receive a second DCI via a second PDCCH on a second BWP of the plurality of BWPs. In an example, the wireless device start/restart a second BWP specific timer with a second BWP (or the cell) timer value in response to receiving the second DCI on the second BWP. In an example, the wireless device may manage the first BWP specific timer of the first BWP and the second BWP specific timer of the second BWP independently.

In an example, the wireless device start/restart a first BWP group specific timer with a first BWP group (or the cell) timer value in response to receiving a DCI on a first BWP of a first BWP group of the plurality of BWP groups. In an example, the wireless device start/restart a second BWP group specific timer with a second BWP group (or the cell) timer value in response to receiving a DCI on a second BWP of a second BWP group of the plurality of BWP groups. In an example, the wireless device may manage the first BWP group specific timer of the first BWP group and the second BWP group specific timer of the second BWP group independently.

In an example, a gNB may transmit one or more messages comprising configuration parameters indicating a cell comprising a primary active BWP and a plurality of BWPs in a cell. In example, the configuration parameters may further indicate each of the plurality of BWPs may be associated with a BWP specific timer and a BWP timer value or a cell specific timer value. In an example, the primary active BWP may remain in active state until receiving a second command indicating a primary active BWP switching. In an example, the second command may be an RRC message, a MAC CE, and/or a DCI (e.g., DCI indicating a primary active BWP switching). In an example, the primary active BWP may not be associated with a BWP specific timer. In an example, the wireless device may manage a first BWP specific timer of a first BWP of the plurality of BWPs and the second BWP specific timer of a second BWP of the plurality of BWPs independently and keep the primary active BWP active until receiving the second command.

In an example, a gNB may transmit a first DCI on a first BWP (e.g., a first DL BWP) of the plurality of BWPs indicating a DL assignment or an UL grant for a second BWP of the plurality of BWPs. In an example, the first BWP may be associated with a first BWP specific timer with a first BWP timer value (or a cell timer value). In an example, the first BWP may be a primary active BWP. In an example, the second BWP may be associated with a second BWP specific timer with a second BWP timer value (or a cell timer value). In an example, the wireless device may start/restart the first BWP specific timer with the first BWP timer value (or the cell timer value) in response to receiving the first DCI. In an example, the wireless device may start/restart the second BWP specific timer with the second BWP timer value (or the cell timer value) in response to receiving the first DCI.

In an example, the first DCI transmitted on the first BWP may indicate a configured (or dynamic) downlink assignment on the second BWP (e.g., a second DL BWP). In an example, the first DCI transmitted on the first BWP may indicate a configured (or dynamic) uplink grant on the second BWP (e.g., an UL BWP). In an example, the first DCI transmitted on the first BWP may be transmitted via a PDCCH addressed to a first identifier on the first BWP. In an example, the first identifier may be one of C-RNTI and CS-RNTI. In an example, the first identifier may be one of SI-RNTI, RA-RNTI or a TC-RNTI, or P-RNTI, or INT-RNTI, or SFI-RNTI, or TPC-PUSCH-RNTI, or TPC-PUCCH-RNTI, or TPC-SRS-RNTI, or CS-RNTI, or SP-CSI-RNTI, or C-RNTI.

In an example, a gNB may transmit a second DCI (or a MAC CE) on a first BWP of the plurality of BWPs indicating activating a second BWP of the plurality of BWPs. In an example, the first BWP may be associated with a first BWP specific timer with a first BWP timer value (or a cell timer value). In an example, the first BWP may be a primary active BWP. In an example, the second BWP may be associated with a second BWP specific timer with a second BWP timer value (or a cell timer value). In an example, the wireless device may start/restart the first BWP specific timer with the first BWP timer value (or the cell timer value) in response to receiving the second DCI. In an example, the wireless device may activate the second BWP in response to receiving the second DCI. In an example, the wireless device may start/restart the second BWP specific timer with the second BWP timer value (or the cell timer value) in response to the activating the second BWP. In an example, a gap between a first time when a DCI for the activation is received and a second time when the activation is completed may be zero or a value greater than zero.

In an example, a gNB may transmit a third DCI (or a MAC CE) on a first BWP of the plurality of BWPs indicating deactivating a second BWP of the plurality of BWPs. In an example, the first BWP may be associated with a first BWP specific timer with a first BWP timer value (or a cell timer value). In an example, the first BWP may be a primary active BWP. In an example, the second BWP may be associated with a second BWP specific timer with a second BWP timer value (or a cell timer value). In an example, the wireless device may not start/restart the first BWP specific timer with the first BWP timer value (or the cell timer value) in response to receiving the second DCI. In an example, the wireless device may deactivate the second BWP in response to receiving the second DCI. In an example, the wireless device may reset the second BWP specific timer to the second BWP specific timer value (or the cell specific timer value) and/or not start the second BWP specific timer in response to the deactivating the second BWP.

In an example, a gNB may transmit a fourth DCI on a first active BWP of the plurality of BWPs indicating switching from a second active BWP to a third BWP as a third active BWP. In an example, the first active BWP may be associated with a first BWP specific timer with a first BWP timer value (or a cell timer value). In an example, the first BWP may be a primary active BWP. In an example, the second active BWP may be associated with a second BWP specific timer with a second BWP timer value (or a cell timer value). In an example, the third BWP may be associated with a third BWP specific timer with a third BWP timer value (or a cell timer value). In an example, the wireless device may start/restart the first BWP specific timer with the first BWP timer value (or the cell timer value) in response to receiving the fourth DCI. In an example, the wireless device may deactivate the second active BWP and activate the third BWP as the third active BWP at a time in response to receiving the fourth DCI. In an example, the wireless device may reset the second BWP specific timer to the second BWP timer value (or the cell timer value) and/or not start the second BWP specific timer in response to the deactivating the second active BWP. In an example, the wireless device may start/restart the third BWP specific timer with the third BWP timer value (or the cell timer value) in response to the activating the third BWP. In an example, a gap between a first time when a DCI for the switching is received and a second time when the switching is completed may be zero or a value greater than zero.

In an example, a gNB may transmit one or more messages comprising configuration parameters indicating a cell comprising a default BWP and a plurality of BWPs in a cell. In example, the configuration parameters may further indicate each of the plurality of BWPs may be associated with a BWP specific timer and a BWP timer value or a cell timer value. In an example, a first active BWP of multiple active BWPs of the plurality of BWPs may be designated as a primary active BWP (PBWP). In an example, at least a second active BWP of multiple active BWPs of the plurality of BWPs may be designated as a secondary active BWP (SBWP). In an example, the default BWP may be in inactive state when the default BWP is different from the PBWP.

In an example, a wireless device may start/restart a first BWP specific timer in response to receiving a first command indicating at least one of: the PBWP being activated; a PBWP switching; and/or DL assignment/UL grant on the PBWP. In an example, the wireless device may start/restart a second BWP specific timer in response to receiving a second command indicating at least one of: the SBWP being activated; a SBWP switching; and DL assignment/UL grant on the SBWP.

In an example, the wireless device may monitor a first PDCCH on the PBWP in response to the first BWP specific timer is running. In an example, the wireless device may monitor a second PDCCH on the SBWP in response to the second BWP specific timer is running.

In an example, the wireless device may deactivate the SBWP in response to the second BWP specific timer expiring and the first BWP specific timer being running. In an example, the wireless device may keep the PBWP in active state in response to the second BWP specific timer expiring and the first BWP specific timer being running. In an example, the wireless device may keep the default BWP in inactive state in response to the second BWP specific timer expiring and the first BWP specific timer being running.

In an example, the wireless device may switch from the PBWP to the default BWP in response to the second BWP specific timer expiring and the first BWP specific timer expiring. In an example, the wireless device may switch from the PBWP to the default BWP in response to one or more BWP specific timers expiring. In an example, the one or more BWP specific timers may comprise at least the second BWP specific timer and the first BWP specific timer. In an example, the wireless device may activate the default BWP and deactivate the PBWP at a time, in response to the switching. In an example, a gap between a first time when the switching is started and a second time when the switching is completed may be zero or a value greater than zero.

In an example, a gNB may transmit one or more messages comprising configuration parameters indicating a cell comprising a default BWP and a plurality of BWPs in a cell. In example, the configuration parameters may further indicate each of the plurality of BWPs may be associated with a BWP specific timer and a BWP timer value or a cell timer value. In an example, a first active BWP of multiple active BWPs of the plurality of BWPs may be designated as a primary active BWP (PBWP). In an example, at least a second active BWP of multiple active BWPs of the plurality of BWPs may be designated as a secondary active BWP (SBWP). In an example, the default BWP may be in inactive state when the default BWP is different from the PBWP. In an example, the SBWP may be not configured with a PDCCH. In an example, a gNB may transmit a downlink scheduling or an uplink grant for the SBWP via a PDCCH on the PBWP. In an example, the SBWP may be not associated with a BWP specific timer, e.g. when the SBWP is not configured with a PDCCH on the SBWP.

In an example, a wireless device may start/restart a first BWP specific timer in response to receiving a first command indicating at least one of: the PBWP being activated; a PBWP switching; and DL assignment/UL grant on the PBWP. In an example, the wireless device may start/restart a second BWP specific timer (if configured) in response to receiving a second command indicating at least one of: the SBWP being activated; a SBWP switching; and DL assignment/UL grant on the SBWP.

In an example, the wireless device may monitor a first PDCCH on the PBWP in response to the first BWP specific timer is running. In an example, the wireless device may monitor the first PDCCH or a second PDCCH on the PBWP for the SBWP in response to the second BWP specific timer is running.

In an example, the wireless device may switch from the PBWP to the default BWP in response to the first BWP specific timer expiring and/or the second BWP specific timer (if configured) being running. In an example, the wireless device may deactivate the PBWP and activate the default BWP at a time in response to the switching. In an example, the wireless device may deactivate the SBWP in response to the switching. In an example, a gap between a first time when the switching is started and a second time when the switching is completed may be zero or a value greater than zero.

In an example, a gNB may transmit one or more messages comprising configuration parameters indicating a cell comprising a default BWP and a plurality of BWPs in a cell. In example, the configuration parameters may further indicate each of the plurality of BWPs may be associated with a BWP specific timer and a BWP timer value or a cell timer value.

In an example, a wireless device may start/restart a first BWP specific timer in response to receiving a first command indicating at least one of: a first BWP being activated and/or DL assignment/UL grant on the first BWP. In an example, the wireless device may start/restart a second BWP specific timer (if configured) in response to receiving a second command indicating at least one of: a second BWP being activated and/or DL assignment/UL grant on the second BWP.

In an example, the wireless device may monitor a first PDCCH on the first BWP in response to the first BWP specific timer is running. In an example, the wireless device may monitor a second PDCCH on the second BWP in response to the second BWP specific timer is running.

In an example, the wireless device may switch from the second BWP to the default BWP in response to the second BWP specific timer expiring and/or the first BWP specific timer being running. In an example, the wireless device may deactivate the second BWP and activate the default BWP at a time in response to the switching. In an example, the wireless device may keep the first BWP in active state in response to the switching. In an example, a gap between a first time when the switching is started and a second time when the switching is completed may be zero or a value greater than zero. In an example, the wireless device may deactivate the first BWP and keep the default BWP in active state in response to one or more BWP specific timers expiring. In an example, the one or more BWP specific timers may comprise at least: the first BWP specific timer; and the second BWP specific timer.

In an example, a gNB may transmit one or more messages comprising configuration parameters indicating a cell comprising a default BWP and a plurality of BWPs in a cell. In example, the configuration parameters may further indicate each of the plurality of BWPs being associated with a BWP specific timer and a BWP timer value or a cell timer value.

In an example, a wireless device may start/restart a first BWP specific timer in response to receiving a first command indicating at least one of: a first BWP being activated and/or DL assignment/UL grant on the first BWP. In an example, the wireless device may start/restart a second BWP specific timer (if configured) in response to receiving a second command indicating at least one of: a second BWP being activated and/or DL assignment/UL grant on the second BWP.

In an example, the wireless device may monitor a first PDCCH on the first BWP in response to the first BWP specific timer is running. In an example, the wireless device may monitor a second PDCCH on the second BWP in response to the second BWP specific timer is running.

In an example, the wireless device may deactivate the second BWP in response to the second BWP specific timer expiring and/or the first BWP specific timer being running. In an example, the wireless device may deactivate the second BWP in response to the switching. In an example, the wireless device may keep the first BWP in active state in response to the switching. In an example, a gap between a first time when the switching is started and a second time when the switching is completed may be zero or a value greater than zero.

In an example, the wireless device may switch to the default BWP in response to one or more BWP specific timers expiring. In an example, the one or more BWP specific timers may comprise at least: the first BWP specific timer; and the second BWP specific timer. In an example, the wireless device may deactivate the first BWP or the second BWP and activate the default BWP in a time in response to the switching.

In an example, a gNB and a wireless device may align multiple BWP timers when multiple active BWPs are supported, by one or more of the embodiments. In an example, a wireless device may reduce power consumption when multiple active BWPs are supported, by one or more of the embodiments. In an example, a gNB may reduce signaling overhead to maintain time alignments or synchronization on multiple active BWPs, by one or more of the embodiments.

In an example, at least two wireless devices may operate on a first uplink BWP of a cell. In an example, the at least two wireless devices may operate on different downlink BWPs of the cell. In an example, when a base station receives a random access preamble of a random access procedure (e.g., contention-based) via the first uplink BWP, the base station may not identify an identity of a wireless device of the at least two wireless devices transmitting the random access preamble. In response to the not identifying, the base station may not determine on which downlink BWP to transmit a random access response.

In an example, the base station may transmit the random access procedure on the different downlink BWPs. This may result in waste of resources, signaling overhead.

In an example, the wireless device of the at least two wireless devices initiating the random access procedure may switch to a downlink BWP to receive the random access response. The base station may transmit the random access response on the switched downlink BWP. In an example, the switching may enable the base station to transmit the random access response of the random access procedure on a single downlink BWP. This may reduce a number of random access responses transmitted by the base station. In an example, the switching may be based on a linkage between a first uplink BWP specific index of the first uplink BWP and a downlink BWP specific index of the downlink BWP. In an example, the base station and the wireless device may be aware of the linkage. In an example, the linkage may be configured by higher layers (e.g., RRC).

Figure 24A:
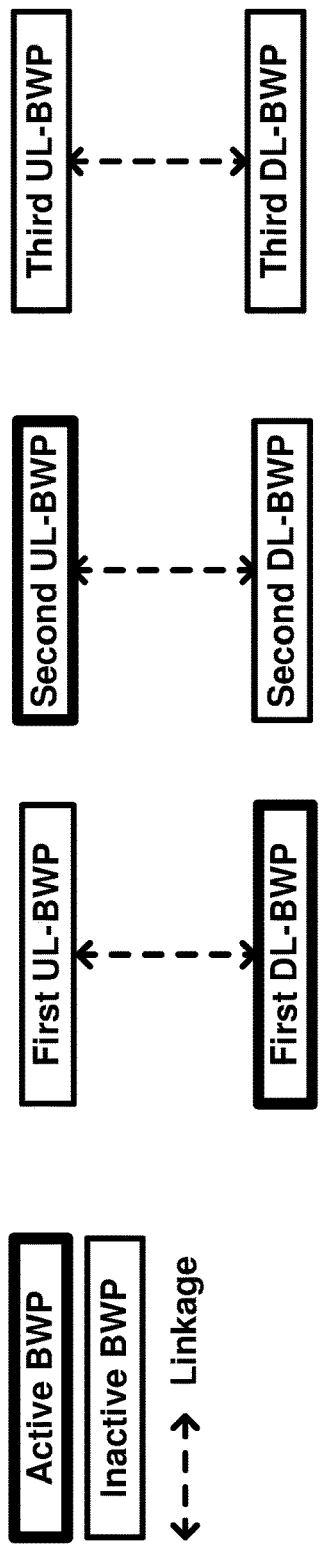
FIG. 24A and FIG. 24B illustrates examples of BWP operation as per an aspect of an embodiment of the present disclosure.
Figure 24B:
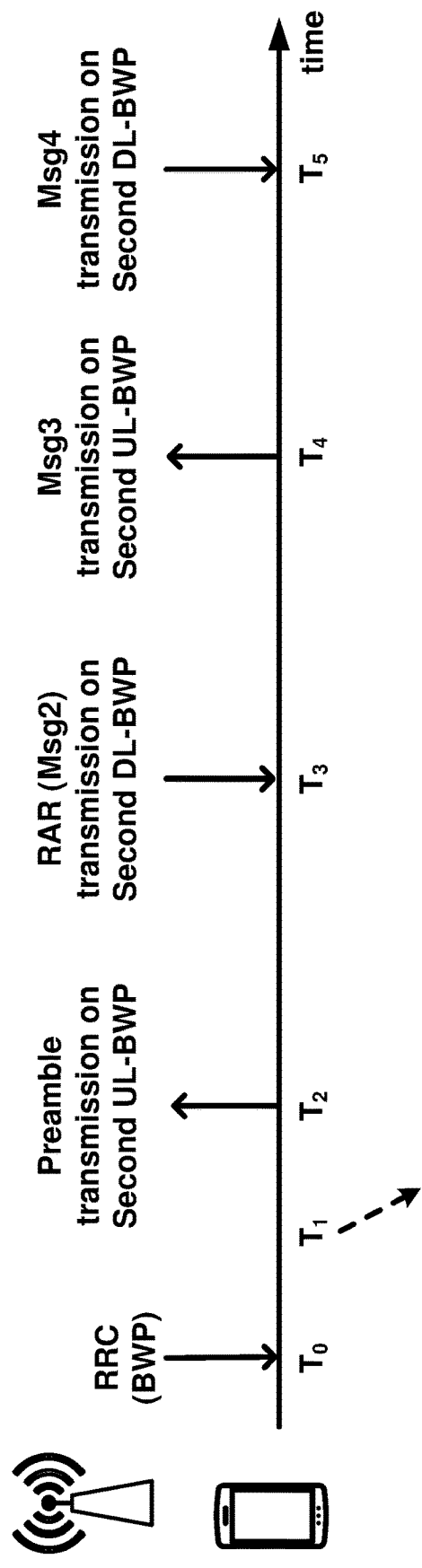

FIG. 24A and FIG. 24B show examples of an existing random-access procedure.

In an example, a wireless device may receive, from a base station, one or more messages (e.g. RRC connection reconfiguration message, or RRC connection reestablishment message, or RRC connection setup message) comprising configuration parameters for a cell (e.g., PCell, PSCell, SCell). In an example, the configuration parameters may comprise bandwidth part (BWP) configuration parameters for a plurality of downlink BWPs of the cell and a plurality of uplink BWPs of the cell (at time T0 in FIG. 24B).

In an example, the wireless device may operate in a paired spectrum (e.g., frequency division duplex (FDD)).

In an example, in FIG. 24A, the plurality of downlink BWPs may comprise First DL-BWP, Second DL-BWP, and Third DL-BWP. The plurality of uplink BWPs may comprise First UL-BWP, Second UL-BWP, and Third UL-BWP.

In an example, the plurality of downlink BWPs may comprise a first downlink BWP (e.g., the First DL-BWP in FIG. 24A). In an example, the plurality of uplink BWPs may comprise a second uplink BWP (e.g., the Second UL-BWP in FIG. 24A).

In an example, the configuration parameters may further comprise downlink BWP specific indices for the plurality of downlink BWPs and/or uplink BWP specific indices for the plurality of uplink BWPs. In an example, each downlink BWP of the plurality of downlink BWPs may be identified by a respective one downlink BWP specific index of the downlink BWP specific indices (e.g., provided by a higher layer parameter bwp-ID). In an example, each uplink BWP of the plurality of uplink BWPs may be identified by a respective one uplink BWP specific index of the uplink BWP specific indices (e.g., provided by a higher layer parameter bwp-ID).

In an example, the second uplink BWP may be identified by a second uplink BWP specific index. The first downlink BWP may be identified by a first downlink BWP specific index.

In an example, at a time slot (e.g., between time T0 and time T1 in FIG. 24B), the wireless device may operate on the first downlink BWP and the second uplink BWP of the cell. In response to the operating, the wireless device may be, at the time slot, active on the first downlink BWP and the second uplink BWP. In an example, at the time slot, the first downlink BWP and the second uplink BWP may be an active downlink BWP and an active uplink BWP of the cell, respectively in response to the operating.

In an example, when the first downlink BWP is the active downlink BWP and the second uplink BWP is the active uplink BWP of the cell (e.g., at the time slot), the wireless device may initiate a random-access procedure (e.g., contention-based random-access procedure, contention-free random-access procedure) at time T1 in FIG. 24B.

In an example, the random-access procedure may be initiated for an initial access from RRC_IDLE, an RRC Connection Re-establishment procedure, a handover, a DL or UL data arrival during RRC_CONNECTED when UL synchronization status is "non-synchronized", a transition from RRC_INACTIVE, a time alignment establishment at SCell addition, a beam failure recovery, or a request for other system information (SI).

In an example, the configuration parameters may not comprise one or more PRACH occasions on the second uplink BWP. In an example, when the wireless device initiates the random-access procedure via the second uplink BWP, in response to the one or more PRACH occasions not being configured on the second uplink BWP, the wireless device may switch from the second uplink BWP to an initial uplink BWP (e.g., indicated by RRC parameter initialUplinkBWP) of the cell. In an example, the cell may not be an SpCell (e.g., PCell, PSCell). In an example, the cell may be a secondary cell (e.g., SCell). In an example, when the cell is not an SpCell, in response to the switching from the second uplink BWP to the initial uplink BWP, the wireless device may perform the random-access procedure on the initial uplink BWP of the cell and a second active downlink BWP of an SpCell.

In an example, the configuration parameters may not comprise one or more PRACH occasions on the second uplink BWP. In an example, when the wireless device initiates the random-access procedure via the second uplink BWP, in response to the one or more PRACH occasions not being configured on the second uplink BWP, the wireless device may switch from the second uplink BWP to an initial uplink BWP (e.g., indicated by RRC parameter initialUplinkBWP) of the cell. In an example, the cell may be an SpCell (e.g., PCell, PSCell). In an example, when the wireless device initiates the random-access procedure via the second uplink BWP, in response to the cell being the SpCell and the one or more PRACH occasions not being configured on the second uplink BWP, the wireless device may switch from the first downlink BWP to an initial downlink BWP (e.g., indicated RRC parameter by initialDownlinkBWP) of the cell. In an example, in response to the switching from the first downlink BWP, the wireless device may perform the random-access procedure on the initial uplink BWP of the cell and the initial downlink BWP of the cell.

In an example, the configuration parameters may comprise one or more PRACH occasions on the second uplink BWP. In an example, the cell may not be an SpCell (e.g., PCell, PSCell). In an example, the cell may be a secondary cell (e.g., SCell). In an example, when the wireless device initiates the random-access procedure, the wireless device may perform the random-access procedure on the second uplink BWP (e.g., via the one or more PRACH resources) of the cell and a second active downlink BWP of a second cell (e.g., SpCell).

In an example, the configuration parameters may comprise one or more PRACH occasions on the second uplink BWP. In an example, the first downlink BWP specific index and the second uplink BWP specific index may be the same. In an example, the cell may be an SpCell (e.g., PCell, PSCell). In an example, when the wireless device initiates the random-access procedure, in response to the first downlink BWP specific index and the second uplink BWP specific index being the same, the wireless device may perform the random-access procedure on the first downlink BWP and the second uplink BWP (e.g., via the one or more PRACH resources) of the cell (e.g., SpCell).

In an example, the configuration parameters may comprise one or more PRACH occasions on the second uplink BWP. In an example, the first downlink BWP specific index may be different from the second uplink BWP specific index. In an example, the cell may be an SpCell (e.g., PCell, PSCell). In an example, when the wireless device initiates the random-access procedure, in response to the first downlink BWP specific index being different from the second uplink BWP specific index, the wireless device may switch from the first downlink BWP to a second downlink BWP (e.g., the Second DL-BWP in FIG. 24A) of the plurality of downlink BWPs of the cell (e.g., SpCell). In an example, the second downlink BWP may be identified by a second downlink BWP specific index. The second downlink BWP specific index and second uplink BWP specific index may be the same. In response to the switching from the first downlink BWP to the second downlink BWP, the wireless device may perform the random-access procedure on the second downlink BWP of the cell and the second uplink BWP (e.g., via the one or more PRACH resources) of the cell.

In an example, the wireless device may perform the random-access procedure on the second downlink BWP (e.g., the Second DL-BWP in FIG. 24A) and the second uplink BWP (e.g., the Second UL-BWP in FIG. 24A) of the cell. The second downlink BWP specific index and the second uplink BWP specific index may be the same.

Figure 25:
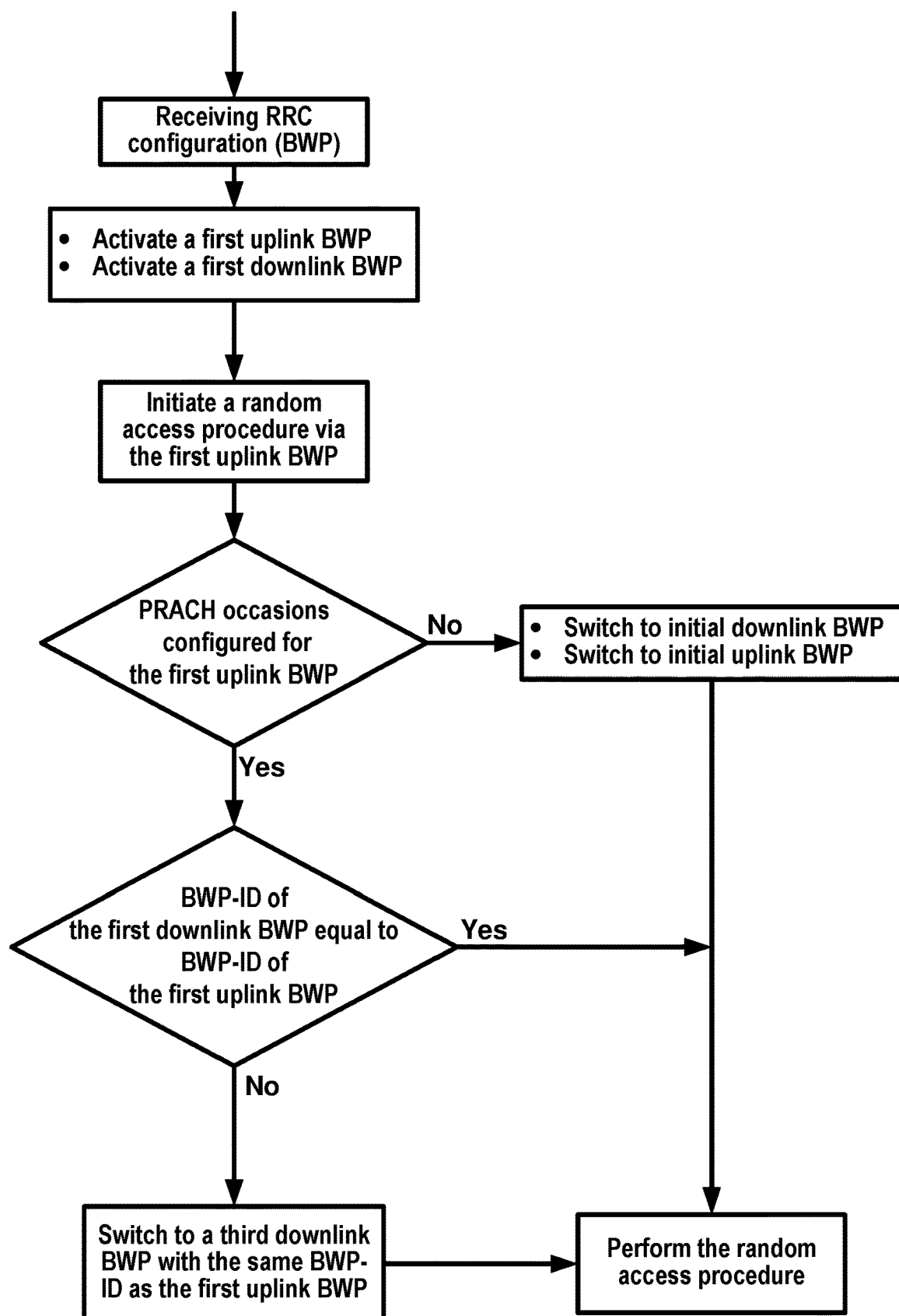
FIG. 25 is an example flowchart of BWP operation as per an aspect of an embodiment of the present disclosure.

FIG. 25 shows an example flowchart of BWP switching for a random-access procedure.

In an example, the configuration parameters may comprise one or more PRACH resources on the second uplink BWP. In an example, the configuration parameters may comprise one or more RSs (e.g., SSB, CSI-RS). In an example, the configuration parameters may further comprise an association (or correspondence) between the one or more RSs and the one or more PRACH resources (e.g., the association may be one-to-one, one-to-many, many-to-one, etc.). The association may be provided by configuration parameters (e.g., RACH-ConfigDedicated, CandidateBeamRSList, RACH-ConfigCommon, ra-ssb-Occasion-MaskIndex, ra-OccasionList etc.).

In an example, the performing the random-access procedure on the second uplink BWP may comprise performing a random-access resource selection on the second uplink BWP. In an example, the performing the random-access resource selection may comprise selecting a first RS in the one or more RSs. The first RS may be a first SSB or a first CSI-RS. In an example, the first RS may be associated with (or corresponding to) a PRACH resource of the one or more PRACH resources configured on the second uplink BWP. The PRACH resource may comprise at least one preamble (associated with PREAMBLE_INDEX) and at least one PRACH occasion (e.g., time, frequency, code) on the second uplink BWP.

In an example, in response to the performing the random-access resource selection, the wireless device may perform a random-access preamble transmission. In an example, in the random-access preamble transmission, the wireless device may transmit, in a first slot, the at least one preamble via the at least one PRACH resource of the second uplink BWP for the random-access procedure (at time T2 in FIG. 24B).

In an example, in response to transmitting the at least one preamble in the first slot, the wireless device may start, from a second slot, a configured response window (e.g., ra-responseWindow). In an example, the configured response window may be configured by the configuration parameters (e.g., RACH-ConfigCommon, BeamFailureRecoveryConfig).

In an example, when the configured response window is running, the wireless device may monitor for a random-access response (RAR). The monitoring for the random-access response may comprise monitoring, for a DCI (e.g. a downlink assignment, an uplink grant), at least one PDCCH in the second downlink BWP of the cell (e.g., SpCell).

In an example, the DCI may be identified with CRC scrambled by a C-RNTI or MCS-C-RNTI of the wireless device in response the random-access procedure being initiated for a beam failure recovery of the cell.

In an example, the DCI may be identified with CRC scrambled by a RA-RNTI.

In an example, an offset between the first slot and the second slot may be fixed. In an example, the offset may be 4 slots.

In an example, the second slot may be at a first PDCCH occasion of the second downlink BWP from the end of the transmitting the at least one preamble.

In an example, when the random-access procedure is initiated for a beam failure recovery, in response to receiving the DCI (e.g., scrambled by C-RNTI or MCS-C-RNTI) on the at least one PDCCH in the second downlink BWP of the cell, within the configured response window, the random-access procedure (e.g., contention-free random-access procedure) for the beam failure recovery may be successfully completed (time T3 in FIG. 24B).

In an example, the random-access response may comprise a first MAC subPDU with a random-access preamble identifier. In an example, the random-access preamble identifier may be associated with (or corresponding to) the at least one preamble (e.g., PREAMBLE_INDEX).

In an example, when the random-access procedure is not initiated for a beam failure recovery (e.g., contention-free random-access procedure for the beam failure recovery), in response to receiving the DCI (e.g., scrambled by RA-RNTI) in the at least one PDCCH of the second downlink BWP of the cell, within the configured response window, and the random-access preamble identifier being associated with (or corresponding to) the at least one preamble, a reception of the random-access response may be successfully completed (time T3 in FIG. 24B).

In an example, when the random-access procedure is not initiated for a beam failure recovery and a reception of the random-access response is successfully completed, in response to receiving the DCI (e.g., scrambled by RA-RNTI) on the at least one PDCCH in the second downlink BWP of the cell, within the configured response window, the random-access procedure (e.g., contention-free random-access procedure) may be successfully completed (time T3 in FIG. 24B).

In an example, the random-access response may comprise a second MAC subPDU with a back-off indicator. In an example, in response to the random-access response comprising the second MAC subPDU with the back-off indicator, the wireless device may set a preamble back-off variable (e.g., PREAMBLE_BACKOFF) to a value indicated by the back-off indicator.

In an example, the random-access response may not comprise a second MAC subPDU with a back-off indicator. In an example, in response to the random-access response not comprising the second MAC subPDU with the back-off indicator, the wireless device may set a preamble back-off variable (e.g., PREAMBLE_BACKOFF) to a value (e.g., 0 ms). The value may be fixed/predefined.

In an example, the configured response window may expire. In an example, the wireless device may not receive the DCI within the configured response window. In response to the configured response window expiring and the wireless device not receiving the DCI (e.g., scrambled by C-RNTI) or a random-access response comprising the random-access preamble identifier being associated with (or corresponding to) the at least one preamble, the wireless device may consider a reception of the random-access response unsuccessful and may increment a preamble transmission counter variable (e.g., PREAMBLE_TRANSMISSION_COUNTER) by one.

In an example, in response to the incrementing, the preamble transmission counter variable may be equal to or greater than a preamble maximum transmission parameter (e.g., RRC parameter preambleTransMax).

In an example, the cell may be an SpCell (e.g., PCell, PSCell). In an example, the wireless device may transmit the at least one preamble on the SpCell in response to the cell being the SpCell. In an example, the wireless device may indicate a problem of the random-access procedure to upper layers (e.g., RRC) in response to the preamble transmission counter variable being equal to or greater than the preamble maximum transmission parameter.

In an example, the cell may be an SCell. In an example, the wireless device may transmit the at least one preamble on the SCell in response to the cell being the SCell. In an example, the wireless device may complete the random-access procedure unsuccessfully in response to the preamble transmission counter variable being equal to or greater than the preamble maximum transmission parameter.

In an example, in response to the indicating the problem of the random-access procedure to the upper layers (e.g., RRC), the upper layers may trigger a radio link failure that may lead to prolonged random-access delay and degraded user experience.

In an example, in response to the incrementing, the preamble transmission counter variable may be less than the preamble maximum transmission parameter plus one. In response to the preamble transmission counter variable being less than the preamble maximum transmission parameter plus one, the wireless device may consider the random-access procedure incomplete.

In an example, in response to the considering the random-access procedure incomplete, the wireless device may select a random back-off time. The random back-off time may be selected according to a uniform distribution between zero and the preamble back-off variable. In an example, the wireless device may start a back-off timer with a value indicated by the random back-off time in response to the selecting.

In an example, while the back-off timer is running, the wireless device may perform a second random-access resource selection. The wireless device may select a second RS in the one or more RSs. In an example, the second RS may be a second SSB or a second CSI-RS. In an example, the second RS may be associated with (or corresponding to) a second PRACH resource of the one or more PRACH resources configured on the second uplink BWP. The second PRACH resource may comprise at least one second preamble and at least one second PRACH occasion (e.g., time, frequency, code) on the second uplink BWP. In an example, the second PRACH resource may be a contention-free random-access resource (e.g., provided by RRC or PDCCH order). In response to the second PRACH resource being the contention-free random-access resource, the wireless device may stop the back-off timer and perform a second random-access preamble transmission. In an example, in the second random-access preamble transmission, the wireless device may transmit, in a third slot, the at least one second preamble via the at least one second PRACH resource of the second uplink BWP for the random-access procedure.

In an example, while the back-off timer is running, the wireless device may perform a second random-access resource selection. The wireless device may not find/select at least one RS in the one or more RSs associated with (or corresponding to) a contention-free random-access resource (e.g., provided by RRC or PDCCH order) until the back-off timer expires. In response to the not finding/selecting the at least one RS in the one or more RSs associated with the contention-free random-access resource, the wireless device may perform a third random-access resource selection in response to the back-off timer expiring. The third random-access resource selection may be different from the second random-access resource selection.

In an example, the wireless device may perform a contention-resolution transmission. The performing the contention-resolution transmission may comprise transmitting a third message (e.g., Msg3) via the second uplink BWP at time T4 in FIG. 24B, in response to the reception of the random-access response being successfully completed (time T3 in FIG. 24B). In an example, the wireless device may start a contention resolution timer (e.g., ra-ContentionResolutionTimer) in response to the transmitting the third message.

In an example, when the contention resolution timer is running, the wireless device may monitor, for a second DCI (e.g. Msg4, a downlink assignment, an uplink grant), at least one second PDCCH in the second downlink BWP of the cell (e.g., SpCell).

In an example, the second DCI may be identified with CRC scrambled by a C-RNTI.

In an example, the second DCI may be identified with CRC scrambled by a TEMPORARY_C-RNTI.

In an example, in response to receiving the second DCI (e.g., scrambled by C-RNTI, TEMPORARY_C-RNTI) in the at least one second PDCCH in the second downlink BWP of the cell while the contention resolution timer is running, the contention-resolution transmission may be successfully completed (time T5 in FIG. 24B). In response to the contention-resolution transmission being successfully completed, the wireless device may stop the contention resolution timer.

In an example, in response to receiving the second DCI in the at least one second PDCCH in the second downlink BWP of the cell while the contention resolution timer is running, the random-access procedure may be successfully completed.

In an example, contention resolution timer may expire. In an example, the wireless device may not receive the second DCI while the contention resolution timer is running. In response to the contention resolution timer expiring and the wireless device not receiving the second DCI, the wireless device may increment a preamble transmission counter variable (e.g., PREAMBLE_TRANSMISSION_COUNTER) by one.

In an example, in response to the incrementing, the preamble transmission counter variable may be equal to or greater than a preamble maximum transmission parameter (e.g., RRC parameter preambleTransMax) (e.g., preambleTransMax+1).

In an example, the cell may be an SpCell (e.g., PCell, PSCell). In an example, the wireless device may indicate a problem of the random-access procedure to upper layers (e.g., RRC) in response to the preamble transmission counter variable being equal to or greater than the preamble maximum transmission parameter.

In an example, in response to the incrementing, the preamble transmission counter variable may be less than the preamble maximum transmission parameter plus one. In response to the preamble transmission counter variable being less than the preamble maximum transmission parameter plus one, the wireless device may consider the random-access procedure incomplete.

In an example, in response to the considering the random-access procedure incomplete, the wireless device may select a random back-off time. The random back-off time may be selected according to a uniform distribution between zero and the preamble back-off variable. In an example, the wireless device may start a back-off timer with a value indicated by the random back-off time in response to the selecting.

In an example, while the back-off timer is running, the wireless device may perform a second random-access resource selection. The wireless device may select a second RS in the one or more RSs. In an example, the second RS may be a second SSB or a second CSI-RS. In an example, the second RS may be associated with (or corresponding to) a second PRACH resource of the one or more PRACH resources configured on the second uplink BWP. The second PRACH resource may comprise at least one second preamble and at least one second PRACH occasion (e.g., time, frequency, code) on the second uplink BWP. In an example, the second PRACH resource may be a contention-free random-access resource (e.g., provided by RRC or PDCCH order). In response to the second PRACH resource being the contention-free random-access resource, the wireless device may stop the back-off timer and perform a second random-access preamble transmission. In an example, in the second random-access preamble transmission, the wireless device may transmit the at least one second preamble via the at least one second PRACH resource of the second uplink BWP for the random-access procedure.

In an example, while the back-off timer is running, the wireless device may perform a second random-access resource selection. The wireless device may not find/select at least one RS in the one or more RSs associated with a contention-free random-access resource (e.g., provided by RRC or PDCCH order) until the back-off timer expires. In response to the not finding/selecting the at least one RS in the one or more RSs associated with the contention-free random-access resource until the back-off timer expires, the wireless device may perform a third random-access resource selection (e.g., in response to the back-off timer expiring). The third random-access resource selection may be different from the second random-access resource selection.

Figure 26A:
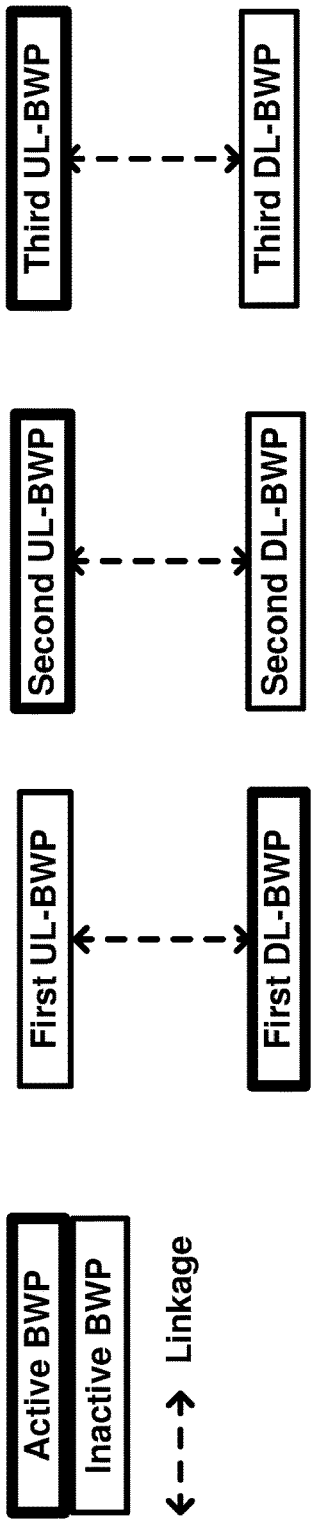
FIG. 26A and FIG. 26B illustrate examples of BWP operation as per an aspect of an embodiment of the present disclosure.
Figure 26B:
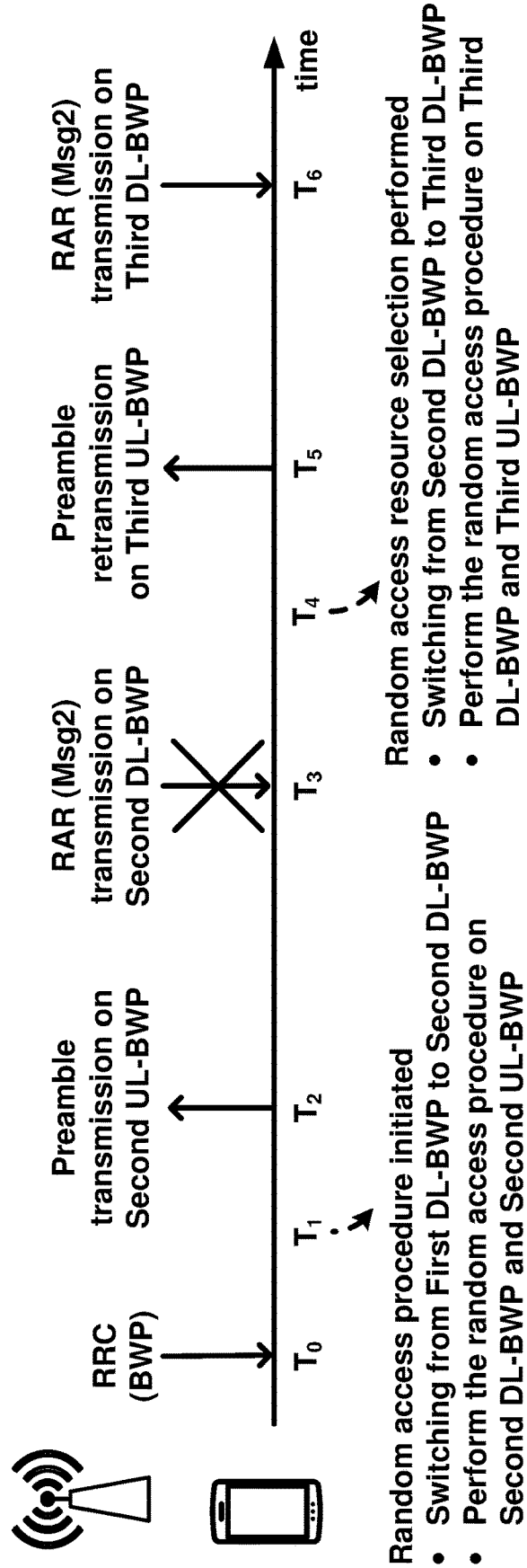

FIG. 26A and FIG. 26B show examples of a random-access procedure as per an aspect of an embodiment of the present disclosure.

In an example, configuration parameters received at time T0 in FIG. 26B are the same as the configuration parameters received at time T0 in FIG. 24B.

In an example, the wireless device may support multiple active BWPs. In an example, the wireless device may operate in a paired spectrum (e.g., frequency division duplex (FDD)).

In an example, the plurality of downlink BWPs may comprise a first downlink BWP (e.g., the First DL-BWP in FIG. 26A), a second downlink BWP (e.g., the Second DL-BWP in FIG. 26A), a third downlink BWP (e.g., the Third DL-BWP in FIG. 26A). In an example, the plurality of uplink BWPs may comprise a second uplink BWP (e.g., the Second UL-BWP in FIG. 26A) and a third uplink BWP (e.g., the Third UL-BWP in FIG. 26A).

In an example, the second uplink BWP and the third uplink BWP may be identified by a second uplink BWP specific index and a third uplink BWP specific index, respectively. The first downlink BWP, the second downlink BWP, and the third downlink BWP may be identified by a first downlink BWP specific index, a second downlink BWP specific index, and a third downlink BWP specific index, respectively.

In an example, at a time slot (e.g., between time T0 and time T1 in FIG. 26B), the wireless device may operate on the first downlink BWP, the second uplink BWP and the third uplink BWP of the cell. In response to the operating, the wireless device may be, at the time slot, active on the first downlink BWP, the second uplink BWP and the third uplink BWP. In an example, at the time slot, the first downlink BWP, the second uplink BWP and the third uplink BWP may be an active downlink BWP, a first active uplink BWP and a second active uplink BWP of the cell, respectively, in response to the operating. In an example, at the time slot, one or more active uplink BWPs of the cell may be the first active uplink BWP and the second active uplink BWP.

In an example, when the first downlink BWP is the active downlink BWP, the second uplink BWP is the first active uplink BWP and the third uplink BWP is the second active uplink BWP of the cell (e.g., at the time slot), the wireless device may initiate a random-access procedure (e.g., contention-based random-access procedure, contention-free random-access procedure) at time T1 in FIG. 26B.

In an example, the configuration parameters may comprise one or more first PRACH resources (or occasions) on the second uplink BWP and one or more second PRACH resources (or occasions) on the third uplink BWP.

In an example, in an unlicensed band, in response to the initiating the random-access procedure, the wireless device may perform a listen-before-talk (LBT) procedure for the cell on the one or more active uplink BWPs (e.g., Second UL-BWP and Third UL-BWP in FIG. 26A) of the cell. In an example, selecting an uplink BWP of the one or more active uplink BWPs to perform the random-access procedure may be based on the LBT procedure. In an example, in the LBT procedure, the wireless device may perform a BWP specific LBT on each active uplink BWP of the one or more active uplink BWPs.

In an example, the one or more active uplink BWPs may comprise one or more PRACH occasions.

In an example, in the LBT procedure, the wireless device may perform a first LBT on the second uplink BWP (e.g., the first active uplink BWP) and a second LBT on the third uplink BWP (e.g., the second active uplink BWP).

In an example, the first LBT may be successful and the second LBT may fail. In response to the first LBT being successful and the second LBT failing, the wireless device may select the second uplink BWP to perform the random-access procedure.

In an example, the first LBT may fail and the second LBT may be successful. In response to the first LBT failing and the second LBT being successful, the wireless device may select the third uplink BWP to perform the random-access procedure.

In an example, the first LBT may be successful and the second LBT may be successful. In response to the first LBT being successful and the second LBT being successful, the wireless device may select an uplink BWP of the one or more active uplink BWPs randomly and/or based on a criterion. In an example, the criterion may be based on the channel load metrics, LBT success rate, channel occupancy, load history of the uplink BWP, time/frequency locations (e.g., close to the initial uplink BWP), of the uplink BWP etc.

In an example, in response to the performing the LBT procedure, the wireless device may select the second uplink BWP to perform the random-access procedure. In an example, the cell may be an SpCell (e.g., PCell, PSCell). In an example, the first downlink BWP specific index may be different from the second uplink BWP specific index. In an example, in response to the first downlink BWP specific index being different from the second uplink BWP specific index, the wireless device may switch from the first downlink BWP to the second downlink BWP (e.g., the Second DL-BWP in FIG. 26A) of the plurality of downlink BWPs of the cell (e.g., SpCell). In an example, the second downlink BWP specific index and second uplink BWP specific index may be the same. In response to the switching from the first downlink BWP to the second downlink BWP, the wireless device may perform the random-access procedure on the second downlink BWP of the cell and the second uplink BWP (e.g., via the one or more first PRACH resources) of the cell.

In an example, the performing the random-access procedure may comprise transmitting, in a first slot, at least one preamble via at least one PRACH resource of the second uplink BWP for the random-access procedure (at time T2 in FIG. 26B).

In an example, in response to transmitting the at least one preamble in the first slot, the wireless device may start, from a second slot, a configured response window (e.g., ra-responseWindow).

In an example, when the configured response window is running, the wireless device may monitor for a random-access response (RAR). The monitoring for the random-access response may comprise monitoring, for a DCI (e.g. a downlink assignment, an uplink grant), at least one PDCCH in the second downlink BWP of the cell (e.g., SpCell).

In an example, the configured response window may expire. In an example, the wireless device may not receive the DCI within the configured response window. In response to the configured response window expiring and the wireless device not receiving the DCI (e.g., scrambled by C-RNTI) or a random-access response comprising the random-access preamble identifier being associated with (or corresponding to) the at least one preamble, the wireless device may consider a reception of the random-access response unsuccessful and may increment a preamble transmission counter variable (e.g., PREAMBLE_TRANSMISSION_COUNTER) by one.

In an example, in response to the incrementing, the preamble transmission counter variable may be less than the preamble maximum transmission parameter plus one. In response to the preamble transmission counter variable being less than the preamble maximum transmission parameter plus one, the wireless device may consider the random-access procedure incomplete. In an example, the wireless device may perform a second LBT procedure for the cell on the one or more active uplink BWPs of the cell in response to the random-access procedure being incomplete.

In an example, in response to the performing the second LBT procedure, the wireless device may select the third uplink BWP to perform the random-access procedure. In an example, the cell may be an SpCell (e.g., PCell, PSCell). In an example, the second downlink BWP specific index may be different from the third uplink BWP specific index. In an example, in response to the second downlink BWP specific index being different from the third uplink BWP specific index, the wireless device may switch from the second downlink BWP to the third downlink BWP (e.g., the Third DL-BWP in FIG. 26A) of the plurality of downlink BWPs of the cell (e.g., SpCell). In an example, the third downlink BWP specific index and the third uplink BWP specific index may be the same. In response to the switching from the second downlink BWP to the third downlink BWP, the wireless device may perform the random-access procedure on the third downlink BWP of the cell and the third uplink BWP (e.g., via the one or more second PRACH resources) of the cell.

In an example, the performing the random-access procedure may comprise transmitting, in a third slot, at least one second preamble via at least one second PRACH resource of the third uplink BWP for the random-access procedure (at time T5 in FIG. 26B).

In an example, in response to transmitting the at least one second preamble in the third slot, the wireless device may start, from a fourth slot, a second configured response window (e.g., ra-responseWindow).

In an example, when the second configured response window is running, the wireless device may monitor for a second random-access response (RAR). The monitoring for the second random-access response may comprise monitoring, for a second DCI (e.g. a downlink assignment, an uplink grant), at least one second PDCCH in the third downlink BWP of the cell (e.g., SpCell).

In an example, when the random-access procedure is not initiated for a beam failure recovery (e.g., contention-free random-access procedure for the beam failure recovery), in response to receiving the second DCI (e.g., scrambled by RA-RNTI) in the at least one second PDCCH of the third downlink BWP of the cell, within the second configured response window, and a random-access preamble identifier (in the second RAR) being associated with (or corresponding to) the at least one second preamble, a reception of the random-access response may be successfully completed (time T6 in FIG. 26B).

In an example, the wireless device may perform a third LBT procedure of the cell on the one or more multiple active uplink BWPs of the cell in response to the reception of the random-access response being successfully completed.

In an example, in response to the performing the third LBT procedure, the wireless device may select the second uplink BWP to perform a contention-resolution transmission.

In an example, the cell may be an SpCell (e.g., PCell, PSCell). In an example, the third downlink BWP specific index may be different from the second uplink BWP specific index. In an example, in response to the third downlink BWP specific index being different from the second uplink BWP specific index, the wireless device may switch from the third downlink BWP to the second downlink BWP (e.g., the Second DL-BWP in FIG. 26A). In an example, the second downlink BWP specific index and the second uplink BWP specific index may be the same. In response to the switching from the third downlink BWP to the second downlink BWP, the wireless device may perform the contention-resolution transmission on the second downlink BWP of the cell and the second uplink BWP of the cell.

In an example, the wireless device may perform a contention-resolution transmission. The performing the contention-resolution transmission may comprise transmitting a third message (e.g., Msg3) via the second uplink BWP in response to the switching from the third downlink BWP to the second downlink BWP. In an example, the wireless device may start a contention resolution timer (e.g., ra-ContentionResolutionTimer) in response to the transmitting the third message.

In an example, when the contention resolution timer is running, the wireless device may monitor, for a second DCI (e.g. Msg4, a downlink assignment, an uplink grant), at least one second PDCCH in the second downlink BWP of the cell (e.g., SpCell).

In an example, in response to receiving the second DCI in the at least one second PDCCH in the second downlink BWP of the cell while the contention resolution timer is running, the random-access procedure may be successfully completed.

In an unlicensed band, an LBT procedure may comprise a first back-off operation. In an example, a random-access procedure may comprise a second back-off operation (e.g., back-off indicator in the MAC subPDU of the RAR). In an example, employing one or more back-off operations (e.g., the first back-off operation and the second back-off operation) may prolong the random-access procedure. In an example, the wireless device may not achieve an uplink synchronization timely in response to prolonging the random-access procedure. In an example, the wireless device may not recover a beam failure timely in response to prolonging the random-access procedure. In an example, the wireless device may declare RLF in response to prolonging the random-access procedure.

In an example, it may be useful for the wireless device to access a channel in response to the channel being idle. The wireless device may determine the channel being idle in response to performing an LBT on the channel and the LBT being successful.

In an example, when a configured response window is running, the wireless device may monitor for a random-access response (RAR). The monitoring for the random-access response may comprise monitoring, for a DCI (e.g. a downlink assignment, an uplink grant), at least one PDCCH in a second downlink BWP of the cell (e.g., SpCell).

In an example, the wireless device may be operating in an unlicensed band. In an example, the wireless device may receive the random-access response. In an example, the random-access response may comprise a first MAC subPDU with a back-off indicator. In an example, in response to operating in the unlicensed band, a value indicated by the back-off indicator may be zero.

In an example, in response to the value indicated by the back-off indicator being zero, the wireless device may start performing a second LBT procedure for a random-access preamble transmission when the wireless device receives the RAR.

In an example, in response to the value indicated by the back-off indicator being zero, the wireless device may not start a back-off timer.

In an example, the wireless device may start performing the second LBT procedure in response to the configured response window expiring.

In an example, the random-access response may not comprise a first MAC subPDU with a back-off indicator in response to operating in the unlicensed band. In an example, in response to the random-access response not comprising the first MAC subPDU with the back-off indicator, the wireless device may set a preamble back-off variable (e.g., PREAMBLE_BACKOFF) to a value (e.g., 0 ms). The value may be fixed/predefined. In an example, the wireless device may start performing a second LBT procedure for a random-access preamble transmission in response to the receiving the RAR.

Figure 27:
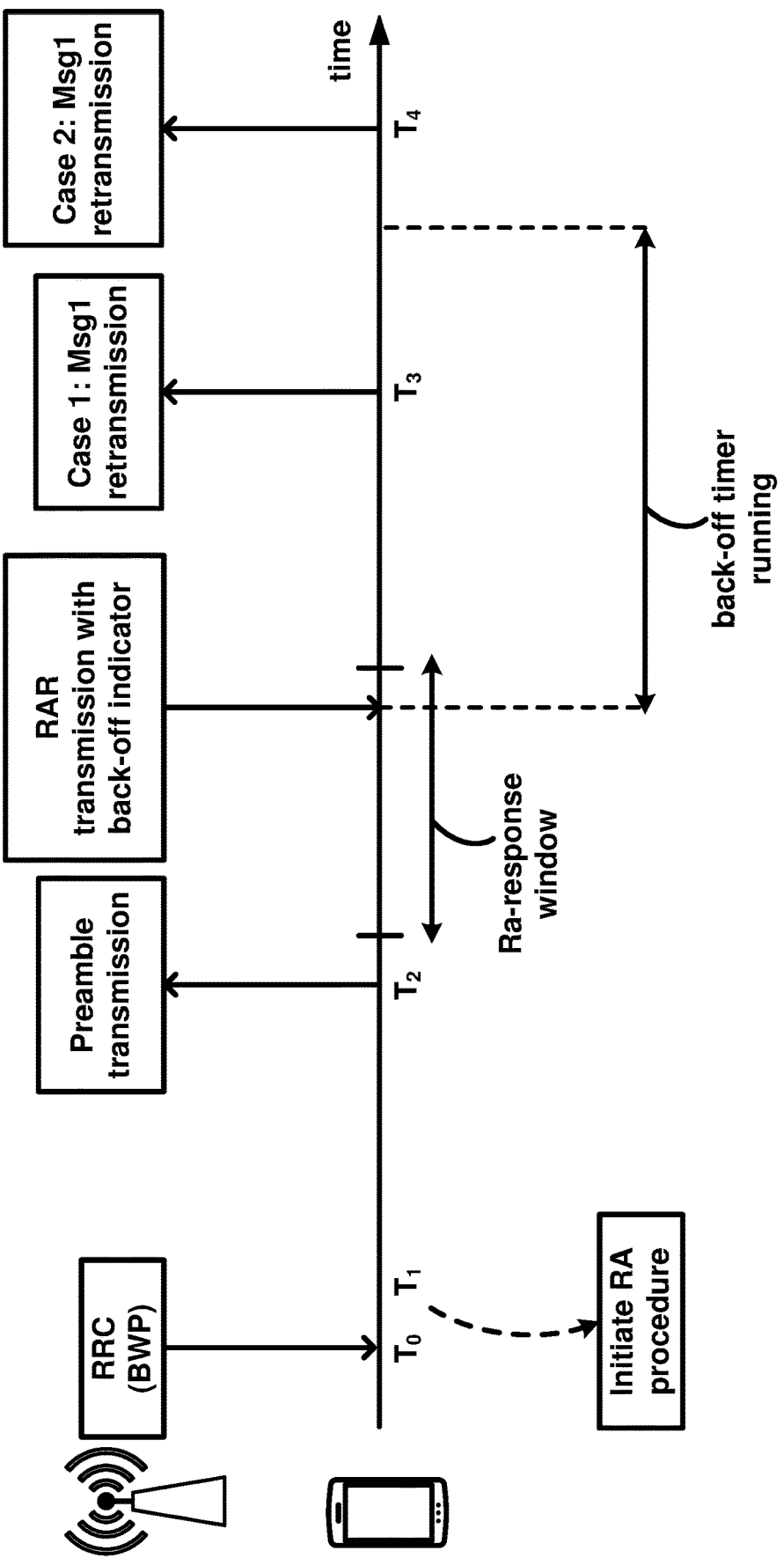
FIG. 27 is an example of BWP operation as per an aspect of an embodiment of the present disclosure.

FIG. 27 shows an example of a random-access procedure as per an aspect of an embodiment of the present disclosure.

The signaling/procedures at time T0, T1 and T2 in FIG. 27 are same as the ones in FIG. 24B at time T0, T1 and T2

In an example, while the back-off timer is running, the wireless device may perform a second random-access resource selection. The wireless device may select a second RS in the one or more RSs. In an example, the second RS may be a second SSB. In an example, the second RS may be associated with (or corresponding to) a second PRACH resource of the one or more PRACH resources configured on the second uplink BWP. The second PRACH resource may comprise at least one second preamble and at least one second PRACH occasion (e.g., time, frequency, code) on the second uplink BWP. In an example, the second PRACH resource may be a contention-based random-access resource. In an example, the second RS may be different from the first RS. In response to the second RS being different from the first RS, the wireless device may stop the back-off timer and perform a second random-access preamble transmission. In an example, in the second random-access preamble transmission, the wireless device may transmit, in a third slot (at time T3 in FIG. 27), the at least one second preamble via the at least one second PRACH resource of the second uplink BWP for the random-access procedure. This is illustrated in Case 1 in FIG. 27.

In an example, while the back-off timer is running, the wireless device may perform a second random-access resource selection. The wireless device may not find/select a second RS in the one or more RS s different than the first RS until the back-off timer expires. In response to the not finding/selecting the second RS in the one or more RSs, the wireless device may perform a third random-access resource selection in response to the back-off timer expiring. The third random-access resource selection may be different from the second random-access resource selection. This is illustrated in Case 2 in FIG. 27. The wireless device may perform a random-access preamble transmission at time T4 in FIG. 27.

The procedures for the back-off timer discussed for Case 1 and Case 2 in FIG. 27 may be applicable for a contention-resolution transmission discussed in FIG. 24B.

In an example, while the back-off timer is running, the wireless device may perform an LBT procedure. In response to the performing the LBT procedure, the wireless device may select a second RS in one or more second RSs. In an example, the configuration parameters may comprise the one or more second RSs on a third uplink BWP of the plurality of uplink BWPs of the cell. In an example, the third uplink BWP may be different from the second uplink BWP. In an example, the second RS may be a second SSB. In an example, the second RS may be a second CSI-RS. In response to the second uplink BWP being different from the third uplink BWP, the wireless device may stop the back-off timer and perform a second random-access preamble transmission.

In an example, in the second random-access preamble transmission, the wireless device may transmit, in a third slot (at time T3 in FIG. 27), at least one third preamble via at least one third PRACH resource of the third uplink BWP for the random-access procedure. In an example, the second RS may be associated with (or corresponding to) a second PRACH resource of one or more second PRACH resources configured on the third uplink BWP. The second PRACH resource may comprise the at least one third preamble and the at least one third PRACH resource (e.g., time, frequency, code) on the third uplink BWP. The procedures for the back-off timer discussed may be applicable for a contention-resolution transmission discussed in FIG. 24B.

In an example, in FIG. 24B, when the configured response window is running, the wireless device may monitor for a random-access response (RAR). The monitoring for the random-access response may comprise monitoring, for a DCI (e.g. a downlink assignment, an uplink grant), at least one PDCCH in the second downlink BWP of the cell (e.g., SpCell).

In an example, the random-access response may comprise one or more uplink grants. In an example, at least one of the uplink grants of the one or more uplink grants may indicate one or more time and/or one or more frequency resources on an uplink BWP of the plurality of the uplink BWPs of the cell. In an example, the uplink BWP (e.g., the first uplink BWP, the third uplink BWP) may be different from the second uplink BWP. In an example, the uplink BWP may be deactivated.

In an example, the wireless device may support multiple active uplink BWPs. In an example, when the wireless device supports the multiple active uplink BWPs and the uplink BWP is deactivated, in response to the at least one of the uplink grants of the one or more uplink grants indicating the one or more time and/or the one or more frequency resources on the uplink BWP, the wireless device may activate the uplink BWP.

In an example, the wireless device may perform a contention resolution transmission on the uplink BWP in response to the activating the uplink BWP.

In an example, the wireless device may operate in an unlicensed band. In an example, the wireless device may perform an LBT procedure on the uplink BWP in response to the activating the uplink BWP.

In an example, the wireless device may not support multiple active uplink BWPs. In an example, when the wireless device does not support the multiple active uplink BWPs and the uplink BWP is deactivated, in response to the at least one of the uplink grants of the one or more uplink grants indicating the one or more time and/or the one or more frequency resources on the uplink BWP, the wireless device may not activate the uplink BWP.

In an example, the wireless device may not support multiple active uplink BWPs. In an example, when the wireless device does not support the multiple active uplink BWPs and the uplink BWP is deactivated, in response to the at least one of the uplink grants of the one or more uplink grants indicating the one or more time and/or the one or more frequency resources on the uplink BWP, the wireless device may activate the uplink BWP and deactivate the active uplink BWP (e.g., the second uplink BWP).

In an example, the wireless device may not support multiple active uplink BWPs. In an example, when the wireless device does not support the multiple active uplink BWPs and the uplink BWP is deactivated, in response to the at least one of the uplink grants of the one or more uplink grants indicating the one or more time and/or the one or more frequency resources on the uplink BWP, the wireless device may activate the uplink BWP if one or more second PRACH resources of the uplink BWP is earlier in time than one or more PRACH resources of the second uplink BWP.

In an example, the wireless device may not support multiple active uplink BWPs. In an example, when the wireless device does not support the multiple active uplink BWPs and the uplink BWP is deactivated, in response to the at least one of the uplink grants of the one or more uplink grants indicating the one or more time and/or the one or more frequency resources on the uplink BWP, it may be a UE implementation to active the uplink BWP.

In an example, if the wireless device decides to activate the uplink BWP, the wireless device may deactivate the active uplink BWP (e.g., the second uplink BWP).

In an example, a wireless device may receive, from a base station, one or more configuration parameters of a cell (e.g., PCell). The one or more configuration parameters may comprise downlink BWPs and uplink BWPs.

In an example, the one or more configuration parameters may further comprise downlink BWP specific indices for the downlink BWPs and/or uplink BWP specific indices for the uplink BWPs. In an example, each downlink BWP of the downlink BWPs may be identified by a respective one downlink BWP specific index of the downlink BWP specific indices (e.g., provided by a higher layer parameter bwp-ID). In an example, each uplink BWP of the uplink BWPs may be identified by a respective one uplink BWP specific index of the uplink BWP specific indices (e.g., provided by a higher layer parameter bwp-ID).

In an example, each of the downlink BWPs may be associated with a respective one of the uplink BWPs. In an example, an uplink BWP of the uplink BWPs may be identified by an uplink BWP specific index. In an example, a downlink BWP of the downlink BWPs may be identified by a downlink BWP specific index. In an example, the uplink BWP specific index and the downlink BWP specific index may be the same. In an example, the uplink BWP and the downlink BWP may be associated in response to the uplink BWP specific index and the downlink BWP specific index being the same.

In an example, the wireless device may be active on one or more multiple active uplink BWPs. In an example, a first uplink BWP of the uplink BWPs may be a first active uplink BWP and a second uplink BWP of the uplink BWPs may be a second active uplink BWP. In an example, the one or more multiple active uplink BWPs may comprise the first uplink BWP and the second uplink BWP.

In an example, the wireless device may initiate a random-access procedure.

In an example, the wireless device may perform an LBT procedure on the one or more active uplink BWPs (e.g., the first uplink BWP and the second uplink BWP) in response to the initiating the random-access procedure.

In an example, the wireless device may select the first uplink BWP in response to performing the LBT procedure. In an example, a first LBT procedure on the first uplink BWP may be successful. In an example, the wireless device may determine that the first uplink BWP is idle.

In an example, the wireless device may transmit a preamble, for the random-access procedure, via a PRACH resource of the first uplink BWP in response to the selecting the first uplink BWP.

In an example, in response to the transmitting, the wireless device may monitor for a random-access response via a first downlink BWP of the downlink BWPs within a configured response window (e.g., ra-response window). In an example, the first downlink BWP and the first uplink BWP may be associated. In an example, the first downlink BWP and the first uplink BWP being associated may comprise a first downlink BWP specific index of the first downlink BWP and a first uplink BWP specific index of the first uplink BWP being the same.

In an example, the one or more configuration parameters may comprise the configured response window.

In an example, the wireless device may not receive the random-access response within the configured response window. In an example, in response to not receiving the random-access response, the wireless device may perform a second LBT procedure on the one or more active uplink BWPs (e.g., the first uplink BWP and the second uplink BWP).

In an example, in response to the performing the second LBT procedure, the wireless device may select the second uplink BWP for transmission of a second preamble.

In an example, the wireless device may switch from the first downlink BWP to a second downlink BWP of the downlink BWPs in response to selecting the second uplink BWP for transmission of the second preamble. In an example, the second downlink BWP may be associated with the second uplink BWP. In an example, the second downlink BWP and the second uplink BWP being associated may comprise a second downlink BWP specific index of the second downlink BWP and a second uplink BWP specific index of the second uplink BWP being the same.

In an example, in response to the switching from the first downlink BWP to the second downlink BWP, the wireless device may transmit the second preamble, for the random-access procedure, on the second uplink BWP.

Figure 28:
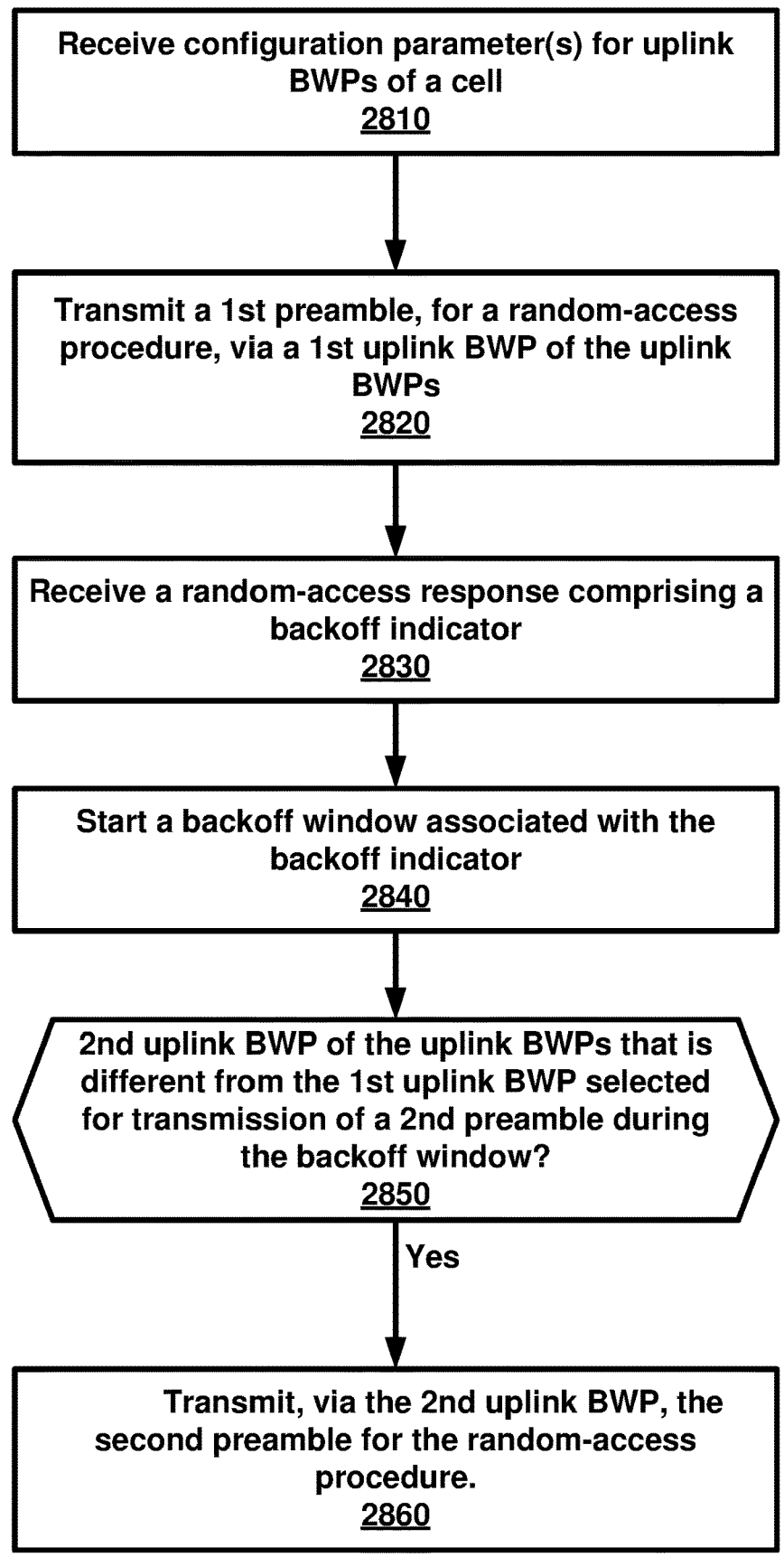
FIG. 28 is a flow diagram of an aspect of an example embodiment of the present disclosure.

FIG. 28 is a flow diagram as per an aspect of an example embodiment of the present disclosure. At 2810, a wireless device may receive one or more configuration parameters for uplink bandwidth parts (BWPs) of a cell. At 2820, a first preamble may be transmitted, for a random-access procedure, via a first uplink BWP of the uplink BWPs. At 2830, a random-access response comprising a backoff indicator may be received. At 2840, a backoff window associated with the backoff indicator may be started. At 2850, a determination may be made that a second uplink BWP of the uplink BWPs that is different from the first uplink BWP is selected, during the backoff window, for transmission of a second preamble. At 2860, the second preamble may be transmitted, via the second uplink BWP and based on the selecting, for the random-access procedure.

FIG. 29 is a flow diagram as per an aspect of an example embodiment of the present disclosure. At 2910, a wireless device may transmit a first preamble for a random-access procedure via a first uplink bandwidth part (BWP). At 2920, the wireless device may monitor, for a random-access response to the first preamble, a first downlink BWP associated with the first uplink BWP. At 2930, a determination may be made that the random-access response is not received. At 2940, a second uplink BWP may be selected for transmission of a second preamble based on the determination. At 2950, the wireless device may switch from the first downlink BWP to a second downlink BWP associated with the second uplink BWP based on the selecting the second uplink BWP. At 2960, the second preamble may be transmitted for the random-access procedure via the second uplink BWP.

According to an example embodiment, a wireless device may transmit a first preamble, for a random-access procedure, via a first uplink BWP. A random-access response comprising a backoff indicator may be received. A backoff window associated with the backoff indicator may be started. A second uplink BWP that is different from the first uplink BWP may be selected, during the backoff window, for transmission of a second preamble. Based on the selecting, the second preamble may be transmitted via the second uplink BWP for the random-access procedure.

According to an example embodiment, a wireless device may receive one or more configuration parameters for uplink bandwidth parts (BWPs) of a cell. A first preamble may be transmitted, for a random-access procedure, via a first uplink BWP of the uplink BWPs. A random-access response comprising a backoff indicator may be received. A backoff window associated with the backoff indicator may be started. A second uplink BWP of the uplink BWPs that is different from the first uplink BWP may be selected, during the backoff window, for transmission of a second preamble. The second preamble may be transmitted, via the second uplink BWP and based on the selecting, for the random-access procedure.

According to an example embodiment, at least two uplink BWPs of the uplink BWPs may be activated. According to an example embodiment, the at least two uplink BWPs may comprise the first uplink BWP and the second uplink BWP. According to an example embodiment, the first uplink BWP may be activated in a first slot. According to an example embodiment, the second uplink BWP may be activated in a second slot.

According to an example embodiment, a first listen-before-talk (LBT) procedure may be performed for the random-access procedure. The first LBT procedure may comprise a first LBT on the first uplink BWP and a second LBT on the second uplink BWP.

According to an example embodiment, the transmitting the first preamble via the first uplink BWP may be based on selecting the first uplink BWP. According to an example embodiment, the first uplink BWP may be selected based on the first LBT being successful, the second LBT being successful; and at least one of: channel load metrics, LBT success rates, channel occupancies, and load histories of the first and second uplink BWPs. According to an example embodiment, the first uplink BWP may be selected based on the first LBT being successful and the second LBT failing. According to an example embodiment, the first LBT on the first uplink BWP being successful may comprise a channel on the first uplink BWP being idle. According to an example embodiment, the second LBT on the second uplink BWP failing may comprise a channel on the second uplink BWP being busy.

According to an example embodiment, the receiving the random-access response comprising the backoff indicator may comprise receiving the random-access response comprising a medium access control protocol data unit (MAC PDU) comprising the backoff indicator.

According to an example embodiment, the starting the backoff window associated with the backoff indicator may comprise starting a backoff timer associated with the backoff indicator. According to an example embodiment, the backoff timer may be stopped based on the selecting the second uplink BWP. According to an example embodiment, a second LBT procedure may be performed for transmission of the second preamble while the backoff timer is running. According to an example embodiment, performing the second LBT procedure may comprise a third LBT on the first uplink BWP and a fourth LBT on the second uplink BWP. According to an example embodiment, the second LBT procedure may be performed during the backoff window. According to an example embodiment, the selecting the second uplink BWP may be based on the second LBT procedure. According to an example embodiment, the selecting the second uplink BWP may be based on the third LBT failing; and the fourth LBT being successful. According to an example embodiment, the selecting the second uplink BWP may be based on the third LBT being successful; the fourth LBT being successful; and at least one of: channel load metrics, LBT success rates, channel occupancies, and load histories of the first and second uplink BWPs.

According to an example embodiment, the random-access procedure may be a contention-based random-access procedure. According to an example embodiment, the random-access procedure may be a contention-free random-access procedure.

According to an example embodiment, the transmitting the second preamble may comprise transmitting the second preamble during the backoff window According to an example embodiment, a wireless device may transmit a first preamble for a random-access procedure via a first uplink bandwidth part (BWP). A first downlink BWP associated with the first uplink BWP may be monitored for a random-access response to the first preamble. A determination may be made that the random-access response is not received. Based on the determination, a second uplink BWP may be selected for transmission of a second preamble. Based on the selecting the second uplink BWP, the wireless device may switch from the first downlink BWP to a second downlink BWP associated with the second uplink BWP. The second preamble may be transmitted for the random-access procedure via the second uplink BWP.

According to an example embodiment, the wireless device may receive one or more configuration parameters. The one or more configuration parameters may indicate downlink BWPs comprising the first downlink BWP and the second downlink BWP. The one or more configuration parameters may indicate uplink BWPs comprising the first uplink BWP and the second uplink BWP. According to an example embodiment, each of the downlink BWPs is associated with a respective one of the uplink BWPs.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   transmitting, by a wireless device and via a first uplink bandwidth part (BWP), a first preamble for a random-access procedure;
   determining a second uplink BWP for transmission of a second preamble for the random-access procedure, wherein the determining is based on not receiving, via a first downlink BWP associated with the first uplink BWP, a random-access response corresponding to the first preamble;
   switching, based on the determining the second uplink BWP, from the first downlink BWP to a second downlink BWP associated with the second uplink BWP; and
   transmitting the second preamble via the second uplink BWP.

2. The method of claim 1, further comprising receiving one or more messages comprising one or more configuration parameters for a cell.

3. The method of claim 2, wherein the one or more configuration parameters indicate:
a first downlink BWP index for the first downlink BWP;
a first uplink BWP index for the first uplink BWP;
a second downlink BWP index for the second downlink BWP; and
a second uplink BWP index for the second uplink BWP.

4. The method of claim 3, wherein:
the first downlink BWP being associated with the first uplink BWP comprises the first downlink BWP index and the first uplink BWP index being the same; and
the second downlink BWP being associated with the second uplink BWP comprises the second downlink BWP index and the second uplink BWP index being the same.

5. The method of claim 2, wherein the cell comprises the first downlink BWP, the second downlink BWP, the first uplink BWP and the second uplink BWP.

6. The method of claim 2, further comprising activating at least two uplink BWPs of the cell, wherein the at least two uplink BWPs comprise the first uplink BWP and the second uplink BWP.

7. The method of claim 6, further comprising:
activating the first uplink BWP in a first slot; and
activating the second uplink BWP in a second slot.

8. The method of claim 1, further comprising receiving, via the second downlink BWP, a random-access response corresponding to the second preamble.

9. The method of claim 1, further comprising performing, for the random-access procedure, a listen-before-talk (LBT) procedure on the second uplink BWP.

10. The method of claim 9, wherein the determining the second uplink BWP is based on the LBT procedure being successful.

11. A wireless device comprising:
one or more processors; and
memory storing instructions that, when executed by the one or more processors, cause the wireless device to:
transmit, via a first uplink bandwidth part (BWP), a first preamble for a random-access procedure;
determine a second uplink BWP for transmission of a second preamble for the random-access procedure, wherein the determination is based on not receiving, via a first downlink BWP associated with the first uplink BWP, a random-access response corresponding to the first preamble;
switch, based on the determination of the second uplink BWP, from the first downlink BWP to a second downlink BWP associated with the second uplink BWP; and
transmit the second preamble via the second uplink BWP.

12. The wireless device of claim 11, wherein the instructions, when executed by the one or more processors, further cause the wireless device to receive one or more messages comprising one or more configuration parameters for a cell.

13. The wireless device of claim 12, wherein the one or more configuration parameters indicate:
a first downlink BWP index for the first downlink BWP;
a first uplink BWP index for the first uplink BWP;
a second downlink BWP index for the second downlink BWP; and
a second uplink BWP index for the second uplink BWP.

14. The wireless device of claim 13, wherein:
the first downlink BWP being associated with the first uplink BWP comprises the first downlink BWP index and the first uplink BWP index being the same; and
the second downlink BWP being associated with the second uplink BWP comprises the second downlink BWP index and the second uplink BWP index being the same.

15. The wireless device of claim 12, wherein the cell comprises the first downlink BWP, the second downlink BWP, the first uplink BWP and the second uplink BWP.

16. The wireless device of claim 12, wherein the instructions, when executed by the one or more processors, further cause the wireless device to activate at least two uplink BWPs of the cell, wherein the at least two uplink BWPs comprise the first uplink BWP and the second uplink BWP.

17. The wireless device of claim 16, further comprising:
activating the first uplink BWP in a first slot; and
activating the second uplink BWP in a second slot.

18. The wireless device of claim 11, wherein the instructions, when executed by the one or more processors, further cause the wireless device to receive, via the second downlink BWP, a random-access response corresponding to the second preamble.

19. The wireless device of claim 11, wherein the instructions, when executed by the one or more processors, further cause the wireless device to perform, for the random-access procedure, a listen-before-talk (LBT) procedure on the second uplink BWP.

20. An apparatus for wireless communication, comprising:
at least one processor configured to:
determine a second uplink bandwidth part (BWP) for transmission of a second preamble for a random-access procedure, wherein the determination is based on not receiving, via a first downlink BWP associated with a first uplink BWP, a random-access response corresponding to a first preamble; and
switch, based on the determination of the second uplink BWP, from the first downlink BWP to a second downlink BWP associated with the second uplink BWP; and
a transceiver coupled to the at least one processor, the transceiver being configured to:
transmit, via the first uplink BWP, the first preamble for the random-access procedure; and
transmit the second preamble via the second uplink BWP.

* * * * *